US012500028B2

(12) United States Patent
Nishizaka et al.

(10) Patent No.: US 12,500,028 B2
(45) Date of Patent: Dec. 16, 2025

(54) POWER CONVERTER AND COIL APPARATUS

(71) Applicant: Mitsubishi Electric Corporation, Tokyo (JP)

(72) Inventors: Kenji Nishizaka, Tokyo (JP); Takashi Kumagai, Tokyo (JP); Tomohito Fukuda, Tokyo (JP); Atsushi Hosokawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1107 days.

(21) Appl. No.: 17/421,503

(22) PCT Filed: Feb. 3, 2020

(86) PCT No.: PCT/JP2020/003913
§ 371 (c)(1),
(2) Date: Jul. 8, 2021

(87) PCT Pub. No.: WO2020/170783
PCT Pub. Date: Aug. 27, 2020

(65) Prior Publication Data
US 2022/0093321 A1 Mar. 24, 2022

(30) Foreign Application Priority Data
Feb. 22, 2019 (JP) ................................ 2019-030961

(51) Int. Cl.
*H01F 17/04* (2006.01)
*H01F 27/22* (2006.01)
(Continued)

(52) U.S. Cl.
CPC ......... *H01F 27/2876* (2013.01); *H01F 27/22* (2013.01); *H01F 27/306* (2013.01)

(58) Field of Classification Search
CPC ................................................... H01F 27/2876
(Continued)

(56) References Cited

U.S. PATENT DOCUMENTS 4,603,314 A * 7/1986 Fukunaga ............... H01F 37/00 29/605
5,635,891 A * 6/1997 Miyoshi .................... H01F 5/02 336/198
(Continued)

FOREIGN PATENT DOCUMENTS

CN 101326598 A 12/2008
CN 104769689 A 7/2015
(Continued)

OTHER PUBLICATIONS

English translation of EP2988310 (Year: 2016).*
(Continued)

*Primary Examiner* — Ronald Hinson
(74) *Attorney, Agent, or Firm* — BUCHANAN, INGERSOLL & ROONEY PC

(57) ABSTRACT

A coil apparatus includes a coil unit including a coil, a base core that is a first core component, and a core module that is a second core component. The first core component includes a center leg that is a leg around which the coil is wound. The second core component includes a plurality of core segments arranged in a row with gaps between them. The second core component is connected to the leg to form a magnetic path together with the first core component.

8 Claims, 41 Drawing Sheets

(51) Int. Cl.
*H01F 27/28* (2006.01)
*H01F 27/30* (2006.01)

(58) Field of Classification Search
USPC .................................................. 336/210, 221
See application file for complete search history.

(56) References Cited

U.S. PATENT DOCUMENTS

| | | | |
|---|---|---|---|
| 6,120,916 A | 9/2000 | Delvinquier et al. | |
| 7,872,561 B2 | 1/2011 | Matumoto | |
| 9,336,942 B2 | 5/2016 | Yamada et al. | |
| 2005/0270745 A1* | 12/2005 | Chen | H01F 27/2804 361/707 |
| 2006/0091989 A1 | 5/2006 | Vinciarelli et al. | |
| 2008/0253149 A1 | 10/2008 | Matumoto | |
| 2014/0266534 A1* | 9/2014 | Shi | H01F 27/24 336/178 |
| 2015/0287525 A1 | 10/2015 | Yamada et al. | |
| 2018/0172733 A1* | 6/2018 | Wu | H01F 3/14 |

FOREIGN PATENT DOCUMENTS

| | | |
|---|---|---|
| CN | 108231317 A | 6/2018 |
| JP | S62135415 U | 8/1987 |
| JP | H09129434 A | 5/1997 |
| JP | 2005079546 A | 3/2005 |
| JP | 2005150414 A | 6/2005 |
| JP | 2011082412 A | 4/2011 |
| JP | 2014036157 A | 2/2014 |
| JP | 2015204431 A | 11/2015 |
| JP | 2018093009 A | 6/2018 |
| JP | 2018113731 A | 7/2018 |

OTHER PUBLICATIONS

English translation of JP2014179478 (Year: 2014).*
English translation of JP2014086432 (Year: 2014).*
International Search Report (PCT/ISA/210) with translation and Written Opinion (PCT/ISA/237) mailed on Mar. 31, 2020, by the Japan Patent Office as the International Searching Authority for International Application No. PCT/JP2020/003913. (13 pages).
Office Action dated Feb. 15, 2022, issued in Japanese Patent Application No. 2021-501812, 14 pages including 7 pages of English Translation.
Office Action dated Jun. 18, 2024, issued in the corresponding Chinese Patent Application No. 202080014191.0, 16 pages including 9 pages of English Translation.
First Office Action dated Jan. 9, 2024, issued in the corresponding Chinese Patent Application No. 202080014191.0, 20 pages including 10 pages of English Translation.

* cited by examiner

POWER CONVERTER AND COIL APPARATUS

FIELD

The present invention relates to a coil apparatus including a coil, and a power converter.

BACKGROUND

To provide a smaller and higher-power-density power converter, it is effective to use planar coil apparatuses that are easily cooled by heat dissipation to a housing or the like, as coil apparatuses such as a transformer and a reactor that occupy large areas in a power converter. A planer coil apparatus is also referred to as a low-profile coil apparatus. In a planar coil apparatus, magnetic paths are formed by a combination of an E-shaped core and an I-shaped core, a combination of an E-shaped core and an E-shaped core, or the like.

A coil apparatus needs to be precisely adjusted in gap length that is the length of a gap between cores, to obtain a desired inductance value. The gap length is sometimes adjusted by fixing cores to each other with a gap sheet sandwiched between polished surfaces of the cores. It is known that, in this case, variations in the dimensions of the gap sheet or variations in the precision of polishing of the cores result in variations in inductance value. The longer gap length the coil apparatus has, the larger the leakage flux. When the leakage flux becomes larger, the magnetic flux causes eddy currents to flow in a coil constituting the coil apparatus, increasing loss in the coil.

Patent Literature 1 discloses a coil apparatus with a combination of an I-shaped core and an E-shaped core, in which gaps are formed between the I-shaped core and the E-shaped core using a bobbin that holds a coil. According to the technique of Patent Literature 1, the gap length can be set with high precision without using a gap sheet. In the coil apparatus of Patent Literature 1, the gaps are distributed among the legs of the E-shaped core to suppress leakage of flux per gap.

CITATION LIST

Patent Literature

Patent Literature 1: Japanese Patent Application Laid-open No. 2005-79546

SUMMARY

Technical Problem

According to the technique of Patent Literature 1, which is a conventional technique, the number of gaps provided in a magnetic path is limited to up to two. Thus, the conventional technique, in which leakage flux is insufficiently suppressed, has a problem that it is difficult to reduce loss in a coil.

The present invention has been made in view of the above, and its object is to provide a coil apparatus that allows a reduction in loss in a coil.

Solution to Problem

To solve the above problems and achieve the object a coil apparatus according to the present invention includes: a coil;

a first core component including a leg around which the coil is wound; and a second core component that includes a plurality of core segments arranged in a row with gaps between the core segments, and is connected to the leg to form a magnetic path together with the first core component.

Advantageous Effects of Invention

The coil apparatus according to the present invention has the effect of allowing a reduction in loss in a coil.

DESCRIPTION OF EMBODIMENTS

Hereinafter, a coil apparatus and a power converter according to embodiments of the present invention will be described in detail with reference to the drawings. Note that the embodiments are not intended to limit this invention.

First Embodiment

Figure 1:
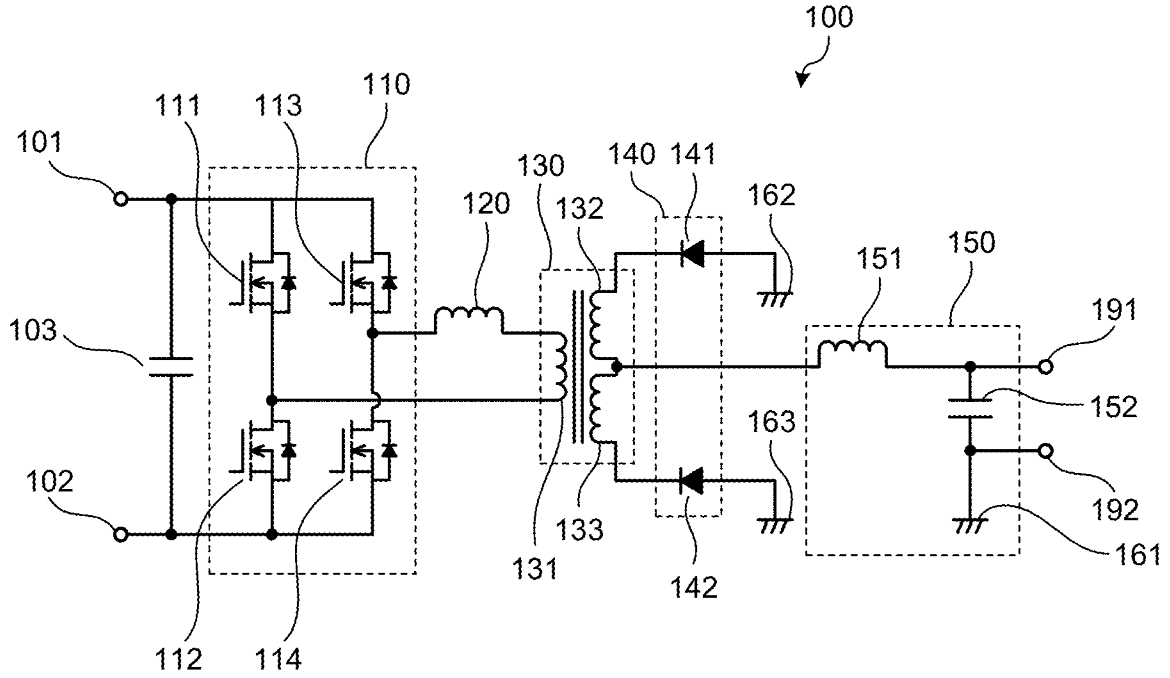
FIG. 1 is a circuit diagram illustrating an example of a power converter including a coil apparatus according to a first embodiment of the present invention.

FIG. 1 is a circuit diagram illustrating an example of a power converter including a coil apparatus according to a first embodiment of the present invention. A power converter 100 illustrated in FIG. 1 is an isolated direct current (DC)-DC converter. The power converter 100 converts a DC voltage input to input terminals 101 and 102 into a DC voltage and outputs the DC voltage from output terminals 191 and 192. A high voltage of about 100 V to 600 V supplied from a vehicle-mounted high-voltage battery is input to the input terminals 101 and 102. A voltage of about 12 V to 16 V, which is a power supply voltage of a vehicle-mounted auxiliary system component, is output from the output terminals 191 and 192.

The power converter 100 includes a full-bridge circuit 110, a resonance coil 120, a transformer 130, a secondary-side rectifier circuit 140, and a smoothing circuit 150. The high DC voltage supplied to the input terminals 101 and 102 is input to the full-bridge circuit 110. The full-bridge circuit 110 includes switching elements 111, 112, 113, and 114. Each of the switching elements 111, 112, 113, and 114 is a metal-oxide semiconductor field-effect transistor (MOSFET), an insulated-gate bipolar transistor (IGBT), or the like. The full-bridge circuit 110 operates to generate an AC voltage from the DC voltage by the switching elements 111, 112, 113, and 114. The AC component generated on the input side by the operation of the full-bridge circuit 110 is mainly absorbed by an input capacitor 103. This reduces the occurrence of noise in input lines.

The resonance coil 120 and a primary coil 131 of the transformer 130 are connected in series. The AC voltage generated by the full-bridge circuit 110 is applied to the resonance coil 120 and the primary coil 131. The resonance coil 120 resonates with capacitance components produced by MOSFETs or external capacitors connected in parallel with the switching elements 111, 112, 113, and 114, respectively, to control the losses of the switching elements 111, 112, 113, and 114. In this operation, the resonance coil 120 is required to have accuracy in inductance value, that is, small variations in inductance value.

When the AC voltage is applied to the primary coil 131, an AC voltage depending on the turn ratio of the transformer 130 is generated in secondary coils 132 and 133 of the transformer 130. The AC voltage generated in the secondary coils 132 and 133 is input to the secondary-side rectifier circuit 140. The AC voltage input to the secondary-side rectifier circuit 140 is rectified by rectifier elements 141 and 142 represented by Schottky barrier diodes. Consequently, at a center tap that is a point of connection between the secondary coil 132 and the secondary coil 133, an AC voltage full-wave rectified relative to ground potential is generated.

The smoothing circuit 150 includes a smoothing coil 151 and an output capacitor 152. The AC voltage generated by the transformer 130 is smoothed by the smoothing circuit 150, so that a desired flat DC voltage is generated between the output terminal 191 and the output terminal 192. The smoothing coil 151 used here is required to have good DC superposition characteristics in addition to accuracy in inductance value. The output terminal 192 that is a negative terminal of the output terminals 191 and 192 is not distinctly provided. A metal housing that is a structure serving as grounds (GNDs) 161, 162, and 163 has its function.

Figure 2:
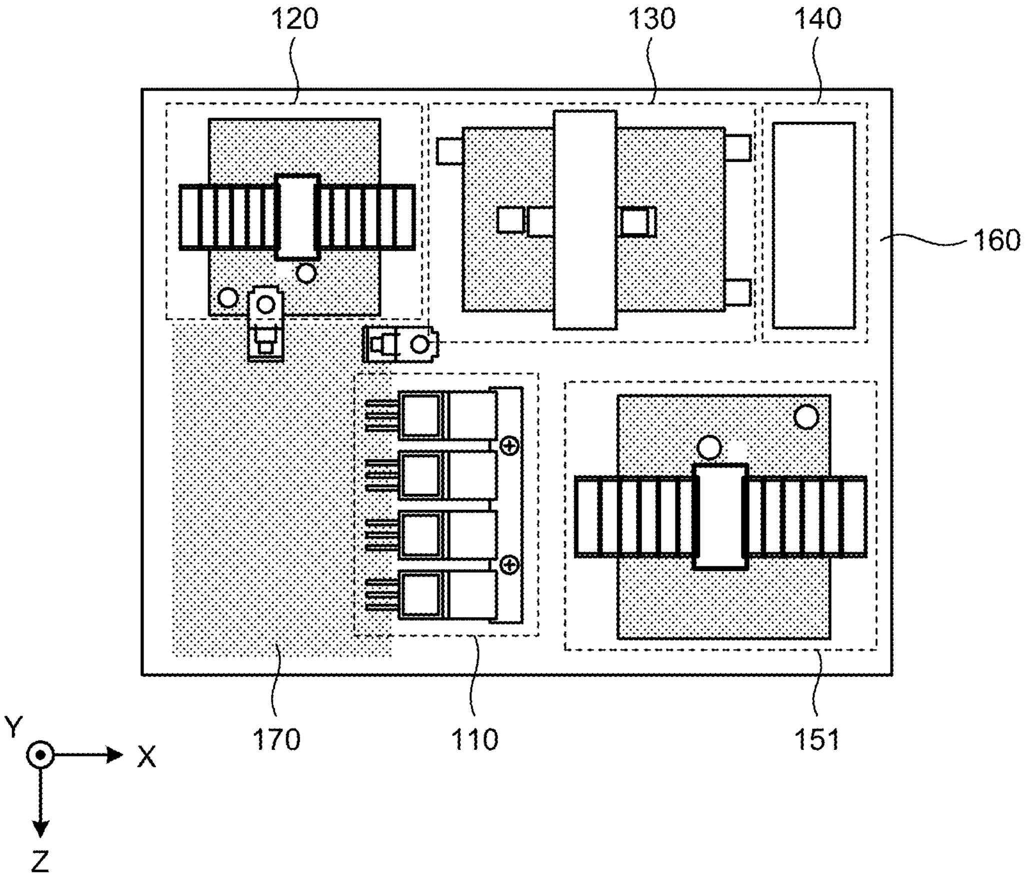
FIG. 2 is a top view of main components constituting the power converter illustrated in FIG. 1.

FIG. 2 is a top view of main components constituting the power converter illustrated in FIG. 1. FIG. 2 does not illustrate some of the components of the power converter 100. FIG. 2 does not illustrate part of the components.

A metal housing 160 is a housing of the power converter 100. The metal housing 160 is a structure serving as the GNDs 161, 162, and 163 and also serves as a cooler. The input terminals 101 and 102, the input capacitor 103, a control circuit of the switching elements 111, 112, 113, and 114, and a drive circuit are mounted on a printed-circuit board 170.

The resonance coil 120 is required to have small variations in inductance value to adjust resonance frequency. As a core constituting the resonance coil 120, a core in which an E-shaped core and an E-shaped core are combined, or a core having a toroidal shape is typically used. As a soft magnetic material to form a magnetic path, a dust core material such as pure iron or an Fe—Si alloy is used. In the first embodiment, the core constituting the resonance coil 120 is a planar core, and is a ferrite core of Mn—Zn or the like provided with a plurality of gaps. The resonance coil 120, which is provided with the plurality of gaps, can achieve higher performance and can control a height from an installation base as compared with the above-mentioned conventional technique. FIG. 2 does not illustrate a component to which the resonance coil 120 is connected and a configuration for fixing the resonance coil 120 to the metal housing 160.

The transformer 130 is a planar transformer. The primary coil 131 and the secondary coil 132 are a coil unit included in the transformer 130. The transformer 130 includes: an E-shaped core; an I-shaped core; a printed-circuit board on which the primary coil 131 is formed; and a printed-circuit board on which the secondary coil 132 is formed. There are no gaps in a magnetic path formed by the E-shaped core and the I-shaped core. In the secondary-side rectifier circuit 140, the rectifier element 141 and the rectifier element 142 are installed in one package.

The smoothing coil 151 requires a highly accurate inductance value and DC superposition characteristics. As a core constituting the smoothing coil 151, a core in which an E-shaped core and an E-shaped core are combined, or a core having a toroidal shape is typically used, similarly as the case of resonance coil 120. As a soft magnetic material to form a magnetic path, a dust core material such as pure iron or an Fe—Si alloy is used. In the first embodiment, the core constituting the smoothing coil 151 is a planar core, and is a ferrite core of Mn—Zn or the like provided with a plurality of gaps. The smoothing coil 151, which is provided with the plurality of gaps, can achieve higher performance and can control a height from an installation base as compared with the above-mentioned conventional technique. The coil constituting the smoothing coil 151 is formed on a printed-circuit board. FIG. 2 does not illustrate a component to which the smoothing coil 151 is connected and a configuration for fixing the smoothing coil 151 to the metal housing 160.

In FIG. 2, the resonance coil 120, the smoothing coil 151, and the coil unit of the transformer 130 are configured using separate printed-circuit boards from each other. The resonance coil 120, the smoothing coil 151, and the coil unit of the transformer 130 may be configured using one printed-circuit board.

Figure 3:
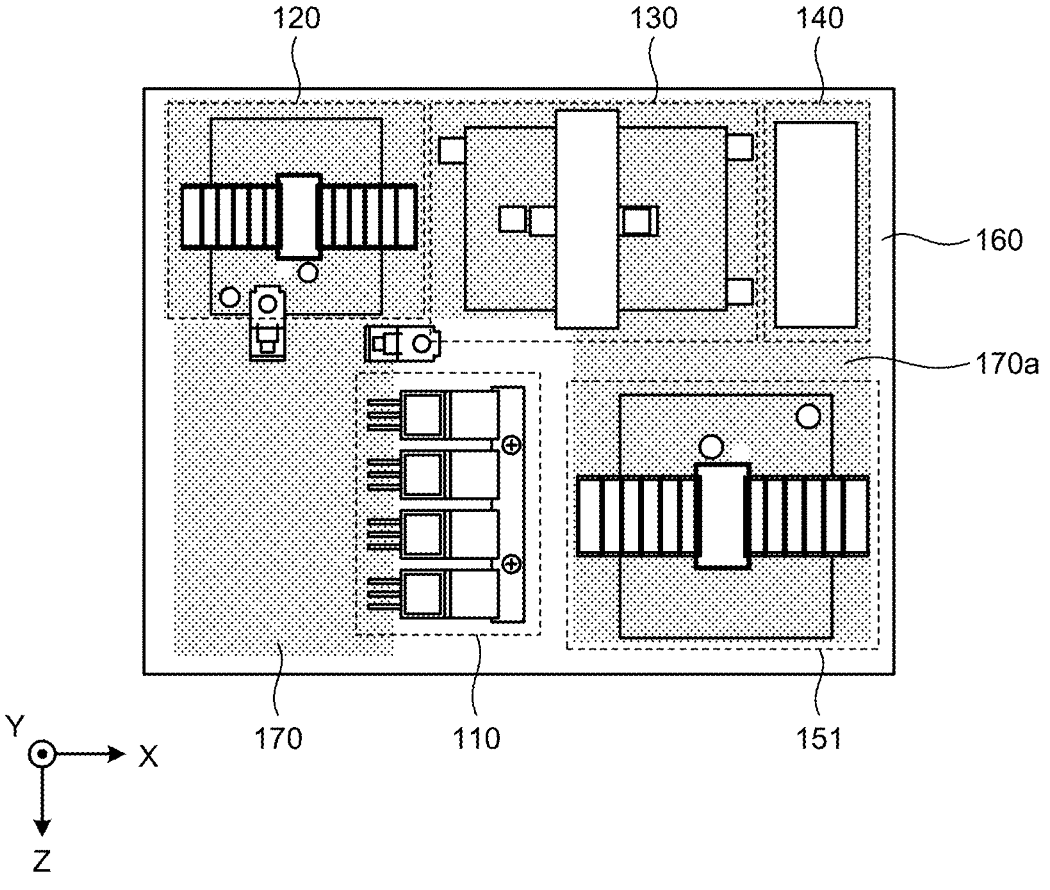
FIG. 3 is another top view of the main components constituting the power converter illustrated in FIG. 1.

FIG. 3 is another top view of the main components constituting the power converter illustrated in FIG. 1. In FIG. 3, the resonance coil 120, the smoothing coil 151, and the coil unit of the transformer 130 are configured using one printed-circuit board 170*a*. The rectifier elements 141 and 142 may be mounted on the printed-circuit board 170*a*. The entirety of the printed-circuit board 170 and the printed-circuit board 170*a* may be formed by one printed-circuit board.

The following describes the configuration of the resonance coil 120 and the configuration of the smoothing coil 151 included in the power converter 100. The resonance coil 120 and the smoothing coil 151 are coil apparatuses included in the power converter 100.

Figure 4:
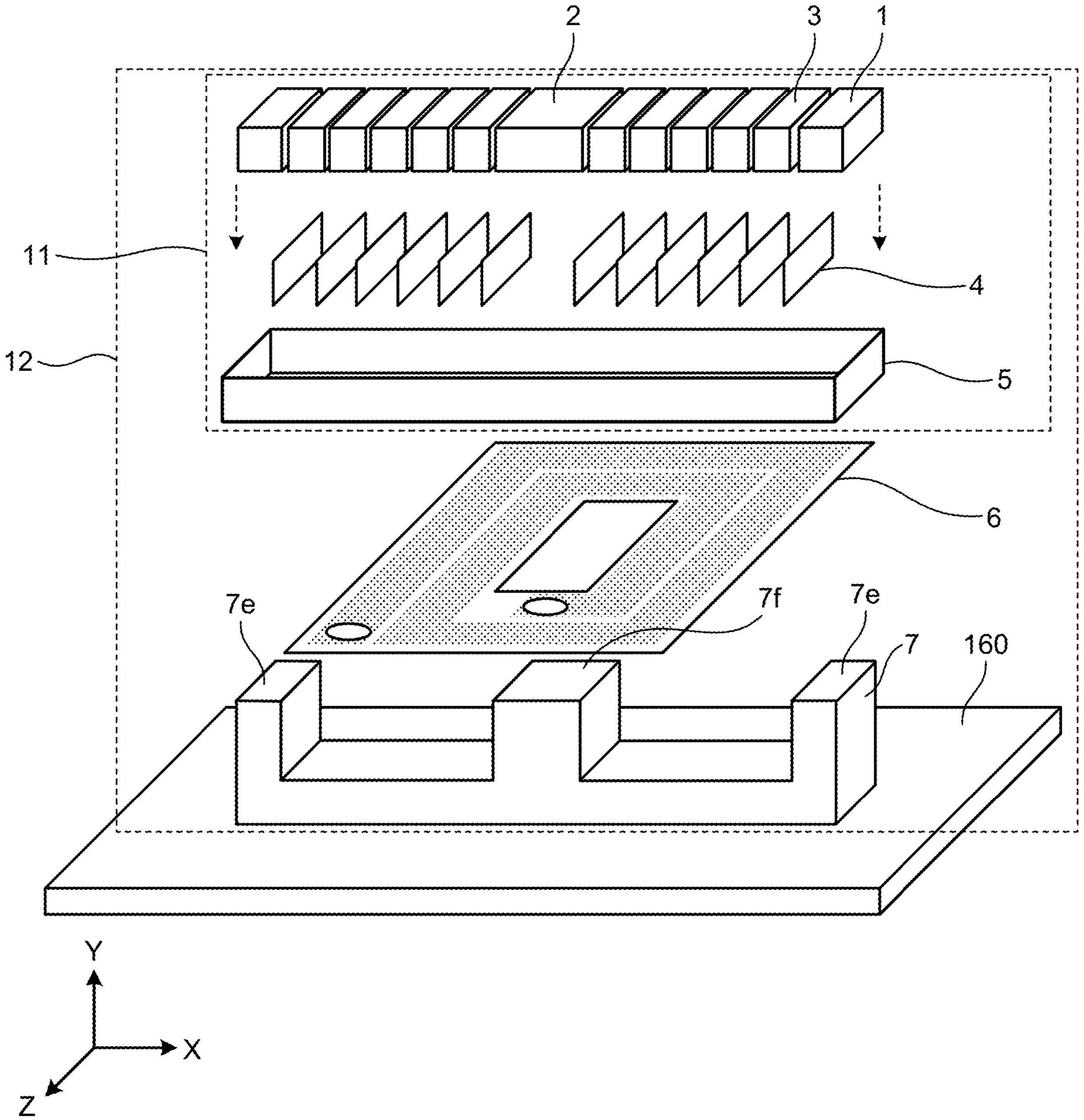
FIG. 4 is an exploded view of the coil apparatus according to the first embodiment.
Figure 5:
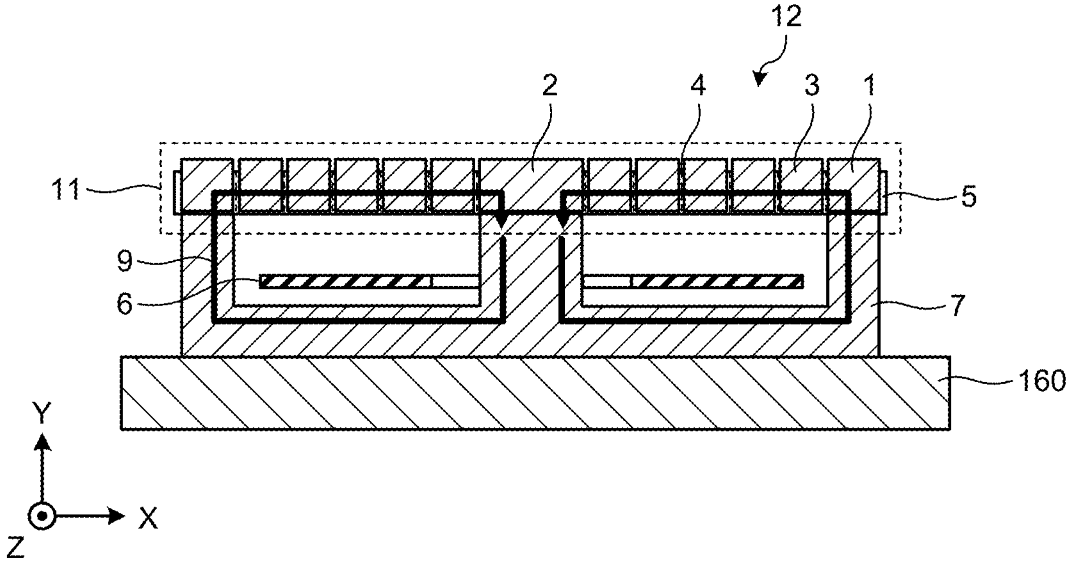
FIG. 5 is a cross-sectional view of the coil apparatus according to the first embodiment.
Figure 6:
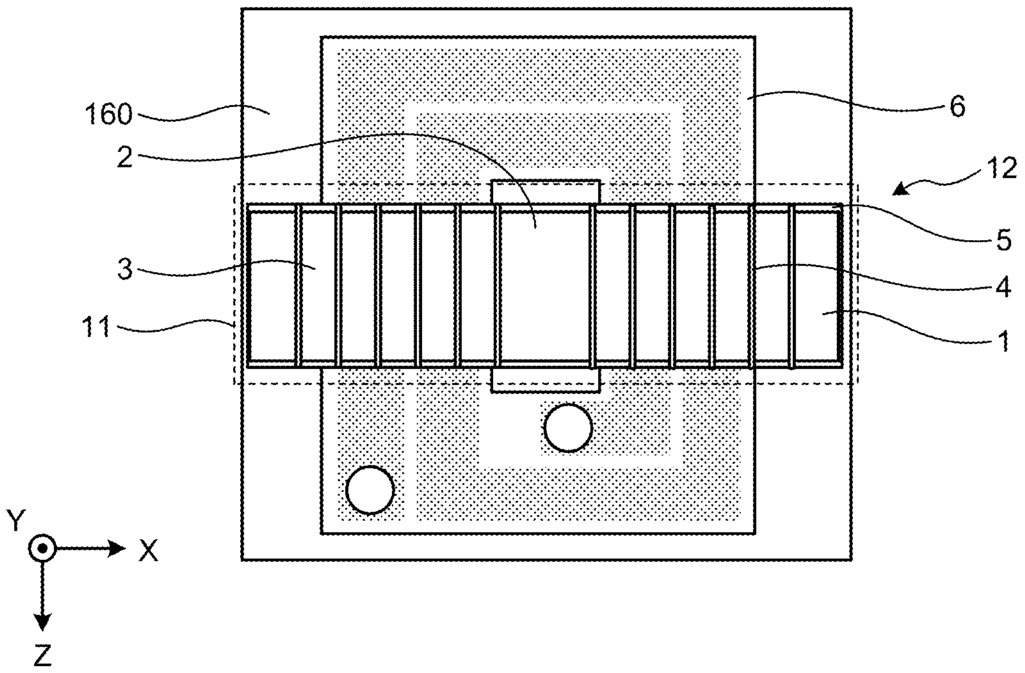
FIG. 6 is a top view of the coil apparatus according to the first embodiment.

FIG. 4 is an exploded view of a coil apparatus according to the first embodiment. FIG. 5 is a cross-sectional view of the coil apparatus according to the first embodiment. FIG. 6 is a top view of the coil apparatus according to the first embodiment. The X axis is a horizontal axis. The Y axis is a vertical axis. The Z axis is an axis in a depth direction. FIG. 5 illustrates an X-Y cross section parallel to the X axis and the Y axis.

A coil apparatus 12 according to the first embodiment includes a base core 7 that is a first core component, a core module 11 that is a second core component, and a coil unit 6. The core module 11 includes: a plurality of core segments 1, 2, and 3 arranged in a row with gaps between them; divider plates 4 that are plates disposed between the core segments 1, 2, and 3; and a case 5 in which the core segments 1, 2, and 3 and the divider plates 4 are accommodated. The core module 11 is an I-shaped core.

The base core 7 is an E-shaped core with three legs. Outer legs 7*e* are legs formed at both ends of the base core 7 in the X-axis direction. The center leg 7*f* is a leg formed at the center of the base core 7 in the X-axis direction. The core module 11 is connected to the center leg 7*f* and the two outer legs 7*e* so that the base core 7 and the core module 11 form two magnetic paths 9 that are both closed magnetic paths.

The coil unit 6 is configured using a double-layer printed-circuit board made of Flame Retardant Type 4 (FR-4). A wound winding wire pattern is printed on each side of the printed-circuit board. To reduce the current density of current flowing through the coil unit 6, a four-layer printed-circuit board may be used as the coil unit 6 to have a plurality of separate current paths. The coil unit 6 may be configured using an FR-5 base material or a ceramic base material to increase heat resistance. Instead of using a printed-circuit board, the coil unit 6 may use a copper plate or an aluminum plate having a thickness of about 0.5 mm to 2 mm. An opening is provided in the center of the coil unit 6. The coil unit 6 is installed in the coil apparatus 12 with the center leg 7*f* passed through the opening. Thus, a coil that is the winding wire patterns printed on the printed-circuit board becomes a state being wound around the center leg 7*f*.

The area of the ZX plane of the core segments 1 parallel to the Z axis and the X axis is equal to the area of the ZX plane of the outer legs 7*e*. The area of the YZ plane of the core segments 1 parallel to the Y axis and the Z axis is equal to the area of the ZX plane of the outer legs 7*e*. The area of the ZX plane of the core segments 1 may be larger than the area of the ZX plane of the outer legs 7*e*. The area of the YZ plane of the core segments 1 may be larger than the area of the ZX plane of the outer legs 7*e*.

The area of the ZX plane of the core segment 2 is equal to the area of the ZX plane of the center leg 7*f*. The area of the YZ plane of the core segment 2 is equal to the area of the ZX plane of the outer legs 7*e*. The area of the ZX plane of the core segment 2 may be larger than the area of the ZX plane of the center leg 7*f*. The area of the YZ plane of the core segment 2 may be larger than the area of the ZX plane of the outer legs 7*e*.

The height of the core segments 3 in the Y-axis direction is the same as the height of the core segments 1 in the Y-axis direction. The depth of the core segments 3 in the Z-axis direction is the same as the depth of the core segments 1 in the Z-axis direction. Here, dimensional differences of about ±3% between the core segments 3 and the core segments 1 due to dimensional tolerances at the time of manufacturing are ignored. The height of the core segments 3 and the height of the core segments 1 being the same includes the case where there are dimensional differences of about ±3%. The depth of the core segments 3 and the depth of the core segments 1 being the same includes the case where there are dimensional differences of about ±3%. The thickness of the core segments 3 in the X-axis direction is smaller than the thickness of the core segments 1 in the X-axis direction. A soft magnetic material is used as the material of the cores, which are the core segments 1, the core segment 2, the core segments 3, and the base core 7. As the soft magnetic material, an Mn—Zn or Ni—Zn ferrite core material, and a dust core material such as pure iron, an Fe—Si alloy, an Fe—Si—Al alloy, an Ni—Fe alloy, or an Ni—Fe—Mo alloy are used. The cores may be coated with a powder resin for insulation.

For a ferrite core made of a ferrite core material and a dust core made of a dust core material, a powder material is molded by a press and then fired by heat treatment. The material molded by the press shrinks during heat treatment. Thus, the dimensional accuracy decreases as the core size increases. A large core has a longer firing time and a larger loss in a coil than a small core. Two types of ferrite core materials, a general-purpose ferrite core material and a low-loss ferrite core material, are generally known. The low-loss ferrite core material shows tendencies such as a deterioration in dimensional accuracy and an increase in loss more conspicuously. Therefore, a low-loss, large core is more difficult to control firing temperature and tends to have a large loss in the coil, and thus requires a large amount of manufacturing know-how.

The core segments 1, 2, and 3 are each smaller than a one-piece core when the second core component is formed as the one-piece core, and thus are easier to fire than the one-piece core. Further, the core segments 1, 2, and 3 can reduce loss in the coil unit 6 as compared with the one-piece core. By the use of the core segments 1, 2, and 3 in the core module 11, the core module 11 can be increased in dimensional accuracy and can be reduced in firing time. Either the general-purpose ferrite core material or the low-loss ferrite core material may be used for the core segments 1, 2, and 3. Since both the general-purpose ferrite core material and the low-loss ferrite core material can be used, the number of procurement sources from which the material of the core segments 1, 2, and 3 can be procured increases. Consequently, the procurement of components for manufacturing the core module 11 can be stabilized, and procurement cost can be reduced. Further, the core module 11 can be reduced in loss in the coil unit 6 and improved in quality.

Figure 7:
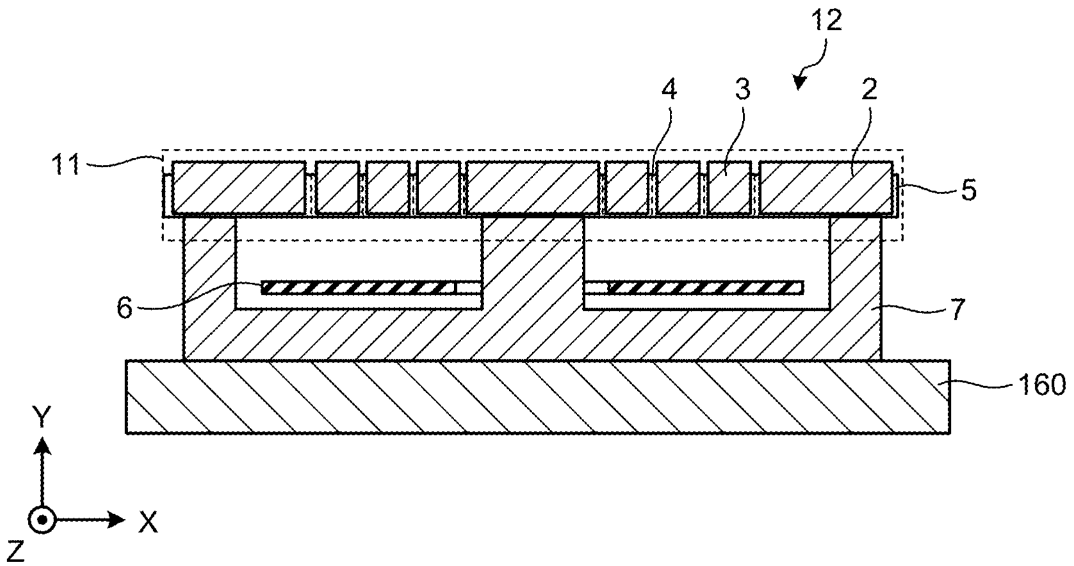
FIG. 7 is a diagram illustrating a first modification of a core module included in the coil apparatus according to the first embodiment.

FIG. 7 is a diagram illustrating a first modification of the core module included in the coil apparatus according to the first embodiment. In the first modification illustrated in FIG. 7, the core module 11 is configured using a plurality of the core segments 2 and a plurality of the core segments 3 without using the core segments 1. In the first modification, in which the core segments 1 are not used, the number of types of components is reduced as compared with the case illustrated in FIGS. 4 to 6. The core module 11, which is reduced in the number of types of components as compared with the case illustrated in FIGS. 4 to 6, can be further improved in productivity and can be reduced in manufacturing cost.

Figure 8:
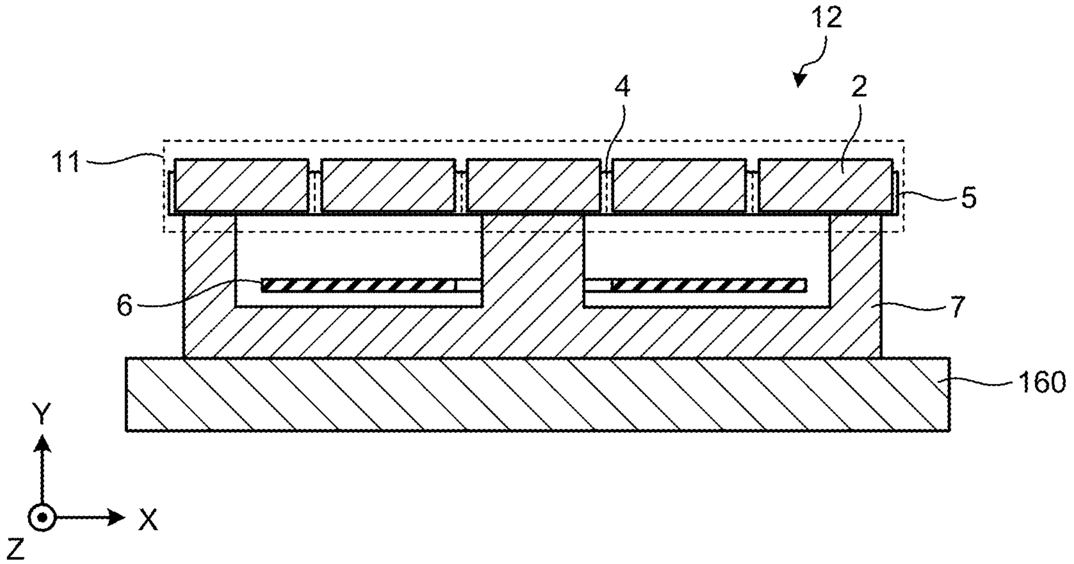
FIG. 8 is a diagram illustrating a second modification of the core module included in the coil apparatus according to the first embodiment.

FIG. 8 is a diagram illustrating a second modification of the core module included in the coil apparatus according to the first embodiment. In the second modification illustrated in FIG. 8, the core module 11 is configured using a plurality of the core segments 2 without using the core segments 1 and the core segments 3. The core module 11 is composed of the core segments 2 of one type. That is, each of the plurality of core segments 2 included in the core module 11 has the same dimensions. Here, dimensional differences of about ±3% between the core segments 2 due to dimensional tolerances at the time of manufacturing are ignored. The dimensions of each of the plurality of core segments 2 being the same includes the case where there are dimensional differences of about ±3%. In the second modification, in which the core segments 1 and the core segments 3 are not used, the number of types of components is reduced as compared with the case illustrated in FIGS. 4 to 6. According to the first modification and the second modification, the core module 11 is reduced in the number of types of components, and thus can be improved in productivity and reduced in manufacturing cost.

In FIGS. 7 and 8, the width of the core segments 2 in the X-axis direction is larger than the width of the legs of the base core 7 in the X-axis direction. The core segments 2 located above the legs are disposed to protrude from the legs in the X-axis direction. That is, the area of the surfaces of the core segments 2 connected to the legs is larger than the area of the surfaces of the legs connected to the core segments 2. Consequently, the coil apparatus 12 can reduce leakage flux in gaps between the legs and the core segments 2. The width of the core segments 2 in the X-axis direction may be the same as the width of the legs of the base core 7 in the X-axis direction. The area of the surfaces of the core segments 2 connected to the legs may be the same as the area of the surfaces of the legs connected to the core segments 2. Also in this case, the coil apparatus 12 can reduce leakage flux in gaps between the legs and the core segments 2.

Figure 9:
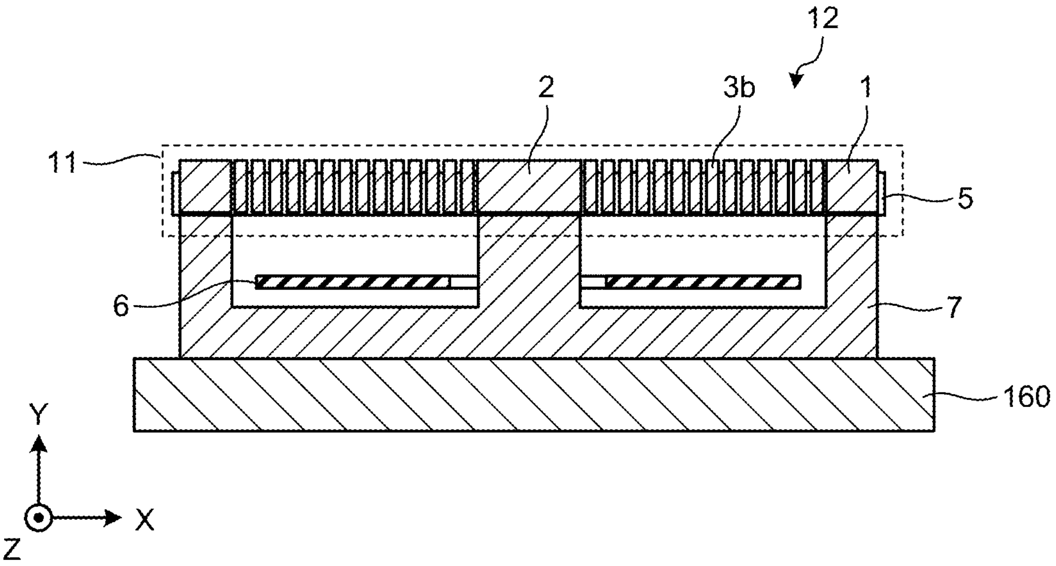
FIG. 9 is a diagram illustrating a third modification of the core module included in the coil apparatus according to the first embodiment.

The core module 11 may use core segments having a smaller width in the X-axis direction than the core segments 3. FIG. 9 is a diagram illustrating a third modification of the core module included in the coil apparatus according to the first embodiment. In the third modification illustrated in FIG. 9, the core module 11 is configured using a plurality of sheet-shaped core segments 3*b* having a smaller width in the X-axis direction than the core segments 3, in place of the core segments 3. The core module 11 can distribute core gaps in the magnetic paths 9 among more gaps as compared with the case illustrated in FIGS. 4 to 6. According to the third modification, the core module 11 can reduce loss in the coil unit 6 by the reduction of leakage flux.

As the core segments 3*b*, a low-loss ferrite core used in a small planar transformer can be used. Such a ferrite core is distributed in large quantities in the market, and thus is low-cost and easy to procure. The core module 11, in which the core segments 3*b* are used, can be stabilized in component procurement and reduced in cost.

Figure 10:
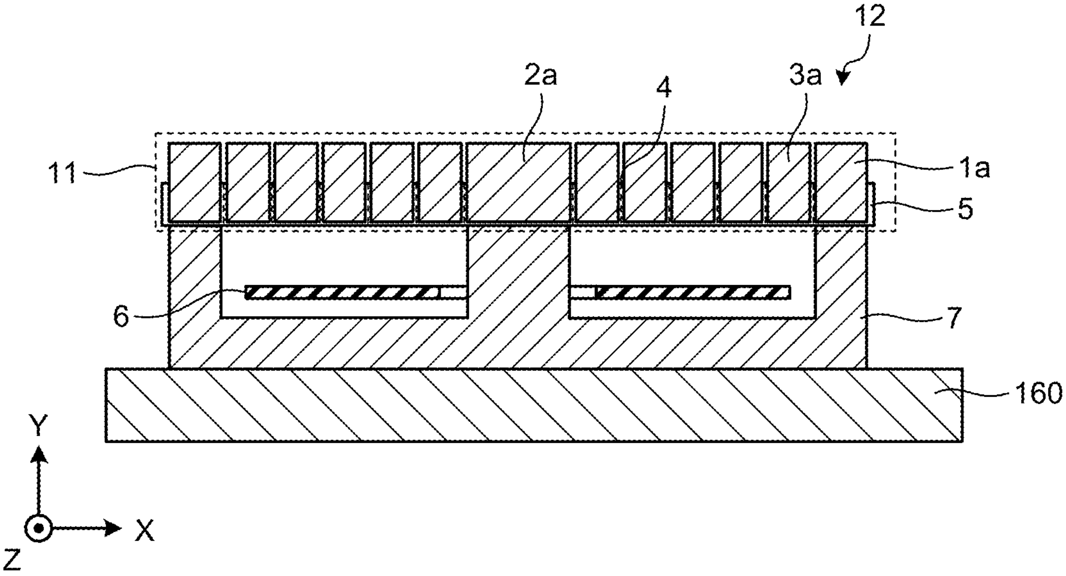
FIG. 10 is a diagram illustrating a fourth modification of the core module included in the coil apparatus according to the first embodiment.

The core module 11 may be changed in the dimensions of the core segments 1, 2, and 3 from those illustrated in FIGS. 4 to 6. The dimensions of the core segments 1, 2, and 3 constituting the core module 11 are not specified dimensions, and may be various dimensions. FIG. 10 is a diagram illustrating a fourth modification of the core module included in the coil apparatus according to the first embodiment. In the fourth modification illustrated in FIG. 10, the core module 11 includes a plurality of core segments 1*a*, 2*a*, and 3*a*. The height of the core segments 1*a*, 2*a*, and 3*a* in the Y-axis direction is higher than the height of the core segments 1, 2, and 3 in the Y-axis direction. The advantages of the configuration illustrated in FIG. 10 will be described later. The thickness of the core segments 1*a*, 2*a*, and 3*a* in the Y-axis direction, which is the height direction, is larger than the thickness of thin-walled portions of the base core 7. In the base core 7, the thin-walled portions are the outer legs 7*e* illustrated in FIG. 4. In the configurations illustrated in FIGS. 7 and 8, the core segments 2*a* and 3*a* as in the fourth modification may be provided instead of the core segments 2 and 3.

Next, the case 5 and the divider plates 4 illustrated in FIGS. 4 to 6 will be described. The divider plates 4 separate adjacent core segments of the plurality of core segments 1, 2, and 3 from each other. The case 5 holds the plurality of core segments 1, 2, and 3 and the plurality of divider plates 4. The case 5 includes the divider plates 4 that are components formed separately from the case 5.

The case 5 has an I shape that allows the plurality of core segments 1, 2, and 3 to be aligned in the X-axis direction. The divider plates 4 divide the interior of the case 5 to form, with the case 5, spaces in which the core segments 1, 2, and 3 are disposed separately. The divider plates 4 may be of any size as long as they fit in the case 5. The area of the YZ plane of the divider plates 4 is equal to the area of the case 5 in the Y- and Z-directions or about half the area of the case 5 in the Y- and Z-directions. Gaps are formed in the magnetic paths 9 by the divider plates 4 and the case 5. In the following description, the gaps formed in the magnetic paths 9 may be referred to as core gaps.

The length of each core gap in the direction of the magnetic paths 9 is set so that the sum total gap length agrees with a length determined by design. The sum total gap length is the length of the core gaps in the direction of the magnetic paths 9 that is the sum of the lengths of all the core gaps provided at the base core 7 and the core module 11. Core gaps with the Y-axis direction as the length direction are formed between the core module 11 and the outer legs 7*e* and between the core module 11 and the center leg 7*f*. Core gaps with the X-axis direction as the length direction are formed in the core module 11.

The relative magnetic permeability of a ferrite core is about 1500 to 4000. The sum total length of the core gaps is set to about 1 mm to 30 mm. The sum total length of the core gaps is adjusted so that a desired inductance value is obtained. Magnetic flux leaking from the core gaps can interlink with the coil unit 6 disposed adjacent to the core gaps, inducing eddy currents in the coil unit 6. Eddy currents flowing through the coil unit 6 cause loss in the coil unit 6. Leakage flux is reduced by reducing length per core gap. Specifically, the length of each core gap is desirably 1 mm or less. The divider plates 4 and the case 5 use a thin-walled material that can provide core gaps of such a length.

A non-magnetic material such as a resin is used as the material of the divider plates 4 and the case 5. Among resins, a liquid crystal polymer (LCP) or the like is suitable as the material of the divider plates 4 and the case 5. The LCP can form a thin wall of about 0.5 mm, has good dimensional accuracy, and is suitable for processing of complicated shapes, and thus is suitable as the material of the divider plates 4 and the case 5. The LCP has excellent heat resistance. Even when the core temperature reaches a high temperature of about 120 degrees Celsius, the LCP does not cause changes such as softening. Since the divider plates 4 and the case 5 are thin-walled, the amount of the material used in the processing of the divider plates 4 and the case 5 is reduced accordingly. Consequently, even when the LCP, which is expensive among resins, is used, the core module 11 can prevent an increase in cost. As a resin, other than the LCP, polyethylene terephthalate (PET), polybutylene terephthalate (PBT), polypropylene (PP), polyphenylene sulfide (PPS), or the like may be used.

Injection molding is used as a method for processing the divider plates 4 and the case 5. Injection molding is excellent in cost and dimensional accuracy, and is also suitable for processing of complicated shapes. As a method for processing the divider plates 4 and the case 5, extrusion molding, compression molding, or additional processing by a 3D printer may be used.

Of the case 5, portions between the core segments 1 and the outer legs 7*e* and a portion between the core segment 2 and the center leg 7*f* are portions to form core gaps, and thus are desirably thin-walled. On the other hand, the other portions of the case 5 are not portions to form core gaps, and thus do not need to be thin-walled. Portions of the case 5 other than portions to form core gaps may be formed with a thickness that can secure the strength of the case 5.

Figure 11:
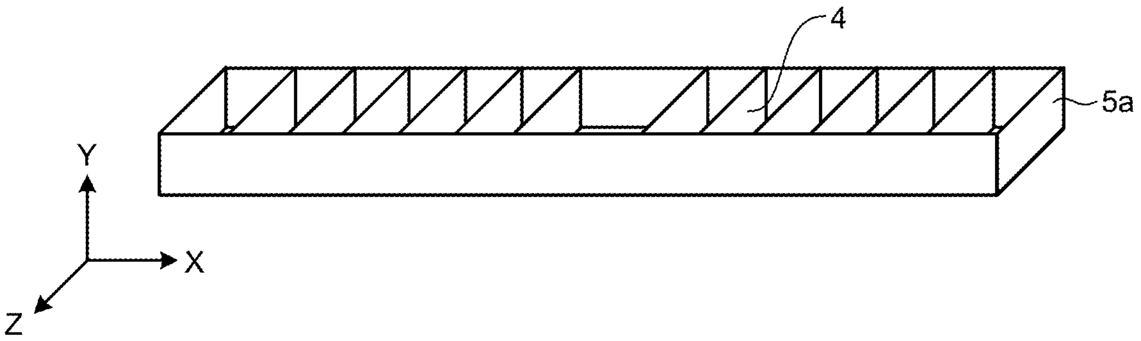
FIG. 11 is a diagram illustrating a first modification of a case included in the core module illustrated in FIGS. 4 to 6.

FIG. 11 is a diagram illustrating a first modification of a case included in the core module illustrated in FIGS. 4 to 6. A case 5*a* of the first modification illustrated in FIG. 11 includes the divider plates 4 in the case 5*a*. That is, the case 5*a* is a component molded in one piece including the divider plates 4. The core segments 1, 2, and 3 are disposed between the divider plates 4, separately. In this case, it is not necessary to purchase a mold for processing the divider plates 4 in addition to a mold for processing the case 5*a*. Thus, the core module 11 can reduce manufacturing cost.

Figure 12:
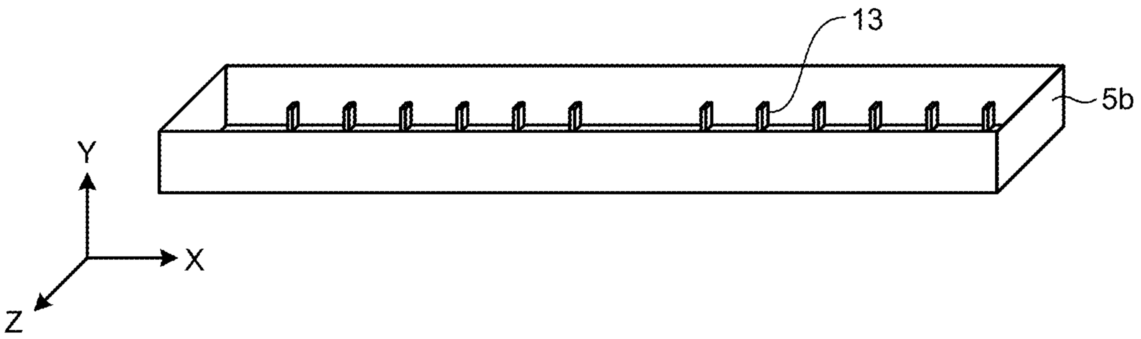
FIG. 12 is a diagram illustrating a second modification of a case included in the core module illustrated in FIGS. 4 to 6.
Figure 13:
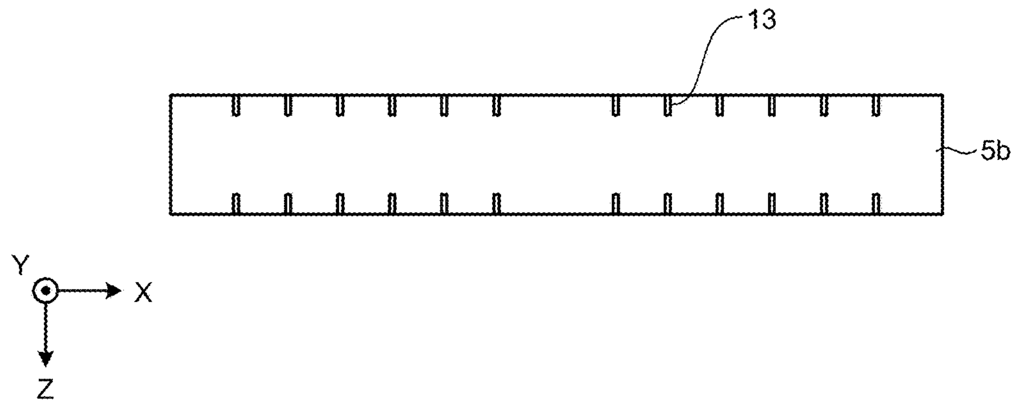
FIG. 13 is a top view of the case illustrated in FIG. 12.

The core module 11 only needs to be able to provide a desired gap length, and the case 5 need not be provided with the divider plates 4. FIG. 12 is a diagram illustrating a second modification of a case included in the core module illustrated in FIGS. 4 to 6. FIG. 13 is a top view of the case illustrated in FIG. 12. A case 5*b* of the second modification illustrated in FIGS. 12 and 13 includes ribs 13 for positioning each of the plurality of core segments 1, 2, and 3 in the X-axis direction, in place of the divider plates 4 included in the case 5*a* illustrated in FIG. 11. The core segments 1, 2, and 3 are disposed between the ribs 13, separately. Also in this case, since it is not necessary to purchase a mold for processing the divider plates 4, the core module 11 can reduce manufacturing cost. Further, the amount of material required to form the ribs 13 is smaller than the amount of material required to form the divider plates 4, and thus the case 5*b* can reduce manufacturing cost as compared with the case 5*a* provided with the divider plates 4. For the case 5*a* illustrated in FIG. 11, the larger the case 5*a,* the more likely portions of the case 5*a* where the divider plates 4 are provided are to be warped. Since the case 5*b* is not provided with the divider plates 4, such warpage does not occur.

In the first embodiment, the core module 11, in which the core segments 1, 2, and 3 are disposed in the case 5, holds the core segments 1, 2, and 3 together by the case 5. Therefore, an increase in the number of core segments 1, 2, and 3 provided in the core module 11 rarely leads to a deterioration in the productivity of the core module 11. In the core module 11, the core segments 1, 2, and 3 are inserted into the spaces into which the interior of the case 5 is divided, to be held. No adhesive is used to hold the core segments 1, 2, and 3. Thus, the core module 11 can eliminate the concern that cracks may occur in the core segments 1, 2, and 3 due to the difference in the coefficient of linear expansion between the core segments 1, 2, and 3 and an adhesive.

During the production of the core module 11, the sum total gap length may vary due to the dimensional tolerances of the plurality of core segments 1, 2, and 3, the divider plates 4, and the case 5. Variations in the sum total gap length affect variations in inductance value. Such dimensional tolerances generally have a normal distribution. The core module 11 is provided with the plurality of core segments 1, 2, and 3 and the divider plates 4. It is statistically impossible that all of them have a large error of, for example, $\pm 3\sigma$ to $\pm 6\sigma$ with respect to average dimensions. As the number of core segments 1, 2, and 3 and the number of divider plates 4 provided in the core module 11 increase, the sum total gap length approaches the sum total gap length when the dimensions are average values. Therefore, the core module 11, in which a core is divided into the plurality of core segments 1, 2, and 3, can reduce variations in the sum total gap length, and can increase the accuracy of the inductance value.

The above content will be quantitatively explained using a core as an example. The dimensions of a core have percentage errors. If an average dimension is 150 mm and the dimensional tolerance of an unpolished core is 1%, the dimensional tolerance is ±1.5 mm. For a 30-mm core segment 3, the 1%-dimensional tolerance is ±0.3 mm. When a 150-mm core is formed using five 30-mm core segments 3, a dimensional tolerance of ±0.3 mm, which is 1% of 30 mm, takes the square root of sum of squares of the five core segments 3. Thus, for the total length of the five core segments 3, the dimensional tolerance can be reduced to ±0.67 mm. This corresponds to 45% of the dimensional tolerance of the 150-mm core, and the dimensional tolerance can be reduced by 55%. Likewise, when a 150-mm core is formed using ten 15-mm core segments 3, the dimensional tolerance of the total length of the ten core segments 3 is ±0.47 mm. This corresponds to 32% of the dimensional tolerance of the 150-mm core, and the dimensional tolerance can be reduced by 68%.

Thus, the coil apparatus 12 can reduce variations in inductance value as the number of divisions of the core forming the magnetic paths 9 is increased. The coil apparatus 12 can eliminate the need for core polishing, which has conventionally been performed to reduce dimensional tolerances, and thus allows a reduction in the processing time of the core module 11 and a reduction in manufacturing cost.

Even if the core segments 1, 2, and 3 are displaced in the X-axis direction in the case 5, the sum total gap length does not change in the core module 11. Thus, even when the core segments 1, 2, and 3 are not fixed to the case 5 by an adhesive or the like, the coil apparatus 12 can reduce variations in inductance value, and can obtain stable electrical characteristics. The displacement of the core segments 1, 2, and 3 in the Z-axis direction hardly affects the inductance value if it is a displacement of about a dimensional tolerance of the case 5.

The coil apparatus 12 can reduce length per core gap as the number of core gaps increases. By shortening the core gaps, the coil apparatus 12 can reduce magnetic flux leaking from the core gaps, and can reduce eddy-current loss in the coil unit 6 disposed adjacent to the core module 11. As a result, the coil apparatus 12 can suppress the amount of heat generation. The power converter 100 can improve power efficiency.

A ferrite core is vulnerable to shock and thus can be chipped or cracked by shock. In the first embodiment, all of the core segments 1, 2, and 3 are accommodated in the case 5, so that the coil apparatus 12 can protect the core segments 1, 2, and 3 from vibration or shock. The coil apparatus 12 can reduce damage to the core segments 1, 2, and 3. If any of the core segments 1, 2, and 3 is chipped and a broken piece is produced, the broken piece having conductivity is kept in the case 5 since the core segments 1, 2, and 3 are disposed in the case 5. Thus, the power converter 100 can prevent a short-circuit failure due to the entry of a broken piece into the printed-circuit board 170 or the switching elements 111, 112, 113, and 114.

Figure 14:
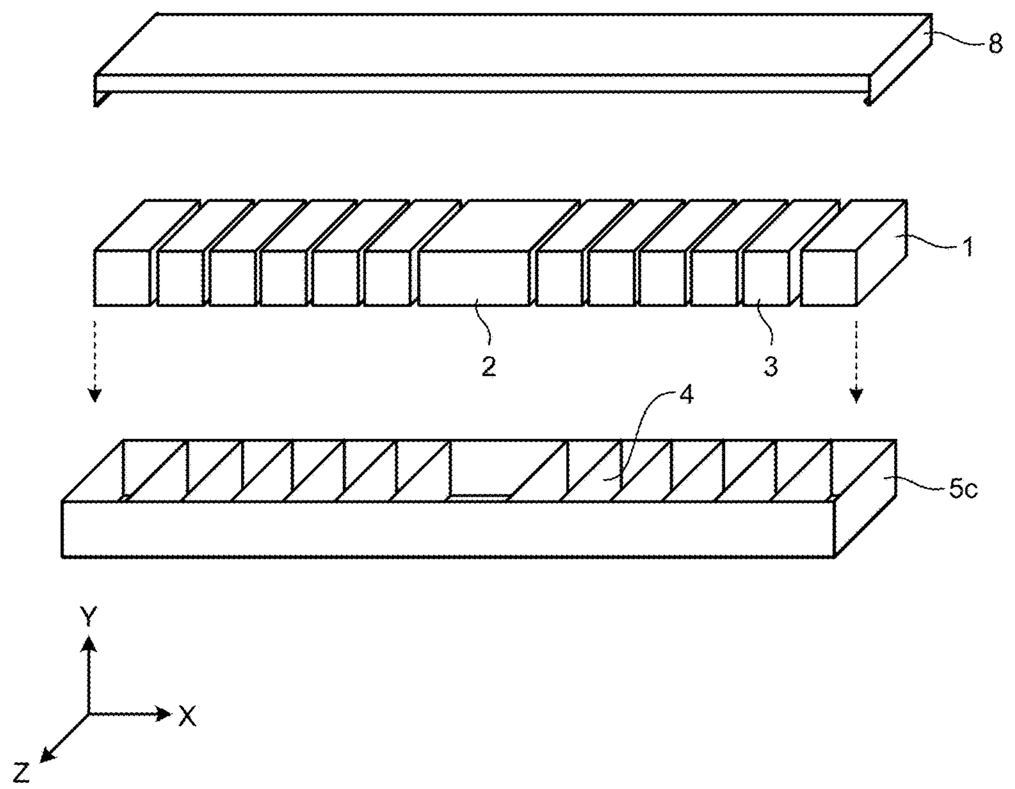
FIG. 14 is a diagram illustrating a third modification of a case included in the core module illustrated in FIGS. 4 to 6.

A lid may be provided on the top of the case 5. FIG. 14 is a diagram illustrating a third modification of a case included in the core module illustrated in FIGS. 4 to 6. To a case 5*c* of the third modification illustrated in FIG. 14, a lid 8 is attached which covers the upper part of the spaces in which the core segments 1, 2, and 3 are accommodated. FIG. 14 illustrates the case 5*c,* the core segments 1, 2, and 3, and the lid 8 in a disassembled state. The case 5*c* is the case 5*a* illustrated in FIG. 11 to which a mechanism for fitting with the lid 8 is added.

Figure 15:
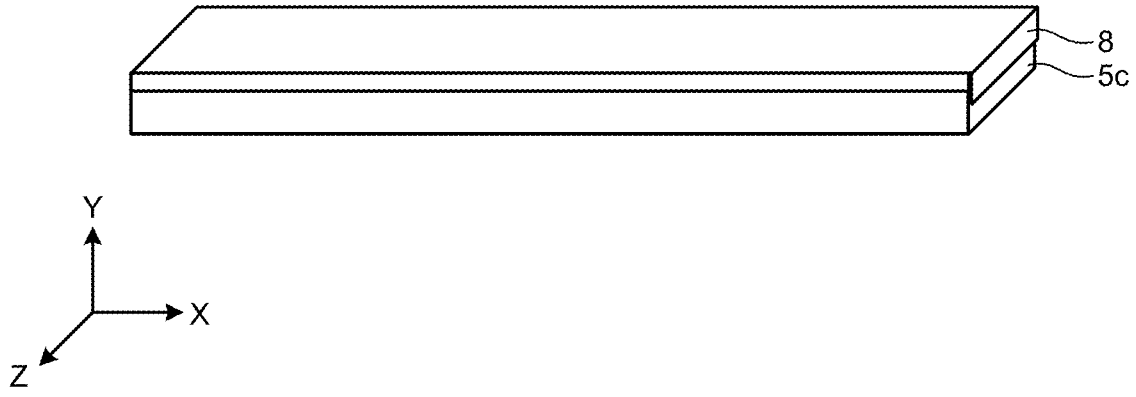
FIG. 15 is a diagram illustrating a lid attached to the case illustrated in FIG. 14.
Figure 16:
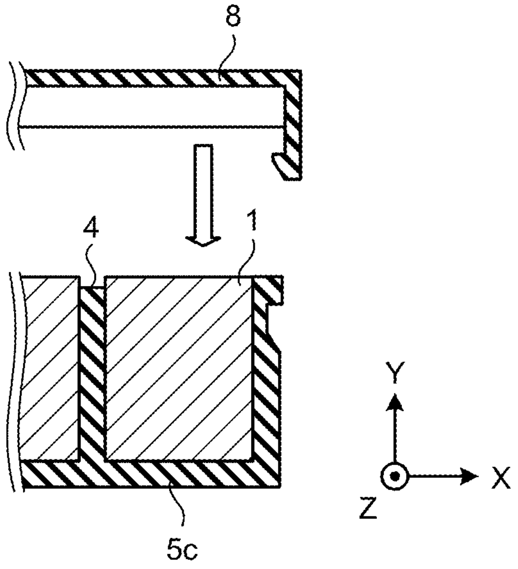
FIG. 16 is a diagram illustrating an example of a mechanism for fitting between the case and the lid illustrated in FIG. 14.

FIG. 15 is a diagram illustrating the lid attached to the case illustrated in FIG. 14. FIG. 16 is a diagram illustrating an example of the mechanism for fitting between the case and the lid illustrated in FIG. 14. The lid 8 and the case 5*c* are provided with the mechanism of a snap-fit shape or the like to increase fitting strength.

By the provision of the lid 8 on the case 5*c,* if any of the core segments 1, 2, and 3 is damaged, the coil apparatus 12 can prevent a broken piece produced by the damage from flying to the outside of the case 5*c*. Further, by the mechanism for increasing the fitting strength provided to the lid 8 and the case 5*c,* the core module 11 can increase the strength of fixing the core segments 1, 2, and 3. Consequently, the core module 11 can improve vibration resistance. The lid 8 may be attached to the case 5 illustrated in FIGS. 4 to 6, or may be attached to the case 5*b* illustrated in FIG. 12.

Figure 17:
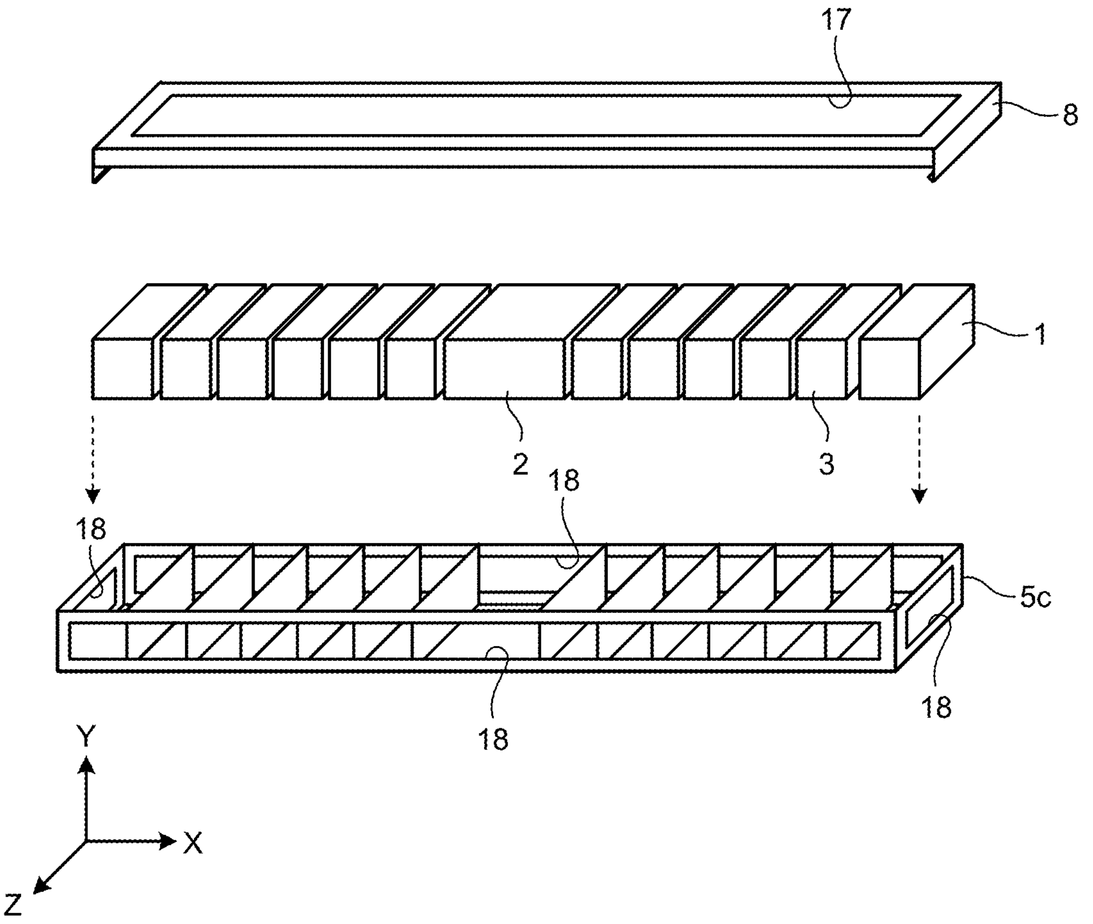
FIG. 17 is a diagram illustrating a modification of the case and the lid illustrated in FIG. 14.

FIG. 17 is a diagram illustrating a modification of the case and the lid illustrated in FIG. 14. An opening 17 is formed in the top surface of the lid 8 illustrated in FIG. 17. An opening 18 is formed in each of the four side surfaces of the case 5*c* illustrated in FIG. 17. Heat inside the case 5*c* with a state the lid 8 attached is released to the outside of the case 5*c* through the openings 17 and 18. Consequently, the coil apparatus 12 can be improved in heat dissipation. The provision of the openings 17 and 18 allows a reduction in the amount of the material used to manufacture the lid 8 and the case 5*c*. The positions, shapes, and numbers of the openings 17 and 18 can be set as desired so as to prevent the core segments 1, 2, and 3 in the case 5*c* from passing through the openings 17 and 18 and falling off. Suffice for the case 5*c* and the lid 8 to have at least the opening 17 in the lid 8 or the openings 18 in the case 5*c*.

Figure 18:
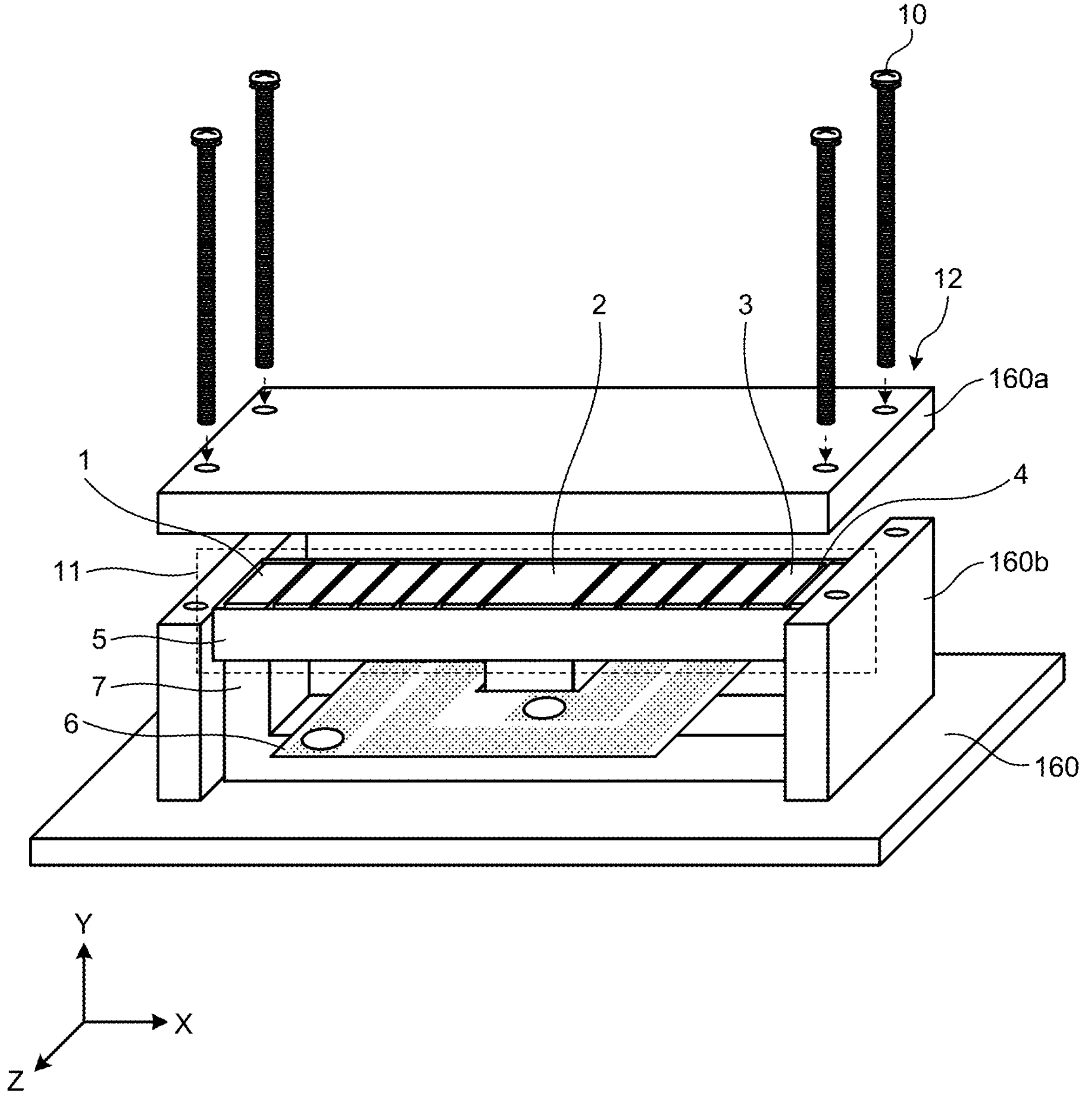
FIG. 18 is a diagram illustrating a first example of a configuration for installing the coil apparatus according to the first embodiment.

FIG. 18 is a diagram illustrating a first example of a configuration for installing the coil apparatus according to the first embodiment. The coil apparatus 12 is installed in the metal housing 160 with the base core 7 in contact with the metal housing 160. Heat-conductive grease or a heat dissipation sheet may be sandwiched between the base core 7 and the metal housing 160. The metal housing 160 has a configuration for fixing the coil apparatus 12 and also serves as a cooler. The coil apparatus 12 is assembled with the base core 7 thermally coupled to the metal housing 160. This allows the coil apparatus 12 to be cooled using the metal housing 160.

A metal plate 160*a* is a plate material that covers the upper part of the coil apparatus 12. Two metal blocks 160*b* are columnar structures that support the metal plate 160*a* on the metal housing 160. The metal blocks 160*b* are erected at positions adjacent to the coil apparatus 12 in the X-axis direction in the metal housing 160. Screws 10 fix the metal plate 160*a* and the metal blocks 160*b* to the metal housing 160. The configuration for installing the coil apparatus 12 includes the metal housing 160, the metal plate 160*a*, and the metal blocks 160*b*.

Figure 19:
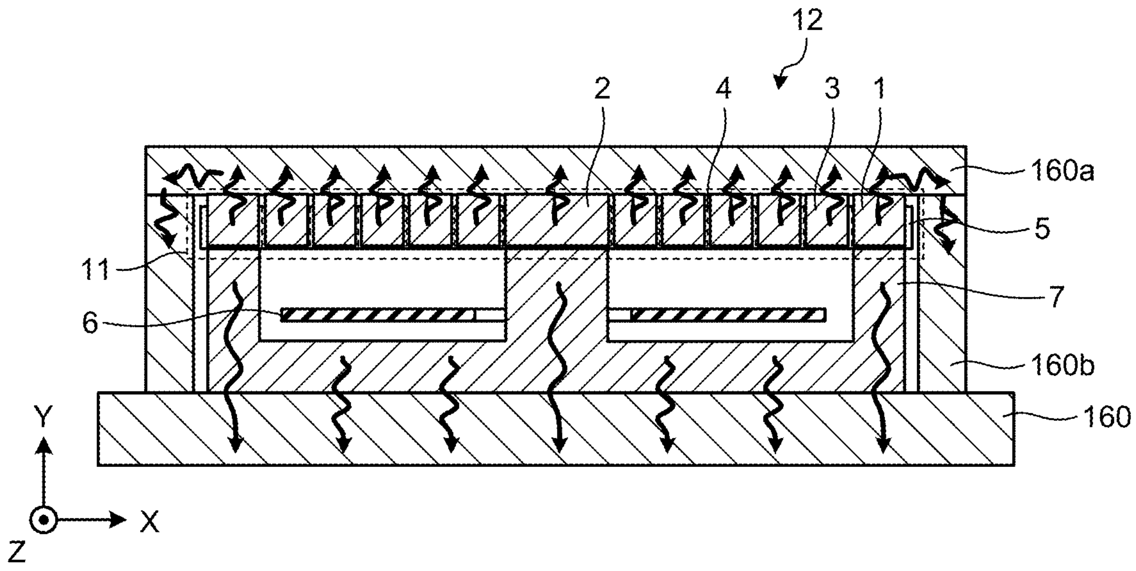
FIG. 19 is a cross-sectional view illustrating the coil apparatus and the configuration for installing the coil apparatus illustrated in FIG. 18 in an assembled state.

FIG. 19 is a cross-sectional view illustrating the coil apparatus and the configuration for installing the coil apparatus illustrated in FIG. 18 in an assembled state. The metal plate 160*a* has a configuration for fixing the coil apparatus 12, and also serves as a cooler. The coil apparatus 12 is assembled with the core module 11 thermally coupled to the metal plate 160*a*. This allows the coil apparatus 12 to be cooled using the metal plate 160*a*.

Heat generated in the base core 7 is mainly transferred to the metal housing 160. Heat generated in the core module 11 is mainly transferred to the metal plate 160*a*. The heat transferred to the metal plate 160*a* is transferred to the metal housing 160 via the metal blocks 160*b*. Arrows illustrated in FIG. 19 illustrate how the heat is transferred. The coil apparatus 12, in which the base core 7 and the core module 11 are thermally joined to the coolers, separately, can accelerate heat dissipation from the coil apparatus 12.

Figure 20:
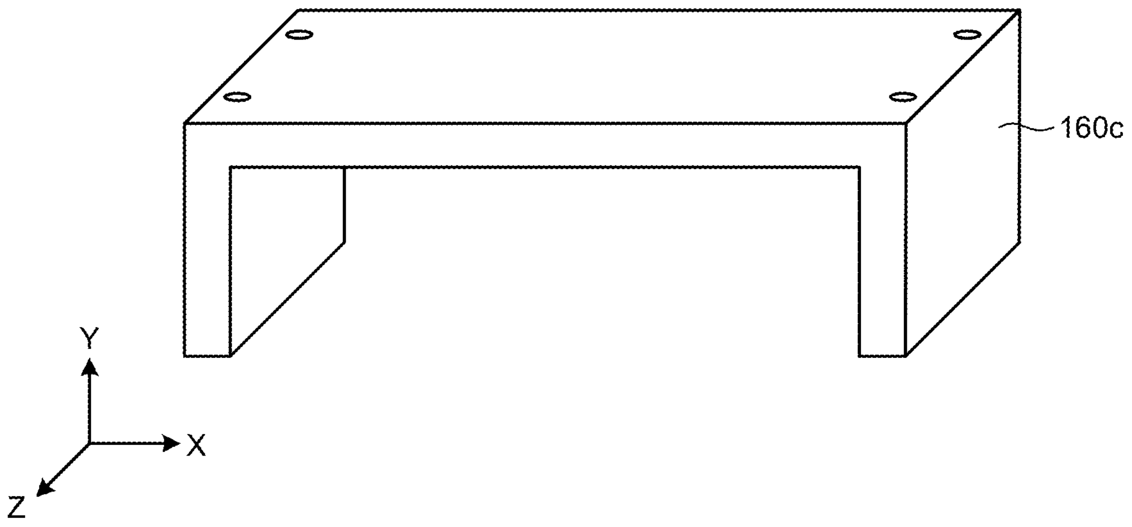
FIG. 20 is a diagram illustrating a second example of a configuration for installing the coil apparatus according to the first embodiment.

The metal plate 160*a* and the metal blocks 160*b* illustrated in FIGS. 18 and 19 are separate components. The coil apparatus 12 may be fixed by one structure made of a metal material instead of by the metal plate 160*a* and the metal blocks 160*b*. FIG. 20 is a diagram illustrating a second example of a configuration for installing the coil apparatus according to the first embodiment. A metal structure 160*c* according to the second example is provided in place of the metal plate 160*a* and the metal blocks 160*b*. The metal structure 160*c* has the same shape as the combination of the metal plate 160*a* and the metal blocks 160*b*, and has a U shape. Also in this case, the coil apparatus 12 is fixed to be able to accelerate heat dissipation.

Figure 21:
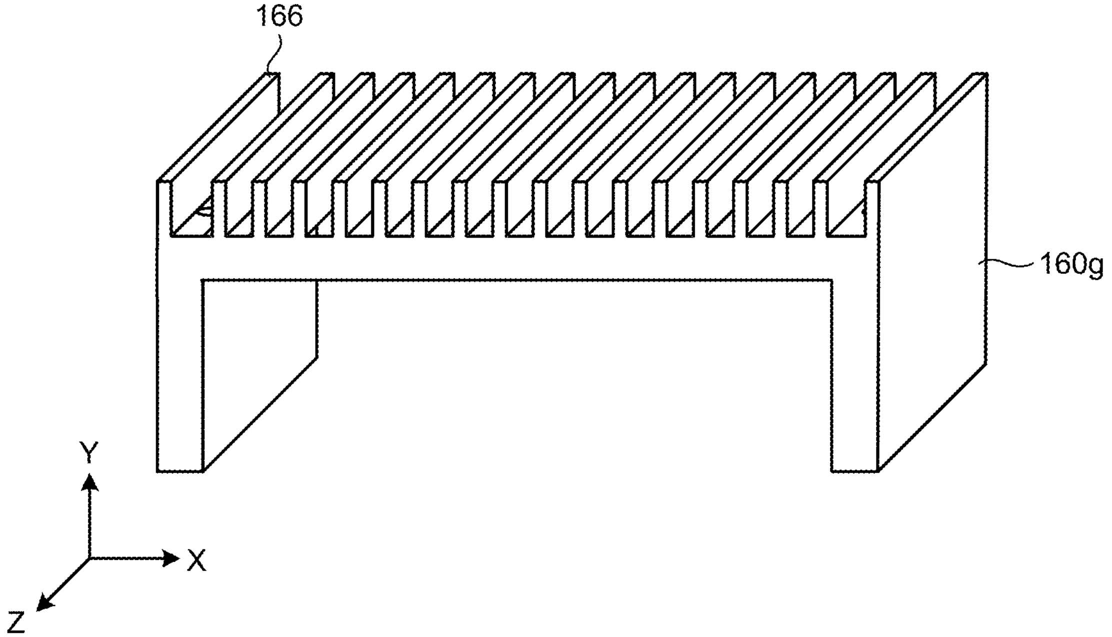
FIG. 21 is a diagram illustrating a third example of a configuration for installing the coil apparatus according to the first embodiment.

The metal structure 160*c* may be provided with radiating fins 166. FIG. 21 is a diagram illustrating a third example of a configuration for installing the coil apparatus according to the first embodiment. A metal structure 160*g* according to the third example is the metal structure 160*c* with the radiating fins 166 added to the top surface. By fixing the coil apparatus 12 with the metal structure 160*g* provided with the radiating fins 166, heat dissipation from the coil apparatus 12 is further accelerated. Radiating fins may be added to the top surface of the metal plate 160*a* described above.

Figure 22:
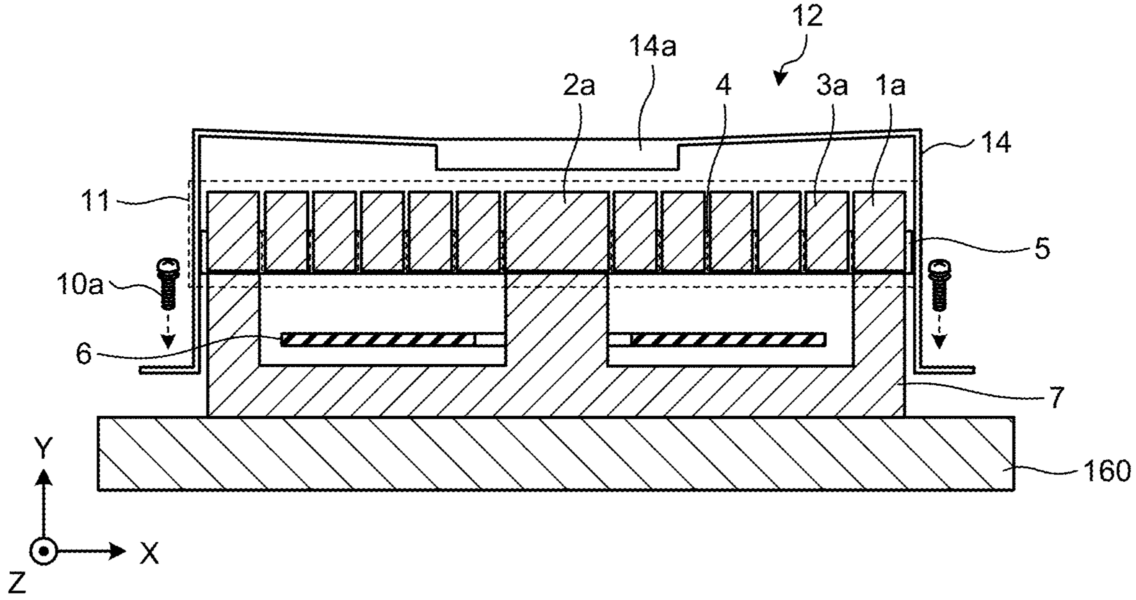
FIG. 22 is a diagram illustrating a fourth example of a configuration for installing the coil apparatus according to the first embodiment.
Figure 23:
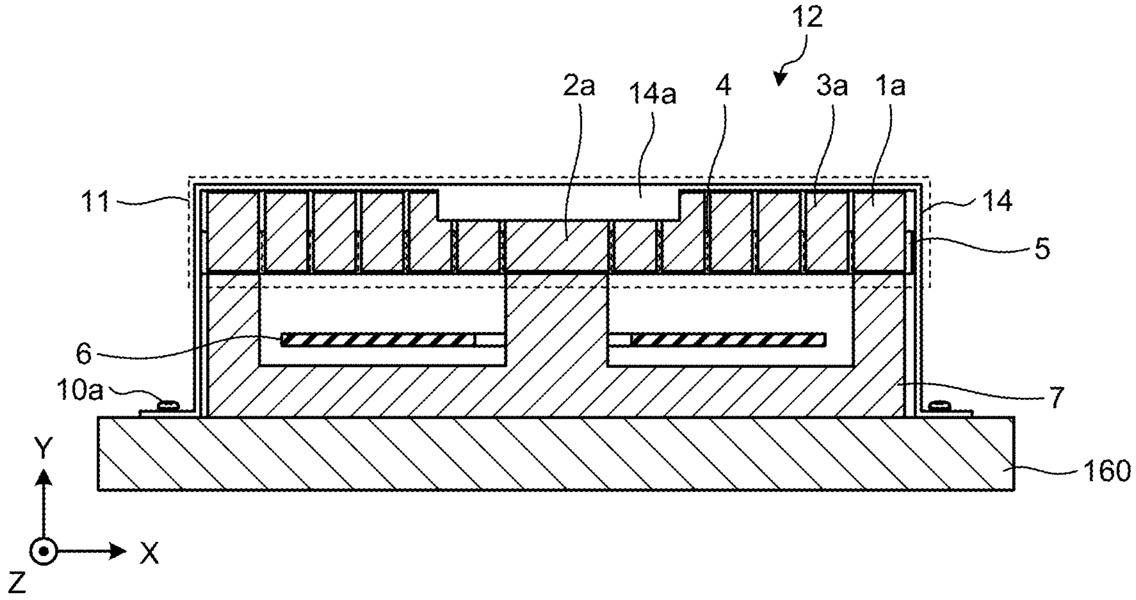
FIG. 23 is a diagram illustrating the fourth example of the configuration for installing the coil apparatus according to the first embodiment.

FIGS. 22 and 23 are diagrams illustrating a fourth example of a configuration for installing the coil apparatus according to the first embodiment. FIGS. 22 and 23 illustrate a configuration example when it is not necessary to transfer the heat of the core module 11 to the metal housing 160. In the fourth example, a metal spring 14 for fixing the coil apparatus 12 to the metal housing 160 is provided. FIG. 22 illustrates the metal spring 14 when being attached to the metal housing 160. FIG. 23 illustrates a state the metal spring 14 is attached to the metal housing 160. FIGS. 22 and 23 illustrate the side faces of the metal spring 14 and screws 10*a*, and the cross sections of components other than the metal spring 14 and the screws 10*a*.

The metal spring 14 is a metal plate of about 0.1 mm to 1 mm in thickness and has elasticity. The metal spring 14 is fixed to the metal housing 160 by the screws 10*a*. The metal spring 14 is provided with projections 14*a* for fixing the position of the core module 11 in the Z-axis direction. The coil apparatus 12 is fixed in a state of being pressed against the metal housing 160 by the elasticity of the metal spring 14. The coil apparatus 12 is limited in displacement in the Z-axis direction by the projections 14*a* to be fixed in position in the metal housing 160.

A typical example of the case where it is not necessary to transfer the heat of the core module 11 to the metal housing 160 is the case where a low-loss ferrite core is used as the core segments 1*a*, 2*a*, and 3*a* as illustrated in FIG. 10. By using the low-loss ferrite core, the coil apparatus 12 can reduce loss in the core segments 1*a*, 21, and 3*a*. The size of the core segments 1*a*, 2*a*, and 3*a* in the Y-axis direction is set so as to increase the cross-sectional area of the magnetic paths 9 in the range of about one to two times compared with a case the core segments 1, 2, and 3 are used. The coil apparatus 12 can reduce loss in the core module 11 and reduce the amount of heat generation and the density of heat generation in the core module 11, and can suppress a temperature rise in the core module 11. The configuration illustrated in FIG. 10 eliminates the need to cool the core module 11 by placing the core module 11 in contact with the metal plate 160*a* or the metal structure 160*c* or 160*g*. Thus, in the configuration illustrated in FIG. 10, the coil apparatus 12 can be fixed using the metal spring 14. The metal spring 14 can be easily manufactured by bending thin sheet metal. By using the metal spring 14, the power converter 100 allows a reduction in manufacturing cost and reductions in the size and weight of the power converter 100.

Figure 24:
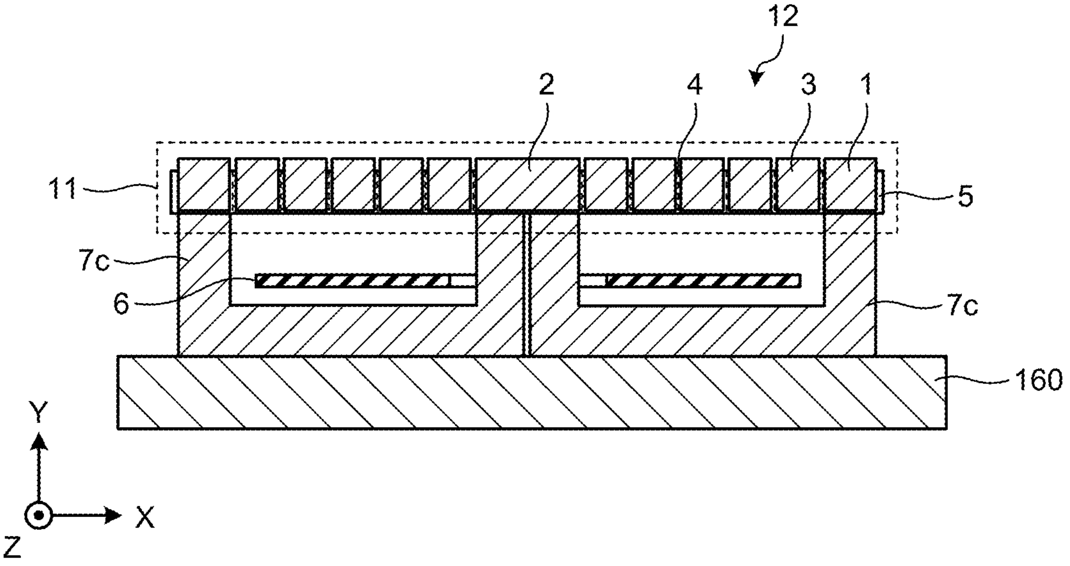
FIG. 24 is a diagram illustrating a first modification of base cores included in the coil apparatus according to the first embodiment.

The coil apparatus 12 may include a base core 7 other than the E-shaped core. FIG. 24 is a diagram illustrating a first modification of base cores included in the coil apparatus according to the first embodiment. In the first modification illustrated in FIG. 24, the coil apparatus 12 includes two base cores 7*c* that are U-shaped cores, instead of the E-shaped base core 7. Each U-shaped core has two legs. The shape of the base cores 7*c* is a shape that can be obtained by dividing the E-shaped base core 7 at the center in the X-axis direction.

Figure 25:
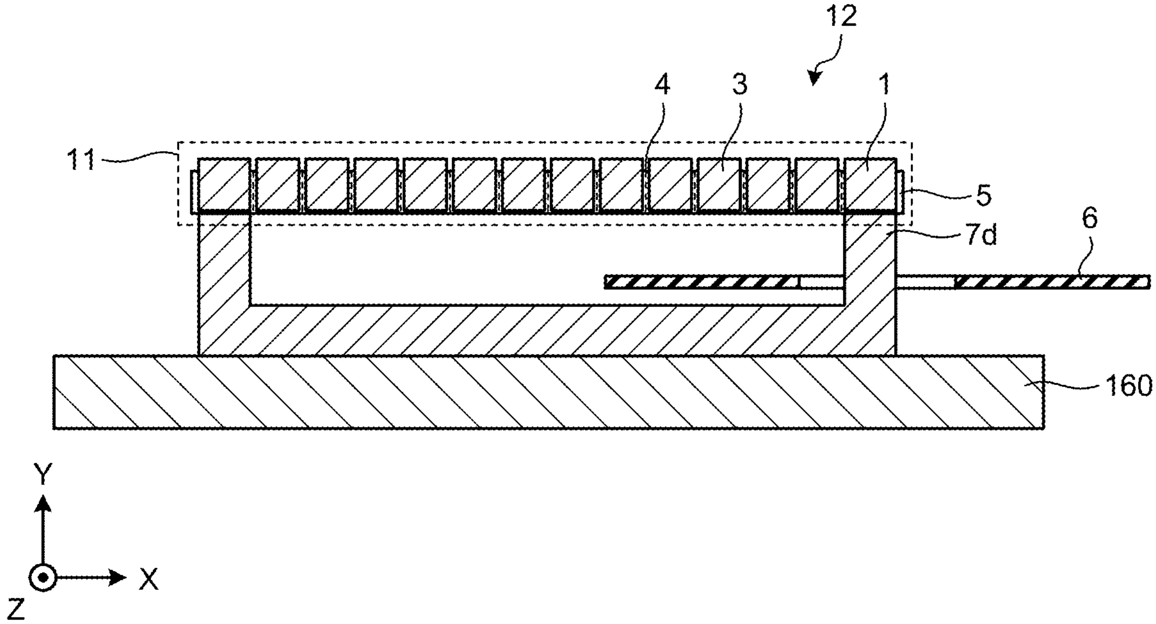
FIG. 25 is a diagram illustrating a second modification of a base core included in the coil apparatus according to the first embodiment.

FIG. 25 is a diagram illustrating a second modification of a base core included in the coil apparatus according to the first embodiment. In the second modification illustrated in FIG. 25, the coil apparatus 12 includes one base core 7*d* that is a U-shaped core, instead of the E-shaped base core 7. The coil unit 6 is installed in the coil apparatus 12 with one leg of the base core 7*d* passed through the opening of the coil unit 6.

Figure 26:
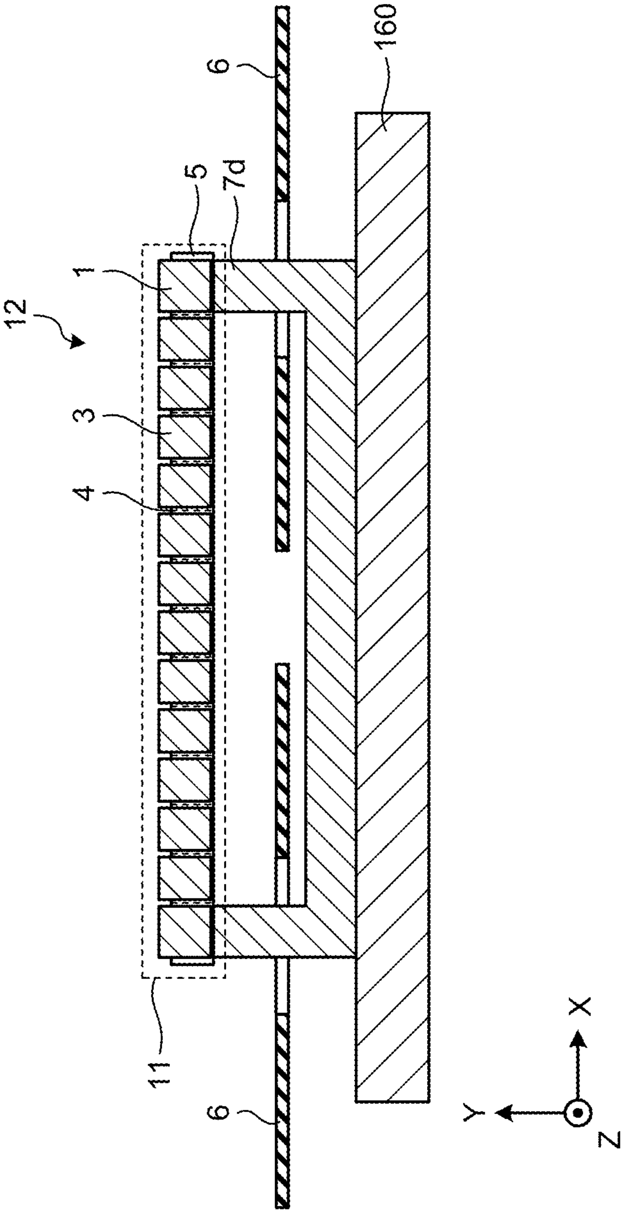
FIG. 26 is a diagram illustrating a first example in which two coil units are provided in the coil apparatus according to the first embodiment.

The coil apparatus 12 may include two or more coil units 6. FIG. 26 is a diagram illustrating a first example in which two coil units are provided in the coil apparatus according to the first embodiment. In the first example illustrated in FIG. 26, two coil units 6 are provided at one base core 7*d* that is a U-shaped core. One of the two coil units 6 is installed in the coil apparatus 12 with one leg of the base core 7*d* passed through the opening of the coil unit 6. The other of the two coil units 6 is installed in the coil apparatus 12 with the other leg of the base core 7*d* passed through the opening of the coil unit 6. The two coil units 6 are adjacent to each other in the X- and Z-directions.

Figure 27:
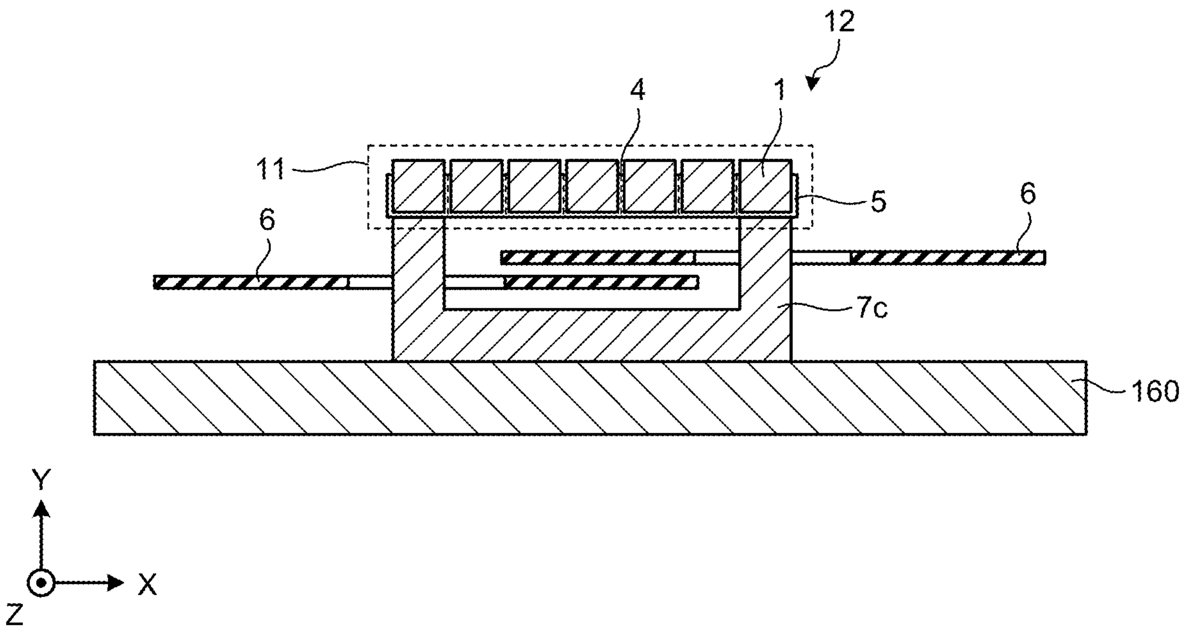
FIG. 27 is a diagram illustrating a second example in which two coil units are provided in the coil apparatus according to the first embodiment.

FIG. 27 is a diagram illustrating a second example in which two coil units are provided in the coil apparatus according to the first embodiment. In the second example illustrated in FIG. 27, two coil units 6 are provided at one base core 7*c* that is a U-shaped core. One of the two coil units 6 is installed in the coil apparatus 12 with one leg of the base core 7*c* passed through the opening of the coil unit 6. The other of the two coil units 6 is installed in the coil apparatus 12 with the other leg of the base core 7*c* passed through the opening of the coil unit 6. A part of one coil unit 6 and a part of the other coil unit 6 are adjacent to each other in the Y-axis direction.

The circuit configuration of the power converter 100 is not limited to that illustrated in FIG. 1, and may be a circuit of a system different from that of the circuit illustrated in FIG. 1. The power converter 100 is not limited to that including the resonance coil 120, the smoothing coil 151, and the transformer 130, and may be that including at least one of the single resonant coil 120, the single smoothing coil 151, and the single transformer 130. The transformer 130 includes one or more coil units 6. The resonance coil 120 and the smoothing coil 151 may also include one or more coil units 6.

According to the first embodiment, the core module 11 includes the plurality of core segments 1, 2, and 3 arranged in a row with gaps between them, so that the coil apparatus 12 can easily distribute gaps in the magnetic paths 9. By distributing gaps, the coil apparatus 12 can reduce length per gap, and can reduce leakage flux in the gaps. By the reduction of leakage flux, the coil apparatus 12 can reduce loss in the coil unit 6. Thus, the coil apparatus 12 has the effect of being able to reduce loss in the coil unit 6.

The coil apparatus 12 can use a low-loss ferrite core as the core segments 1, 2, and 3, and thus can further reduce loss in the coil unit 6. As compared with conventional techniques, the coil apparatus 12 can reduce the tolerance of the inductance value during the production of the coil apparatus 12. The coil apparatus 12 can be easily assembled, allowing an improvement in productivity. The coil apparatus 12 eliminates the need for core polishing, allowing a reduction in core procurement cost. A reduction in the production cost of the coil apparatus 12 allows a reduction in the production cost of the power converter 100. The thermal coupling between the coil apparatus 12 and the metal housing 160 allows the power converter 100 to efficiently cool the coil apparatus 12, allowing a reduction in the size of the power converter 100.

Second Embodiment

Figure 28:
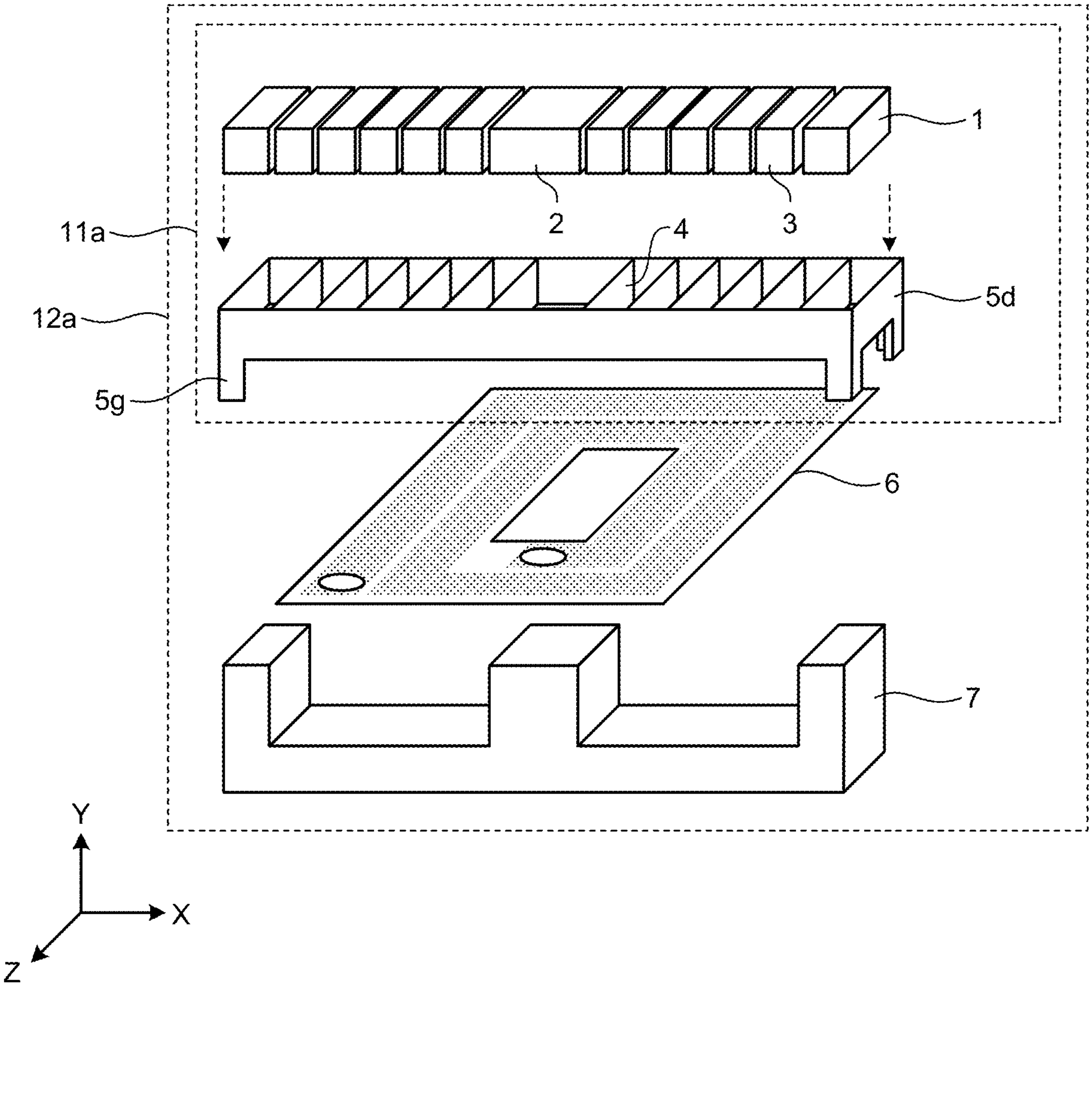
FIG. 28 is an exploded view of a coil apparatus according to a second embodiment of the present invention.
Figure 29:
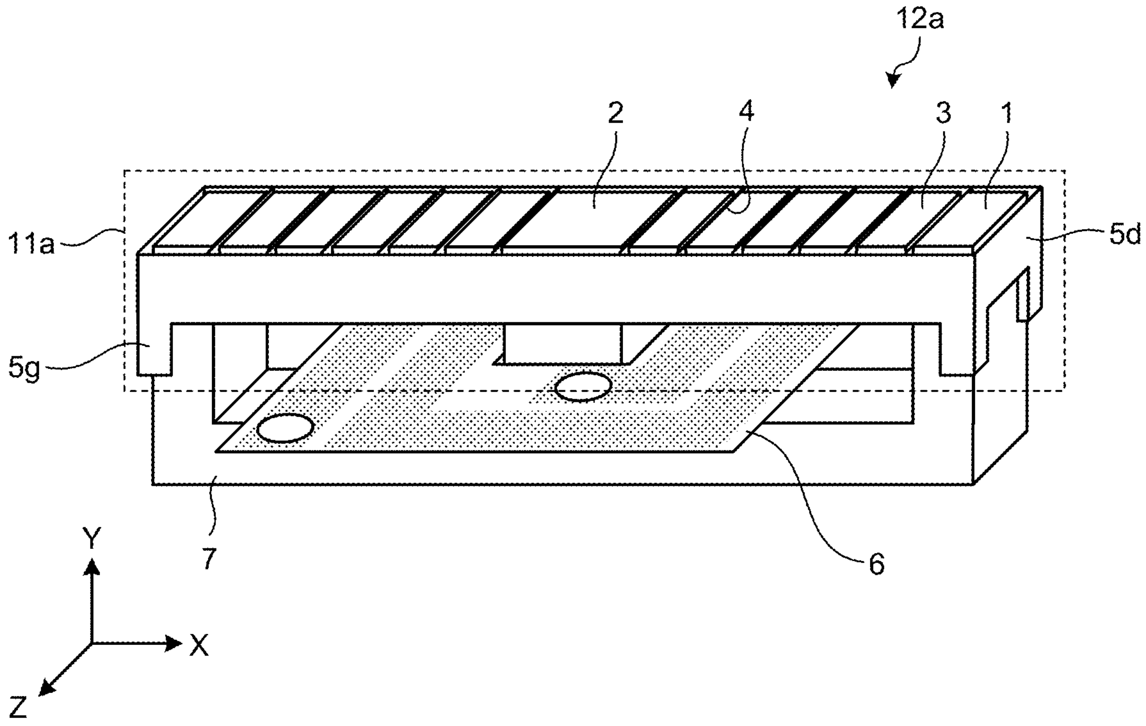
FIG. 29 is a diagram illustrating an assembled state of the coil apparatus illustrated in FIG. 28.

FIG. 28 is an exploded view of a coil apparatus according to a second embodiment of the present invention. FIG. 29 is a diagram illustrating an assembled state of the coil apparatus illustrated in FIG. 28. A case 5*d* included in a coil apparatus 12*a* according to the second embodiment have projections 5*g* for positioning a core module 11*a* relative to the base core 7. In the second embodiment, the same reference numerals are assigned to the same components as those in the first embodiment, and a configuration different from that of the first embodiment will be mainly described.

The case 5*d* is the case 5*a* illustrated in FIG. 11 to which the projections 5*g* are added. The projections 5*g* provided to the case 5*d* are ribs. The projections 5*g* are provided to extend downward at the four corners of the case 5*d* in the ZX plane. By the provision of the projections 5*g* to the case 5*d*, the coil apparatus 12*a* allows the positioning of the core module 11*a* and the base core 7 in the X-axis direction and the Z-axis direction. Thus, the coil apparatus 12*a* can facilitate assembly. Further, by the provision of the projections 5*g* to the case 5*d*, the coil apparatus 12*a* can prevent a misalignment between the core module 11*a* and the base core 7 in the X-axis direction and the Z-axis direction. The projections 5*g* may be attached to any of the case 5 illustrated in FIGS. 4 to 6, the case 5*b* illustrated in FIG. 12, the case 5*c* illustrated in FIG. 15, and the case 5*c* illustrated in FIG. 17.

Figure 30:
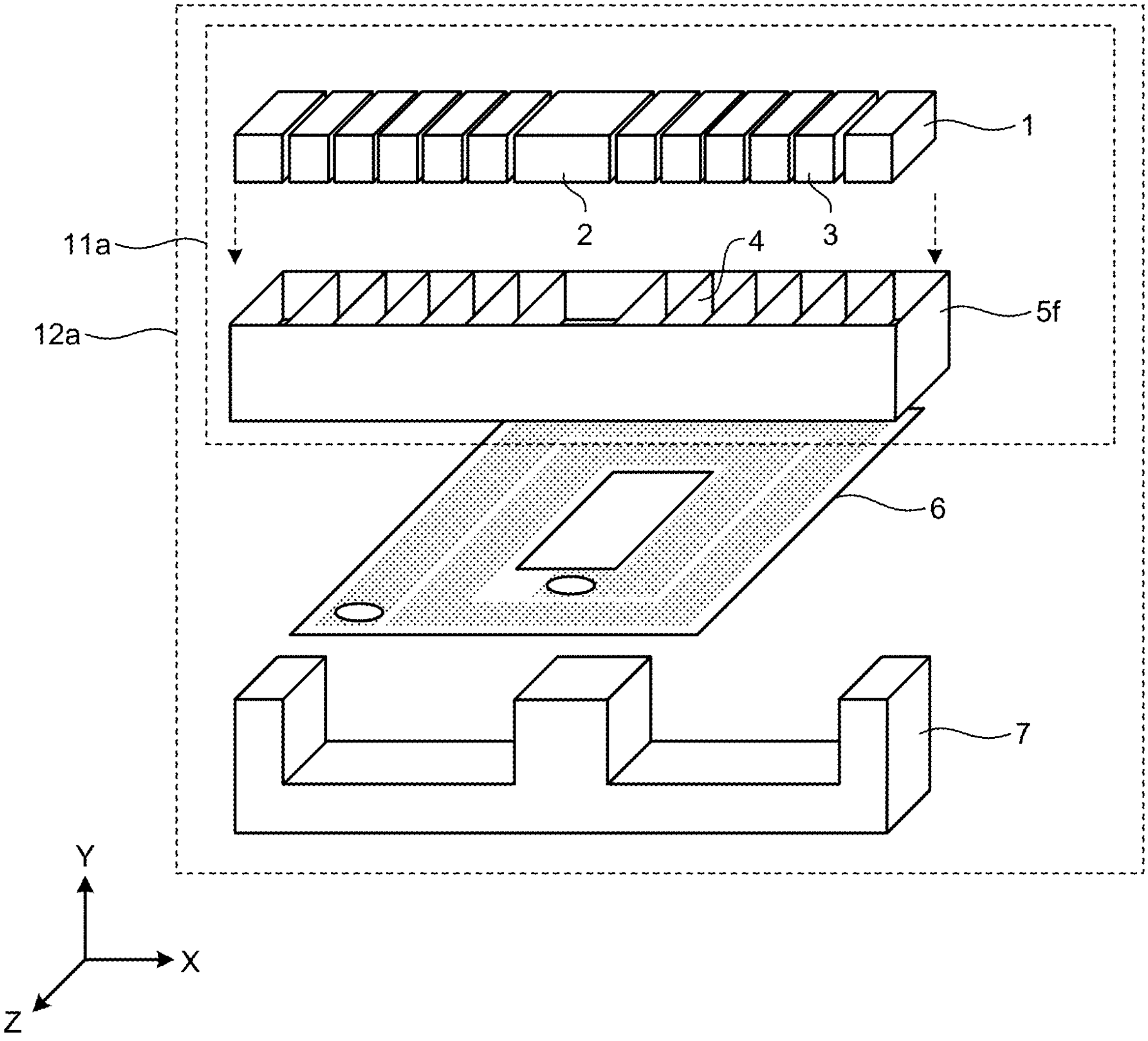
FIG. 30 is an exploded view of the coil apparatus according to a modification of the second embodiment.

FIG. 30 is an exploded view of the coil apparatus according to a modification of the second embodiment. A case 5*f* included in the coil apparatus 12*a* has four outer walls extending downward so as to be able to cover the periphery of the base core 7. Also in the modification, the coil apparatus 12*a* allows the positioning of the core module 11*a* and the base core 7, and thus can facilitate assembly. The coil apparatus 12*a* can prevent a misalignment between the core module 11*a* and the base core 7 in the X-axis direction and the Z-axis direction.

According to the second embodiment, the coil apparatus 12*a* can provide the same effects as those of the first embodiment, and is provided with the case 5*d* or the case 5*f* to be able to facilitate assembly and prevent a misalignment between the core module 11*a* and the base core 7.

By the provision of the case 5*d* or the case 5*f* in the coil apparatus 12*a*, the power converter 100 can prevent a misalignment between the core module 11*a* and the base core 7 when vibration or shock is applied to the power converter 100. The coil apparatus 12*a* can maintain electrical characteristics by preventing a misalignment between the core module 11*a* and the base core 7. The power converter 100 can be improved in quality since the electrical characteristics of the coil apparatus 12*a* can be maintained.

Third Embodiment

Figure 31:
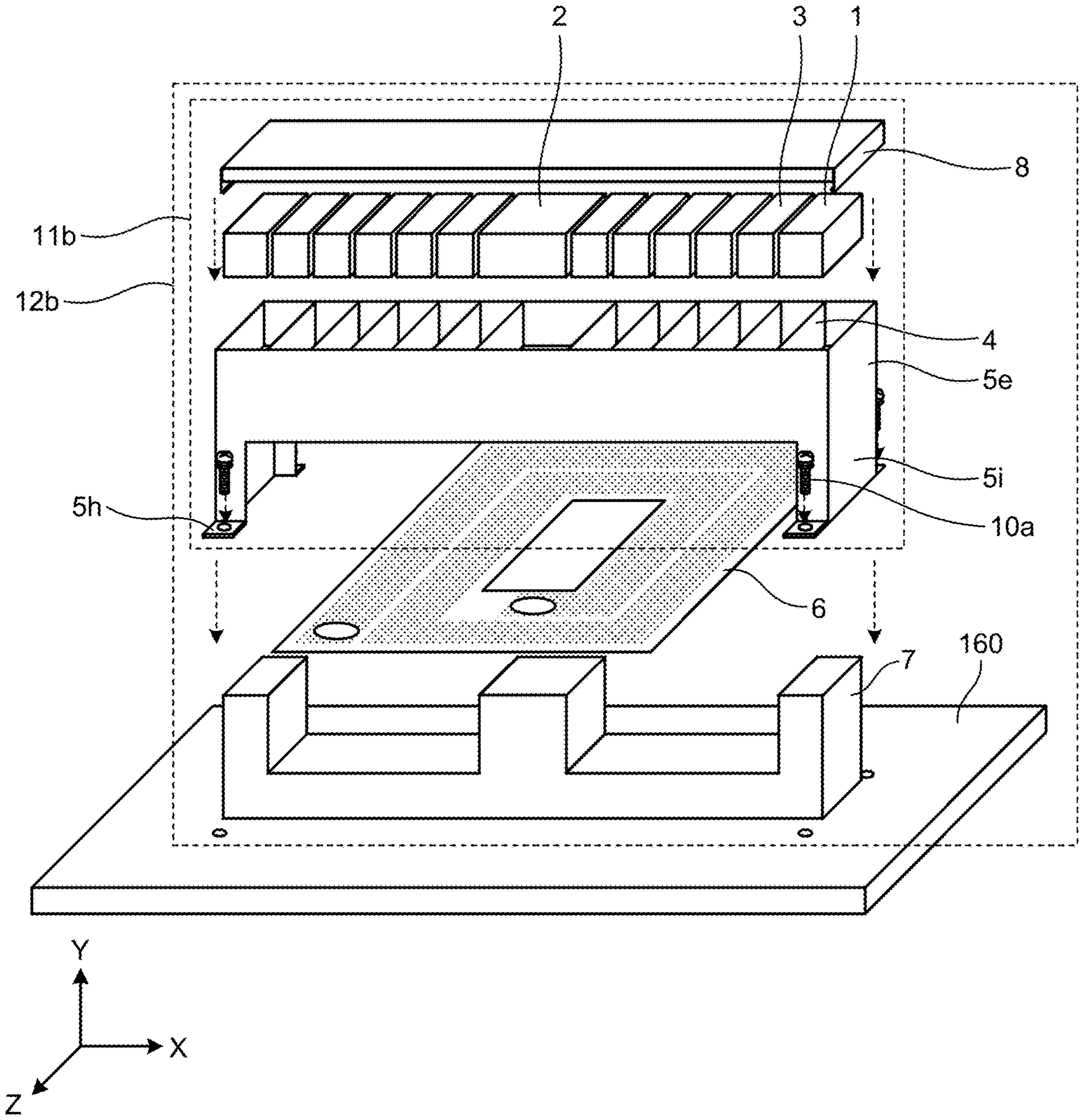
FIG. 31 is an exploded view of a coil apparatus according to a third embodiment of the present invention.
Figure 32:
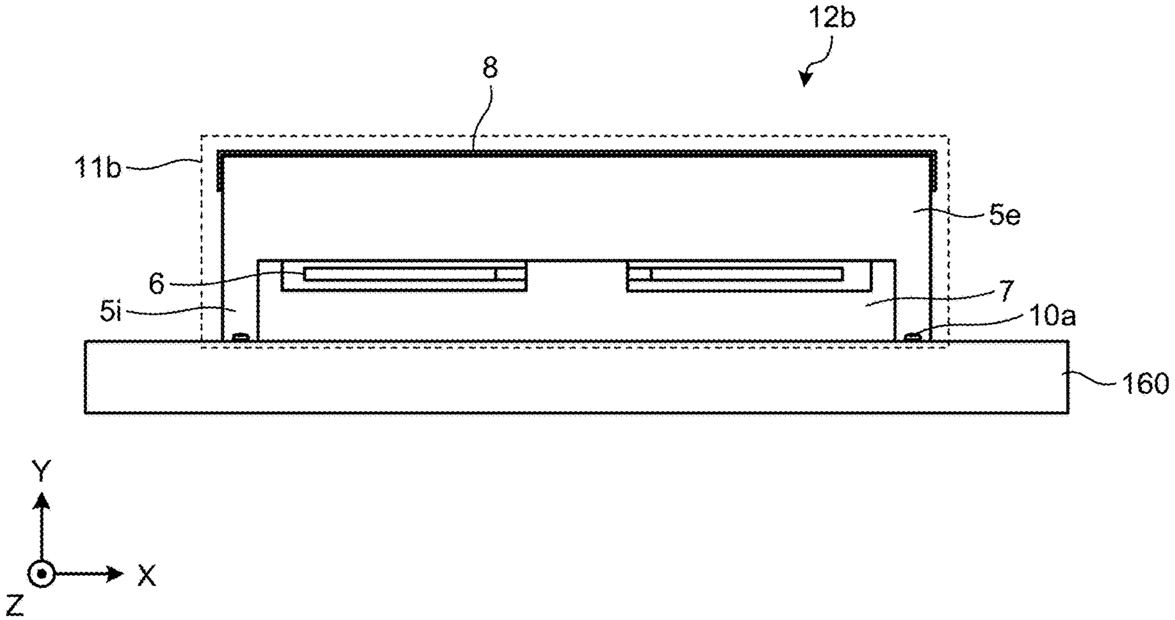
FIG. 32 is a side view illustrating an assembled state of the coil apparatus illustrated in FIG. 31.
Figure 33:
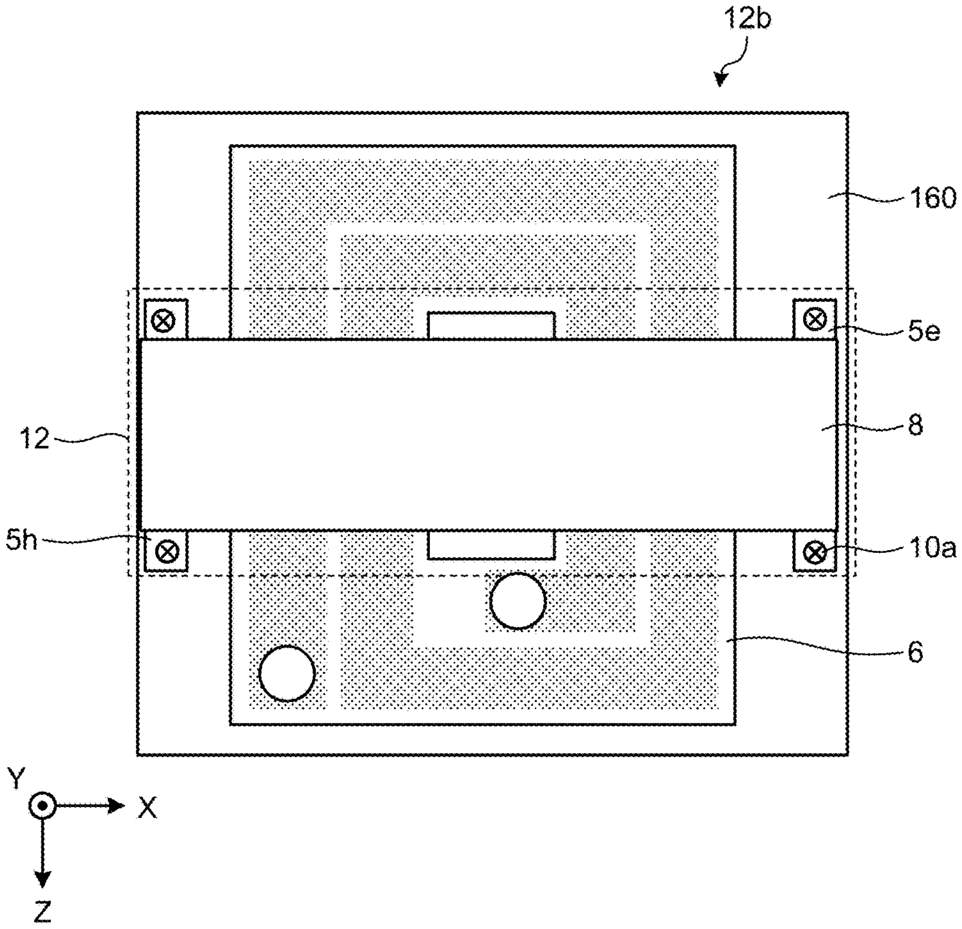
FIG. 33 is a top view illustrating the assembled state of the coil apparatus illustrated in FIG. 31.

FIG. 31 is an exploded view of a coil apparatus according to a third embodiment of the present invention. FIG. 32 is a side view illustrating an assembled state of the coil apparatus illustrated in FIG. 31. FIG. 33 is a top view illustrating the assembled state of the coil apparatus illustrated in FIG. 31. A case 5*e* included in a coil apparatus 12*b* according to the third embodiment has projections 5*i* formed by extending outer walls of the case 5*e* downward. At the distal ends of the projections 5*i*, fixing portions 5*h* are provided for fixing the case 5*e* to the metal housing 160, which is a structure in which the coil apparatus 12*b* is installed. In the third embodiment, the same reference numerals are assigned to the same components as those in the first and second embodiments, and a configuration different from that of the first and second embodiments will be mainly described.

The case 5*e* is made by adding projections 5*i* to the case 5*c* illustrated in FIG. 14. The projections 5*i* are formed by extending downward outer walls that are end surfaces of the case 5*e* in the X-axis direction. The fixing portions 5*h* come into contact with the metal housing 160. The fixing portions 5*h* are provided at the four corresponding corners of the case 5*e* in the X-axis direction and the Z-axis direction. A hole of a diameter of about 3 mm to 6 mm is formed in each of the fixing portions 5*h*. By tightening the screws 10*a* passed through the holes into the metal housing 160, the coil apparatus 12*b* is fixed to the metal housing 160. Although FIG. 31 illustrates the coil apparatus 12*b* with the lid 8, the coil apparatus 12*b* may not have the lid 8.

According to the third embodiment, as in the second embodiment, by including the case 5*e*, the coil apparatus 12*b* can facilitate assembly and prevent a misalignment between the core module 11*b* and the base core 7. The coil apparatus 12*b*, which can be fixed to the metal housing 160 by the case 5*e*, eliminates the need to additionally provide a configuration for fixing to the metal housing 160. The power converter 100 can have a simpler configuration than when a configuration for the coil apparatus 12*b* to the metal housing 160 is additionally required. In the coil apparatus 12*b* with the lid 8, the projections 5*i* and the fixing portions 5*h* may be provided to the lid 8 instead of to the case 5*e*. The projections 5*i* and the fixing portions 5*h* may be attached to any of the case 5 illustrated in FIGS. 4 to 6, the case 5*b* illustrated in FIG. 12, the case 5*c* illustrated in FIG. 15, and the case 5*c* illustrated in FIG. 17.

Fourth Embodiment

Figure 34:
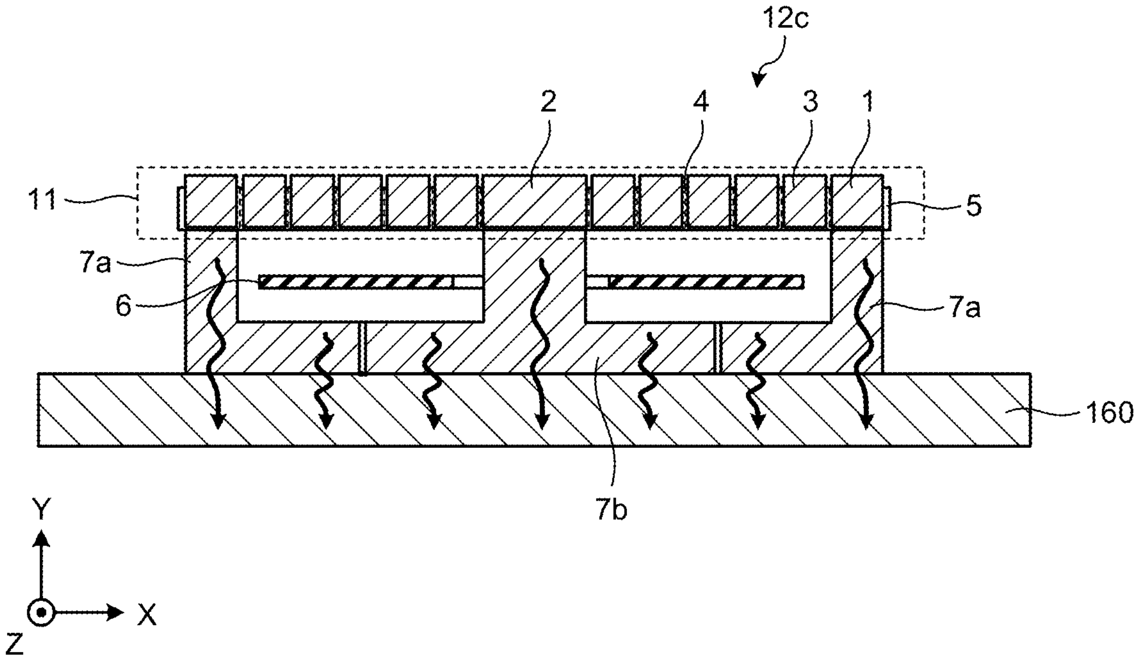
FIG. 34 is a cross-sectional view of a coil apparatus according to a fourth embodiment of the present invention.

FIG. 34 is a cross-sectional view of a coil apparatus according to a fourth embodiment of the present invention. In a coil apparatus 12*c* according to the fourth embodiment, the E-shaped base core 7 illustrated in FIGS. 4 to 6 is divided into a plurality of core components aligned with gaps between them. In the fourth embodiment, the same reference numerals are assigned to the same components as those in the first to third embodiments, and a configuration different from that of the first to third embodiments will be mainly described.

In the fourth embodiment, a first core component consists of a plurality of core components that is two base cores 7*a* and one base core 7*b*. The base core 7*b* is disposed in the center of the coil apparatus 12*c* in the X-axis direction. The base cores 7*a* are adjacent to the base core 7*b* in the X-axis direction. Gaps are provided between the base cores 7*a* and the base core 7*b*. Thermal coupling between the base cores 7*a* and 7*b* and the metal housing 160 is provided as is the case with the base core 7.

By the provision of the gaps between the base cores 7*a* and the base core 7*b*, the coil apparatus 12*c* can provide much more gaps in the magnetic paths 9 than in the case illustrated in FIGS. 4 to 6. If the number of gaps in the magnetic paths 9 is insufficient in the configuration illustrated in FIGS. 4 to 6, the coil apparatus 12*c* can provide a sufficient number of gaps by the provision of the gaps between the base cores 7*a* and 7*b*.

Figure 35:
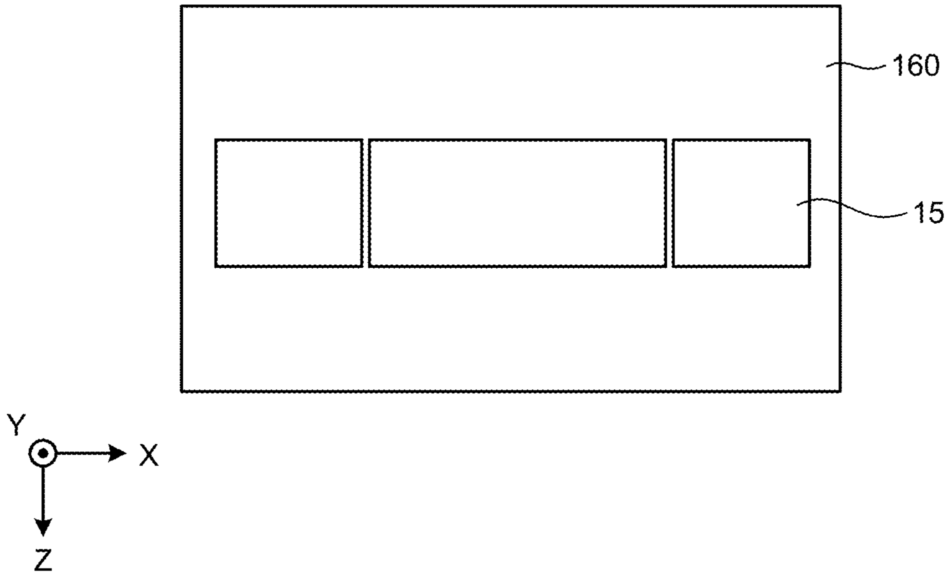
FIG. 35 is a plan view illustrating an example of a surface of a metal housing on which the coil apparatus according to the fourth embodiment is disposed.

FIG. 35 is a plan view illustrating an example of a surface of the metal housing on which the coil apparatus according to the fourth embodiment is disposed. Grooves 15 having a depth of about 1 mm to 2 mm is provided on the surface of the metal housing 160 on which the coil apparatus 12*c* is disposed. The metal housing 160 is provided with three grooves 15. One of the three grooves 15 has the same shape as the base core 7*b* in the X-axis direction and the Z-axis direction. The base core 7*b* is fitted into this groove 15. The other two of the three grooves 15 have the same shape as the base cores 7*a* in the X-axis direction and the Z-axis direction. The base cores 7*a* are fitted into the two corresponding grooves 15. Thus, the base cores 7*a* and the base core 7*b* can be positioned to form gaps of a predetermined length between the base cores 7*a* and the base core 7*b*. Further, the length of the gaps between the base cores 7*a* and the base core 7*b* can be kept constant.

Figure 36:
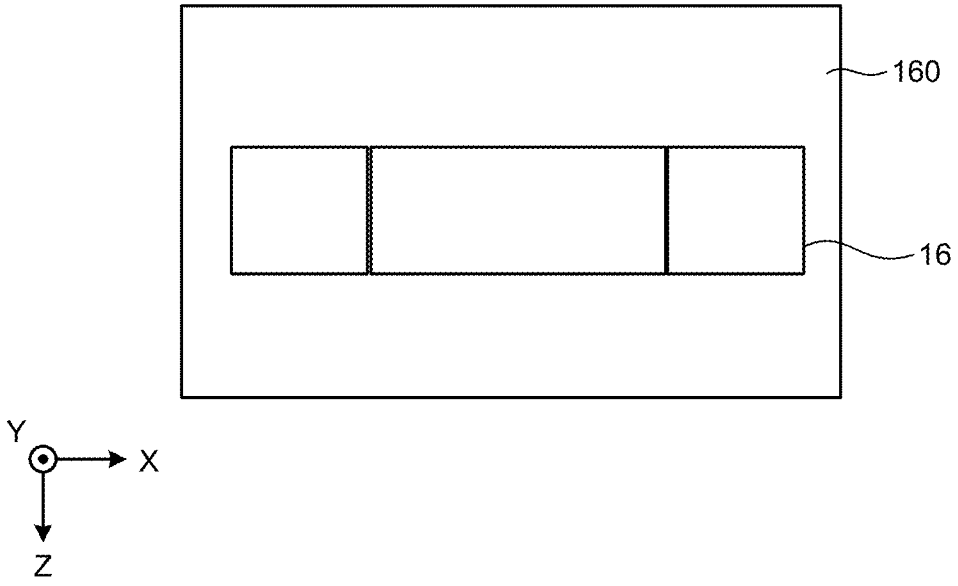
FIG. 36 is a plan view illustrating another example of the surface of the metal housing on which the coil apparatus according to the fourth embodiment is disposed.

FIG. 36 is a plan view illustrating another example of the surface of the metal housing on which the coil apparatus according to the fourth embodiment is disposed. Ribs 16 having a height of about 1 mm to 2 mm are provided on the surface of the metal housing 160 on which the coil apparatus 12*c* is disposed. One of three regions enclosed by the ribs 16 has the same shape as the base core 7*b* in the X-axis direction and the Z-axis direction. The base core 7*b* is fitted into this region. The other two of the three regions have the same shape as the base cores 7*a* in the X-axis direction and the Z-axis direction. The base cores 7*a* are fitted into the two corresponding regions. Thus, the base cores 7*a* and the base core 7*b* can be positioned to form gaps of a predetermined length between the base cores 7*a* and the base core 7*b*. Further, the length of the gaps between the base cores 7*a* and the base core 7*b* can be kept constant.

According to the fourth embodiment, by the provision of the base cores 7*a* and 7*b*, the coil apparatus 12*c* can increase the number of gaps provided in the magnetic paths 9. Consequently, the coil apparatus 12*c* can further reduce loss in the coil unit 6.

Fifth Embodiment

Figure 37:
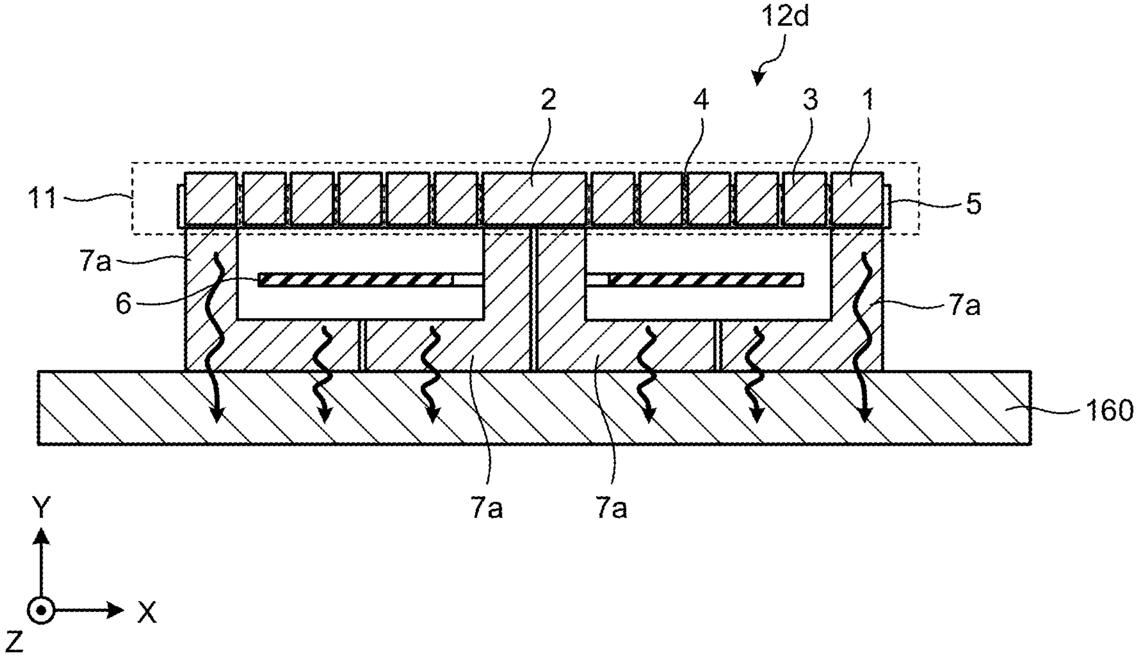
FIG. 37 is a cross-sectional view of a coil apparatus according to a fifth embodiment of the present invention.

FIG. 37 is a cross-sectional view of a coil apparatus according to a fifth embodiment of the present invention. In a coil apparatus 12*d* according to the fifth embodiment, the base core 7*b* illustrated in FIG. 34 is divided into two base cores 7*a*. That is, in the coil apparatus 12*d*, the E-shaped base core 7 illustrated in FIGS. 4 to 6 is divided into four base cores 7*a* aligned with gaps between them. In the fifth embodiment, the same reference numerals are assigned to the same components as those in the first to fourth embodiments, and a configuration different from that of the first to fourth embodiments will be mainly described.

In the fifth embodiment, a first core component consists of the four base cores 7*a*, which are a plurality of core components. The four base cores 7*a* are formed from core components of one type. The four base cores 7*a* have the same shape. Here, dimensional differences of about ±3% between the base cores 7*a* due to dimensional tolerances at the time of manufacturing are ignored. The plurality of base cores 7*a* having the same shape includes the case where there are dimensional differences of about ±3%. Gaps are provided between the base cores 7*a*. By the provision of the gaps between the base cores 7*a*, the coil apparatus 12*d* can provide much more gaps in the magnetic paths 9 than in the case illustrated in FIGS. 4 to 6.

The size of a core component installed in the power converter 100 increases in proportion to electric power. The upper limit of the size of the core component that can be manufactured is limited by the size of core manufacturing equipment such as a press or a firing machine. If the coil apparatus 12*d* is provided with the first core component that is a one-piece core component instead of the four base cores 7*a*, the maximum size of the first core component is determined by the size of the core manufacturing equipment. In the fifth embodiment, in which the first core component is divided into the four base cores 7*a*, each of the four base cores 7*a* can be increased in size to the maximum size. Consequently, the size of the first core component provided in the coil apparatus 12*d* can be up to four times the size of the first core component that is a one-piece core component. Thus, even if core manufacturing equipment larger than existing core manufacturing equipment is not used in the manufacturing of the first core component, the coil apparatus 12*d* including the first core component up to four times as large as the first core component formed of a one-piece core component can be manufactured.

As in the fourth embodiment, the metal housing 160 may be provided with the grooves 15 or the ribs 16 for positioning the base cores 7*a*. This allows the base cores 7*a* to be positioned to form gaps of a predetermined length between the base cores 7*a*. Further, the gap length between the base cores 7*a* can be kept constant.

According to the fifth embodiment, by the provision of the plurality of base cores 7*a*, the coil apparatus 12*d* can increase the number of gaps provided in the magnetic paths 9. Consequently, the coil apparatus 12*d* can further reduce loss in the coil unit 6.

Sixth Embodiment

Figure 38:
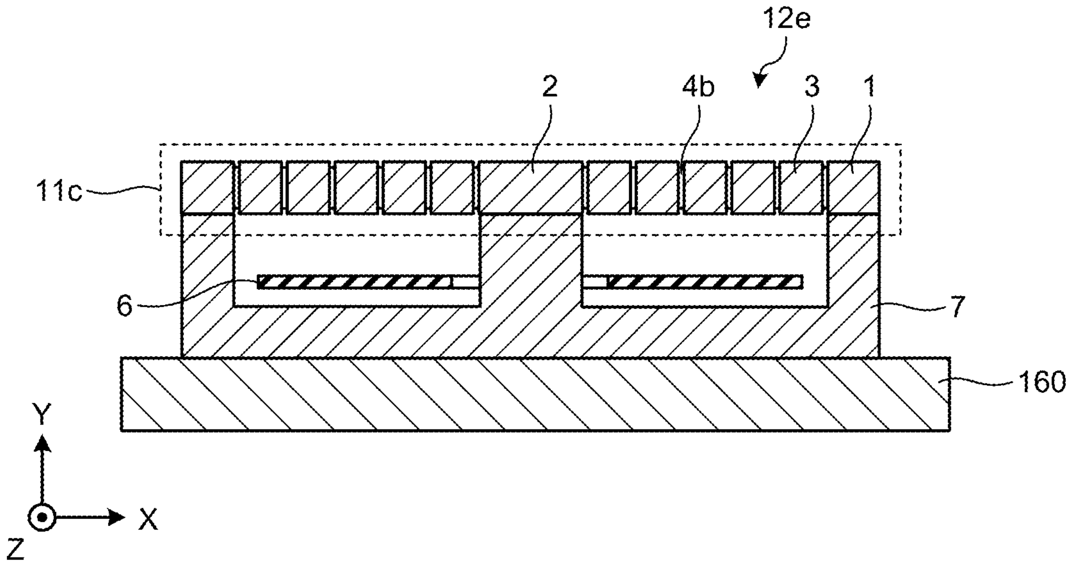
FIG. 38 is a cross-sectional view of a coil apparatus according to a sixth embodiment of the present invention.

FIG. 38 is a cross-sectional view of a coil apparatus according to a sixth embodiment of the present invention. In a coil apparatus 12*e* according to the sixth embodiment, adjacent core segments of the plurality of core segments 1, 2, and 3 are bonded to each other with a divider 4*b* interposed between them. In the sixth embodiment, the same reference numerals are assigned to the same components as those in the first to fifth embodiments, and a configuration different from that of the first to fifth embodiments will be mainly described.

Figure 39:
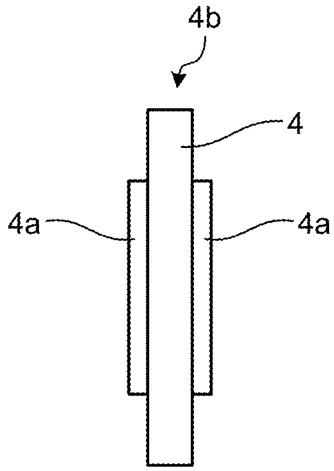
FIG. 39 is an enlarged view of a divider included in the coil apparatus illustrated in FIG. 38.

FIG. 39 is an enlarged view of a divider included in the coil apparatus illustrated in FIG. 38. The divider 4*b* includes a divider plate 4 that is a plate material. Double-sided adhesive tapes 4*a* having high adhesive strength are stuck to both sides of the divider plate 4. By sticking the core segments 1, 2, and 3 to the double-sided adhesive tapes 4*a*, the dividers 4*b* bond adjacent core segments of the core segments 1, 2, and 3 to each other. Gaps are formed between adjacent core segments of the core segments 1, 2, and 3 by the provision of the dividers 4*b*.

By the bonding of the core segments 1, 2, and 3 to each other, the core segments 1, 2, and 3 are fixed in a core module 11*c*. Since the core segments 1, 2, and 3 are fixed by the dividers 4*b*, it is not necessary to provide the case 5 in the coil apparatus 12*e* for fixing the core segments 1, 2, and 3. In this case, the manufacturing cost of the case 5 and a mold for processing the case 5 are unnecessary, so that the core module 11*c* can reduce manufacturing cost. Further, the coil apparatus 12*e* can eliminate gaps between the base core 7 and the core module 11*c*. The coil apparatus 12*e* can eliminate leakage flux from between the base core 7 and the core module 11*c*, and thus can further reduce loss in the coil unit 6.

Figure 40:
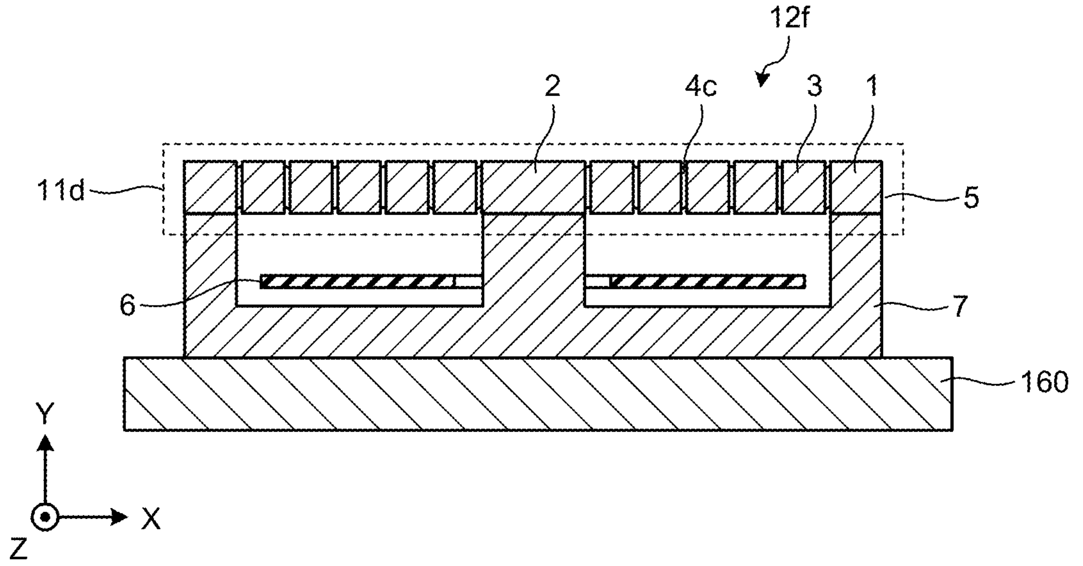
FIG. 40 is a cross-sectional view of a coil apparatus according to a modification of the sixth embodiment.

FIG. 40 is a cross-sectional view of a coil apparatus according to a modification of the sixth embodiment. In a coil apparatus 12*f*, adjacent core segments of the core segments 1, 2, and 3 constituting a core module 11*d* are bonded to each other with an adhesive 4*c* interposed between them. Glass beads are blended into the adhesive 4*c*. By the addition of the glass beads to the adhesive 4*c*, adjacent core segments of the core segments 1, 2, and 3 are bonded to each other with a certain spacing maintained between them. Thus, gaps are formed between adjacent core segments of the core segments 1, 2, and 3 by the provision of the adhesive 4*c*. Also in this modification, the core module 11*d* eliminates the need for the case 5, allowing a reduction in manufacturing cost. The coil apparatus 12*f* can eliminate leakage flux from between the base core 7 and the core module 11*d*, and thus can further reduce loss in the coil unit 6.

According to the sixth embodiment, the coil apparatus 12*e* or 12*f*, in which the core segments 1, 2, and 3 are bonded to each other, forming gaps between them, eliminates the need for the case 5 for fixing the core segments 1, 2, and 3, and can reduce manufacturing cost. The coil apparatus 12*e* or 12*f* can eliminate leakage flux from between the base core 7 and the core module 11*c* or 11*d*, and thus can further reduce loss in the coil unit 6.

Seventh Embodiment

Figure 41:
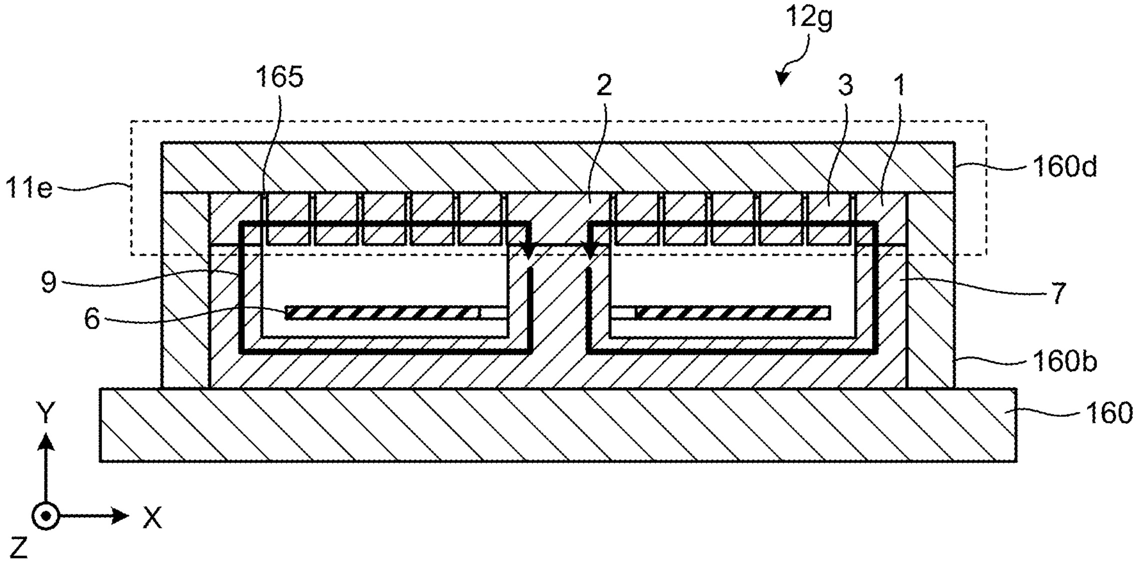
FIG. 41 is a cross-sectional view of a coil apparatus according to a seventh embodiment of the present invention.

FIG. 41 is a cross-sectional view of a coil apparatus according to a seventh embodiment of the present invention. In a coil apparatus 12*g* according to the seventh embodiment, the plurality of core segments 1, 2, and 3 is fixed to a metal plate 160*d*. In the seventh embodiment, the same reference numerals are assigned to the same components as those in the first to sixth embodiments, and a configuration different from that of the first to sixth embodiments will be mainly described. The metal blocks 160*b* that support the metal plate 160*d* are erected on the metal housing 160.

Figure 42:
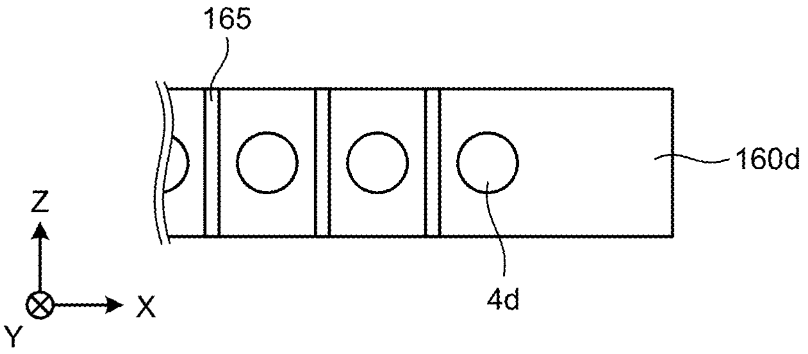
FIG. 42 is an enlarged view illustrating a metal plate as viewed from below, on which the coil apparatus illustrated in FIG. 41 is provided.
Figure 43:
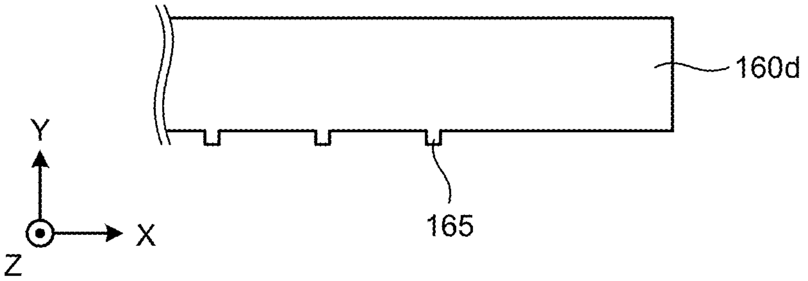
FIG. 43 is an enlarged view illustrating the metal plate as viewed from the side, on which the coil apparatus illustrated in FIG. 41 is provided.

FIG. 42 is an enlarged view illustrating the metal plate as viewed from below, on which the coil apparatus illustrated in FIG. 41 is provided. FIG. 43 is an enlarged view illustrating the metal plate as viewed from the side, on which the coil apparatus illustrated in FIG. 41 is provided. The metal plate 160*d* includes ribs 165 for positioning the plurality of core segments 1, 2, and 3 in the X-axis direction.

The ribs 165 are formed on a surface of the metal plate 160*d* facing the core module 11*e*. The ribs 165 have a thickness of 1 mm or less in the X-axis direction. The core segments 1, 2, and 3 are stuck between the ribs 165 using an adhesive 4*d*. The core segments 1, 2, and 3 are positioned by the ribs 165 in the X-axis direction, so that gaps are formed between the core segments 1, 2, and 3.

By the sticking of the core segments 1, 2, and 3 to the metal plate 160*d*, the core segments 1, 2, and 3 are fixed in the core module 11*e*. Since the core segments 1, 2, and 3 are fixed by the metal plate 160*d*, it is not necessary to provide the case 5 in the coil apparatus 12*g* for fixing the core segments 1, 2, and 3. In this case, the manufacturing cost of the case 5 and a mold for processing the case 5 are unnecessary, and thus the core module 11*e* can reduce manufacturing cost. Further, the coil apparatus 12*g* can eliminate gaps between the base core 7 and the core module 11*e*. The coil apparatus 12*g* can eliminate leakage flux from between the base core 7 and the core module 11*e*, and thus can further reduce loss in the coil unit 6.

In general, if metal objects are disposed to block the magnetic paths 9, the electrical characteristics of the coil apparatus 12*g* will be affected. In the seventh embodiment, the ribs 165 are located in outer edge portions of the annular magnetic paths 9. In the annular magnetic paths 9, magnetic flux passes through the inner side of the center of the magnetic paths 9 in cross section. Thus, the coil apparatus 12*g* can eliminate the influence of the provision of the ribs 165 that are metal objects in the magnetic paths 9, on the electrical characteristics.

The direction of the magnetic paths 9 in the core module 11*e* is the X-axis direction, whereas the thickness direction of the adhesive 4*d* is the Y-axis direction. When the thickness of the adhesive 4*d* varies, the core segments 1, 2, and 3 vary in position in the Y-axis direction, but do not vary in position in the X-axis direction. Thus, even if the thickness of the adhesive 4*d* varies, it does not affect the length of the core gaps. Therefore, the coil apparatus 12*g* can eliminate the influence of variations in the thickness of the adhesive 4*d* on the inductance value.

Figure 44:
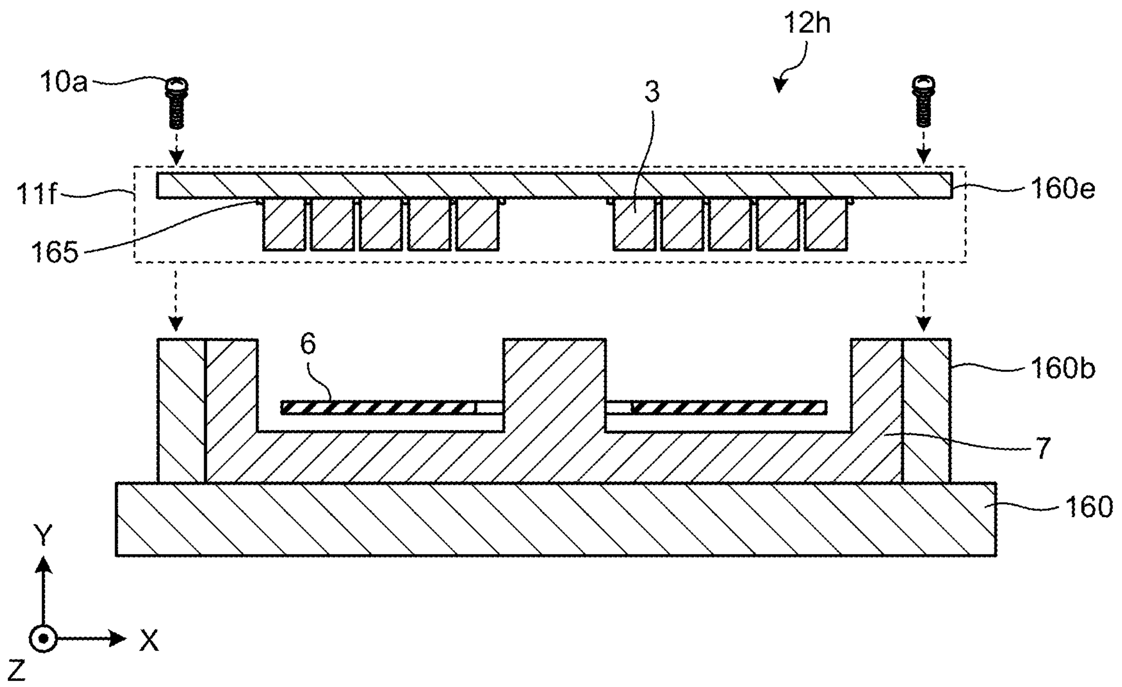
FIG. 44 is a cross-sectional view illustrating a coil apparatus according to a first modification of the seventh embodiment during assemblage.
Figure 45:
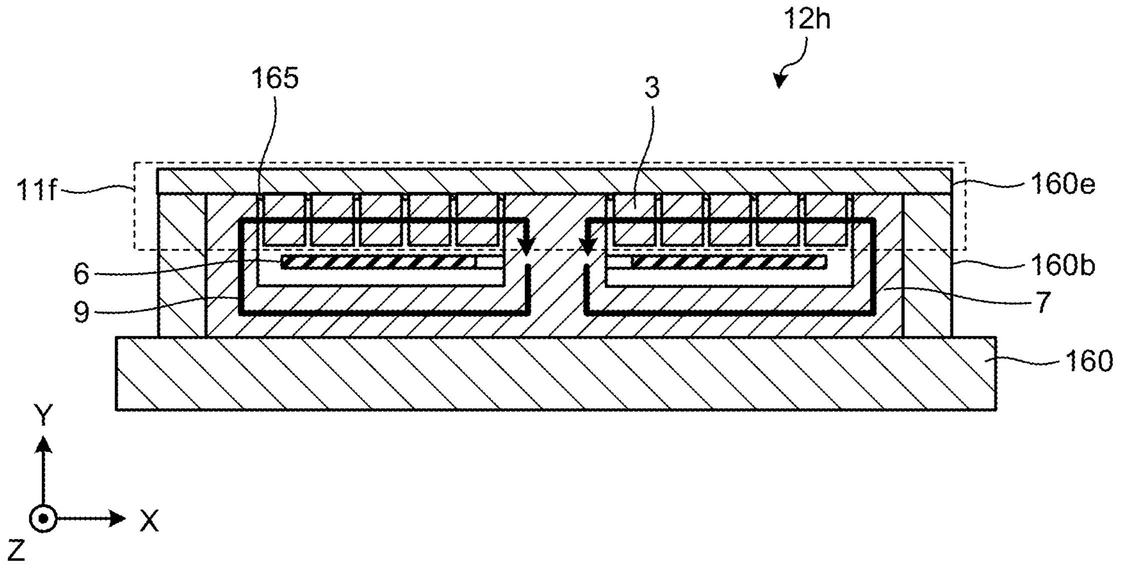
FIG. 45 is a cross-sectional view illustrating an assembled state of the coil apparatus illustrated in FIG. 44.

FIG. 44 is a cross-sectional view illustrating a coil apparatus according to a first modification of the seventh embodiment during assemblage. FIG. 45 is a cross-sectional view illustrating an assembled state of the coil apparatus illustrated in FIG. 44. In a coil apparatus 12*h*, the core segments 1 and 2 are not disposed above the legs of the base core 7. The core segments 3 are stuck to a metal plate 160*e*. The metal plate 160*e* to which the core segments 3 are stuck is fixed to the metal blocks 160*b* by tightening the screws 10*a*. By fixing the metal plate 160*e* to the metal blocks 160*b*, the legs of the base core 7 come into contact with the ribs 165. The ribs 165 form gaps between the legs of the base core 7 and the core segments 3.

Also in the first modification of the seventh embodiment, the coil apparatus 12*h* can eliminate the influence of the provision of the ribs 165 in the magnetic paths 9 on the electrical characteristics. The coil apparatus 12*h* can eliminate the influence of variations in the thickness of the adhesive 4*d* on the inductance value. Further, since there are no core segments 1 and 2 above the legs of the base core 7, the coil apparatus 12*h* can eliminate variations in the length of gaps above the legs. Consequently, the coil apparatus 12*h* can further reduce variations in inductance value.

Figure 46:
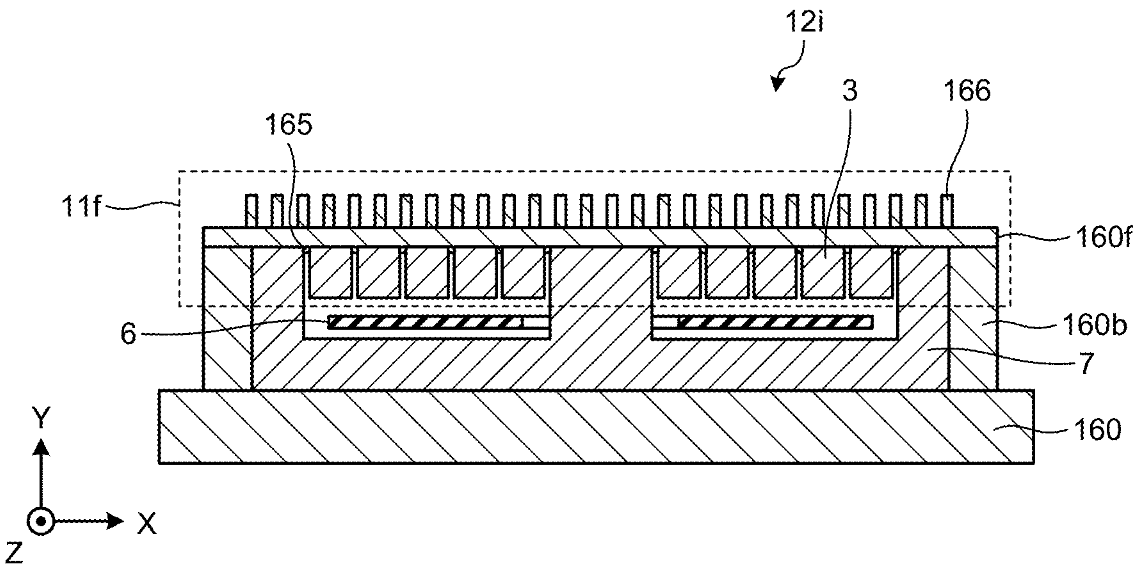
FIG. 46 is a cross-sectional view of a coil apparatus according to a second modification of the seventh embodiment.

FIG. 46 is a cross-sectional view of a coil apparatus according to a second modification of the seventh embodiment. A metal plate 160*f* is the metal plate 160*d* with radiating fins 166 added to the top face. By fixing the core segments 3 to the metal plate 160*f* having the radiating fins 166, heat dissipation from the core segments 3 can be accelerated.

According to the seventh embodiment, by fixing the core segments 1, 2, and 3 to the metal plate 160*d*, 160*e*, or 160*f* provided with the ribs 165, the coil apparatus 12*g*, 12*h*, or 12*i* eliminates the need for the case 5 for fixing the core segments 1, 2, and 3, and can reduce manufacturing cost. The coil apparatus 12*g*, 12*h*, or 12*i* can eliminate leakage flux from between the base core 7 and the core module 11*e* or 11*f*, and thus can further reduce loss in the coil unit 6. The coil apparatus 12*g*, 12*h*, or 12*i* can fix the core segments 1, 2, and 3 with the core gaps of a desired length provided between them, and can reduce variations in inductance value.

Eighth Embodiment

Figure 47:
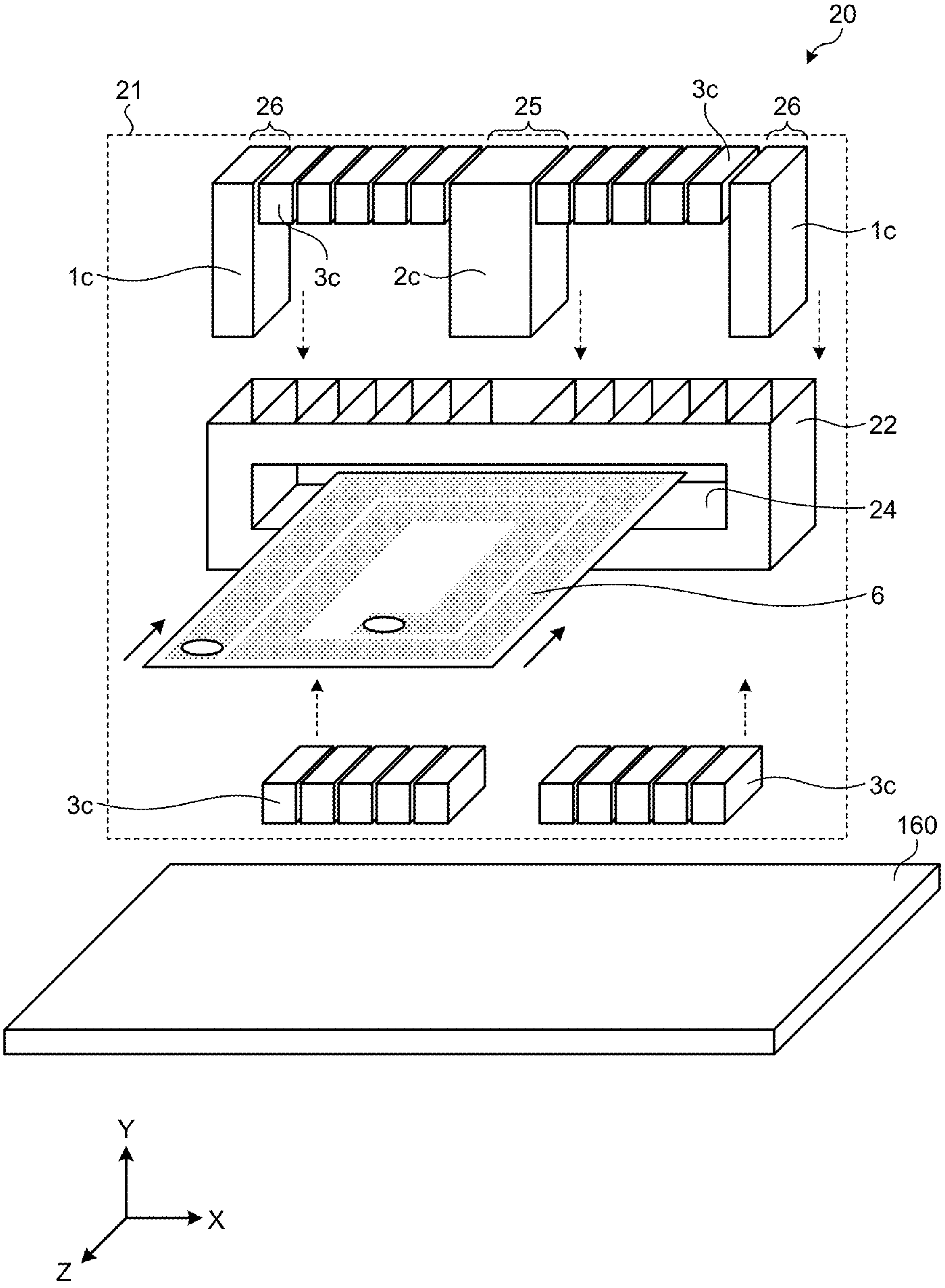
FIG. 47 is an exploded view of a coil apparatus according to an eighth embodiment.
Figure 48:
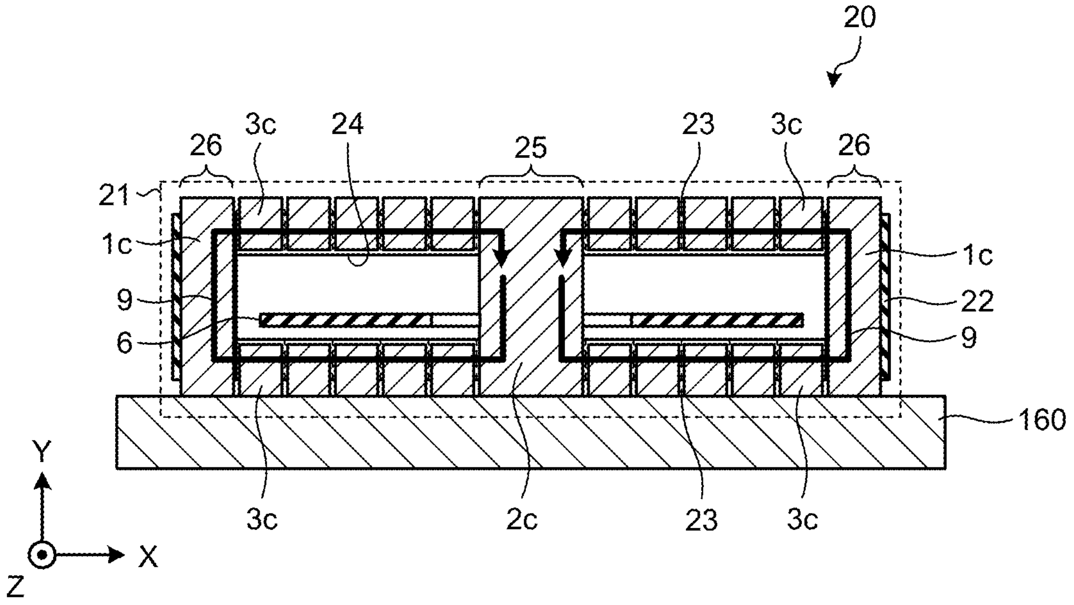
FIG. 48 is a cross-sectional view illustrating an assembled state of the coil apparatus illustrated in FIG. 47.

FIG. 47 is an exploded view of a coil apparatus according to an eighth embodiment. FIG. 48 is a cross-sectional view illustrating an assembled state of the coil apparatus illustrated in FIG. 47. A coil apparatus 20 according to the eighth embodiment is not provided with the base core 7. In the coil apparatus 20, the magnetic paths 9 are formed only by a plurality of core segments 1*c*, 2*c*, and 3*c*. In the eighth embodiment, the same reference numerals are assigned to the same components as those in the first to seventh embodiments, and a configuration different from that of the first to seventh embodiments will be mainly described.

The coil apparatus 20 includes a core module 21 and the coil unit 6. The core module 21 includes a core segment group that is the plurality of core segments 1*c*, 2*c*, and 3*c*, and a case 22 that holds the core segment group. The core segment group includes two core segments 1*c*, one core segment 2*c*, and any number of core segments 3*c*. Each of the two core segments 1*c* constitutes an outer leg 26. The core segment 2*c* constitutes a center leg 25. The core module 21 forms the two magnetic paths 9 that are both closed magnetic paths.

In the core segment group, a plurality of core segments 3*c* provided in place of the base core 7 illustrated in FIG. 4 constitute a first core component. The core segments 3*c* are aligned in the X-axis direction with gaps between them. Of the core segments 3*c* included in the core segment group, core segments 3*c* other than the core segments 3*c* constituting the first core component constitute a second core component. The core segments 3*c* and the core segments 1*c* and 2*c* constituting the second core component are aligned in the X-axis direction with gaps between them. The core segments 3*c* constituting the first core component are disposed in the lower part of the case 22. The core segments 3*c* constituting the second core component are disposed in the upper part of the case 22.

The height of each core segment 1*c* in the Y-axis direction is larger than the height of each core segment 3*c* in the Y-axis direction. The height of the core segment 2*c* in the Y-axis direction is larger than the height of each core segment 3*c* in the Y-axis direction. The height of each core segment 1*c* in the Y-axis direction and the height of the core segment 2*c* in the Y-axis direction are the same. Here, dimensional differences of about ±3% between the core segments 1*c* and the core segment 2*c* due to dimensional tolerances at the time of manufacturing are ignored. The height of each core segment 1*c* and the height of the core segment 2*c* being the same includes the case where there are dimensional differences of about ±3%.

Each of the core segments 1*c*, 2*c*, and 3*c* is smaller than the base cores 7, 7*a*, 7*b*, 7*c*, and 7*d* of the first to seventh embodiments, and thus is easy to fire as compared with the base cores 7, 7*a*, 7*b*, 7*c*, and 7*d*. The core segments 1*c*, 2*c*, and 3*c* can reduce loss in the coil unit 6 as compared with the base cores 7, 7*a*, 7*b*, 7*c*, and 7*d*. By using the core segments 1*c*, 2*c*, and 3*c*, the core module 21 can increase dimensional accuracy and can shorten firing time.

The coil apparatus 20 can reduce the dimensional tolerances of the core segments 1*c*, 2*c*, and 3*c*, and thus can reduce variations in inductance value. The coil apparatus 20 can eliminate the need for core polishing, which has conventionally been performed to reduce dimensional tolerances, and thus allows a reduction in the processing time of the core module 21 and a reduction in manufacturing cost.

Either the general-purpose ferrite core material or the low-loss ferrite core material may be used for the core segments 1*c*, 2*c*, and 3*c*. Since both the general-purpose ferrite core material and the low-loss ferrite core material can be used, the number of procurement sources from which the material of the core segments 1*c*, 2*c*, and 3*c* can be procured increases. Consequently, the procurement of components for manufacturing the core module 21 can be stabilized, and the procurement cost can be reduced. Further, the core module 21 can be reduced in loss in the coil unit 6 and improved in quality.

When the case 22 is viewed from a position away from the case 22 in the Z-axis direction, the outer edge of the case 22 has a rectangular shape. The case 22 has a three-dimensional shape surrounding a hollow portion 24. Spaces in which the core segments 1*c*, 2*c*, and 3*c* are disposed are provided around the hollow portion 24. The case 22 includes divider plates 23. The divider plates 23 separate adjacent core segments of the core segments 1*c*, 2*c*, and 3*c* from each other in the X-axis direction. The case 22 is a component molded in one piece including the divider plates 23. Since the case 22 is molded in one piece including the divider plates 23, the core module 21 can reduce manufacturing cost. The divider plates 23 may be components formed separately from the case 22.

The case 22 may include the ribs 13 illustrated in FIGS. 12 and 13 instead of the divider plates 23. By the provision of the ribs 13, each of the plurality of core segments 1*c*, 2*c*, and 3*c* is positioned in the X-axis direction. The case 22 is molded in one piece including the ribs 13, so that the core module 21 can reduce manufacturing cost.

Further, the lid 8 illustrated in FIG. 14 may be attached to the case 22. The lid 8 covers the spaces in which the core segments 1*c*, 2*c*, and 3*c* disposed in the upper part of the case 22 are accommodated. By the provision of the lid 8, if any of the core segments 1*c*, 2*c*, and 3*c* is damaged, the coil apparatus 20 can prevent a broken piece produced by the damage from flying to the outside of the case 22.

The core segments 1*c* are passed through portions of the case 22 corresponding to the short sides of the rectangle. The core segment 2*c* passes through the case 22 and the hollow portion 24 in the center of the case 22 in the X-axis direction. The coil unit 6 is disposed through the hollow portion 24. The coil unit 6 is installed in the coil apparatus 20 in a state the core segment 2*c* has passed through the opening of the coil unit 6. When the core module 21 is being assembled, the core segment 2*c* is fitted into the case 22 after the coil unit 6 is disposed in the hollow portion 24. The core segments 1*c* and the core segments 3*c* are fitted into the case 22 in any order.

In the core module 21, the magnetic paths 9 are formed by the core segments 1*c*, 2*c*, and 3*c*, so that core gaps between the core segments are provided in the entire magnetic paths 9. Thus, the number of core gaps in the entire magnetic paths 9 is larger than that in the case where core gaps between core segments are provided only in part of the magnetic paths 9. The coil apparatus 20 can reduce length per core gap because it can increase the number of core gaps. By shortening the core gaps, the coil apparatus 20 can reduce magnetic flux leaking from the core gaps, and can reduce eddy-current loss in the coil unit 6.

The core segments 1*c*, 2*c*, and 3*c* constituting the first core component are held with the lower surfaces of the core segments 1*c*, 2*c*, and 3*c* exposed to the outside of the case 22 at the bottom of the case 22. The coil apparatus 20 is installed in the metal housing 160 with the lower surfaces of the core segments 1*c*, 2*c*, and 3*c* in contact with the metal housing 160. Thus, in the coil apparatus 20, some core segments included in the core segment group are disposed to be able to be thermally coupled to the metal housing 160 that is an external structure of the case 22. Heat-conductive grease or a heat dissipation sheet may be sandwiched between the lower surfaces of the core segments 1*c*, 2*c*, and 3*c* and the metal housing 160.

The metal housing 160 has a configuration for fixing the coil apparatus 20 and also serves as a cooler. The coil apparatus 20 is assembled with some core segments included in the core segment group thermally coupled to the metal housing 160. Consequently, the coil apparatus 20 can obtain high heat dissipation by the use of the metal housing 160.

The coil apparatus 20 is fixed to the metal housing 160 when the coil apparatus 20 is assembled. The coil apparatus 20 may be fixed to the metal housing 160 after the assembly of the coil apparatus 20 is completed. Thus, the degree of freedom in the assembly order of the coil apparatus 20 is improved, so that a more efficient assembly order can be selected to manufacture the coil apparatus 20. This allows a reduction in the manufacturing time of the coil apparatus 20.

The core segment group constituting the core module 21 may include the sheet-shaped core segments 3*b* illustrated in FIG. 9. By including the plurality of core segments 3*b* in the core segment group, the core module 21 can distribute core gaps in the magnetic paths 9 among more gaps. Consequently, the core module 21 can reduce leakage flux to reduce loss in the coil unit 6.

Figure 49:
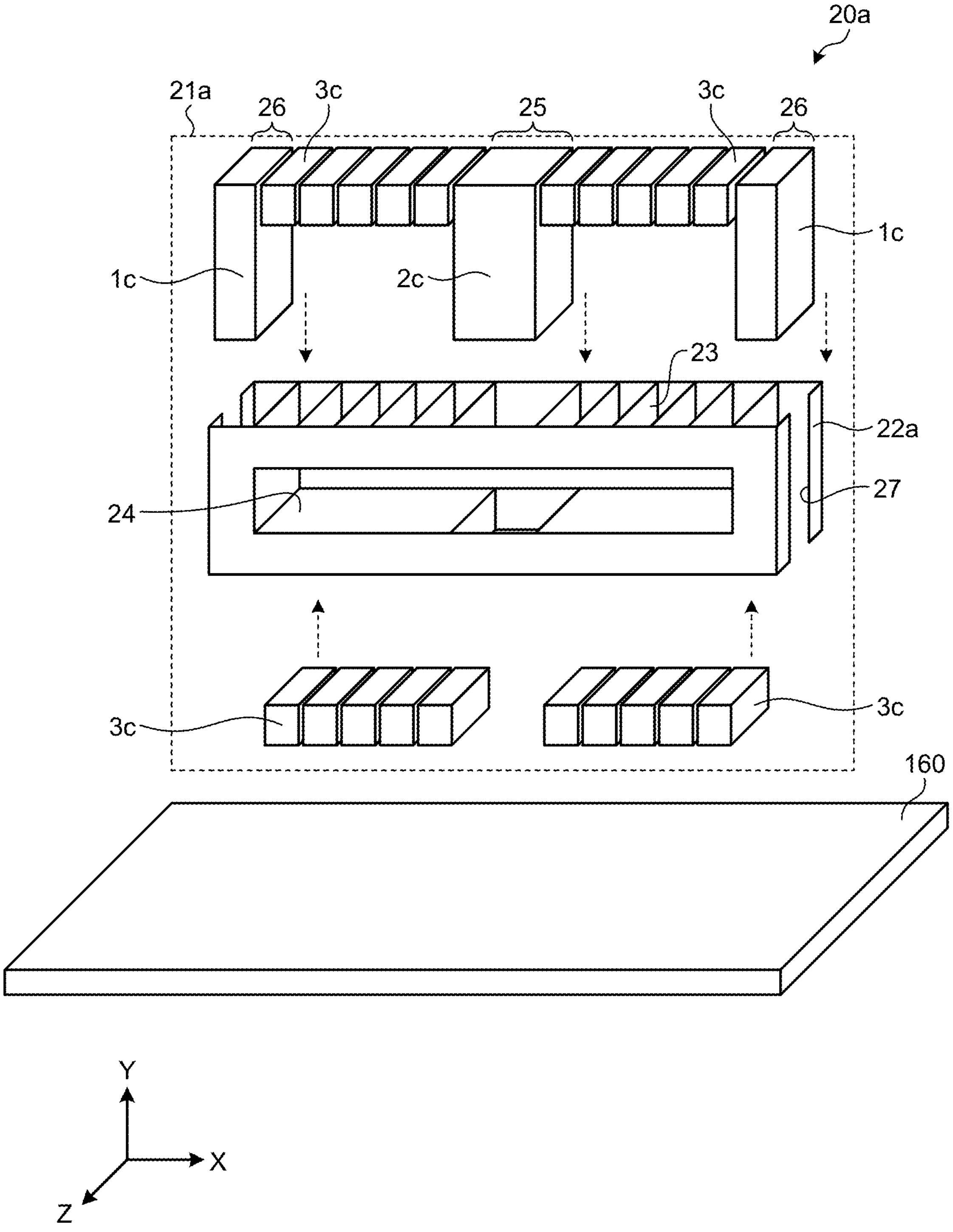
FIG. 49 is an exploded view of a coil apparatus according to a first modification of the eighth embodiment.

FIG. 49 is an exploded view of a coil apparatus according to a first modification of the eighth embodiment. In FIG. 49, the coil unit 6 is omitted. In a coil apparatus 20*a* according to the first modification of the eighth embodiment, cutouts 27 are formed in a case 22*a* constituting a core module 21*a*. The cutouts 27 are formed in both side faces of the case 22*a* in the X-axis direction. By cutting the side faces of the case 22*a* in the Y-axis direction, parts of the side faces are cut to form the cutouts 27.

By the formation of the cutouts 27 in the case 22*a*, the coil apparatus 20*a* can improve heat dissipation. By the provision of the cutouts 27, the amount of material used for manufacturing the case 22*a* can be reduced. The position, shape, and number of the cutouts 27 can be set as desired so as to prevent the core segments 1*c*, 2*c*, and 3*c* in the case 22*a* from passing through the cutouts 27 and falling off. Further, by the provision of the cutouts 27, it can be visually checked from the outside of the case 22*a* how the core segments 1*c*, 2*c*, and 3*c* are fitted into the case 22*a*. Consequently, poor assembly of the core segments 1*c*, 2*c*, and 3*c* can be prevented from being left unnoticed.

Figure 50:
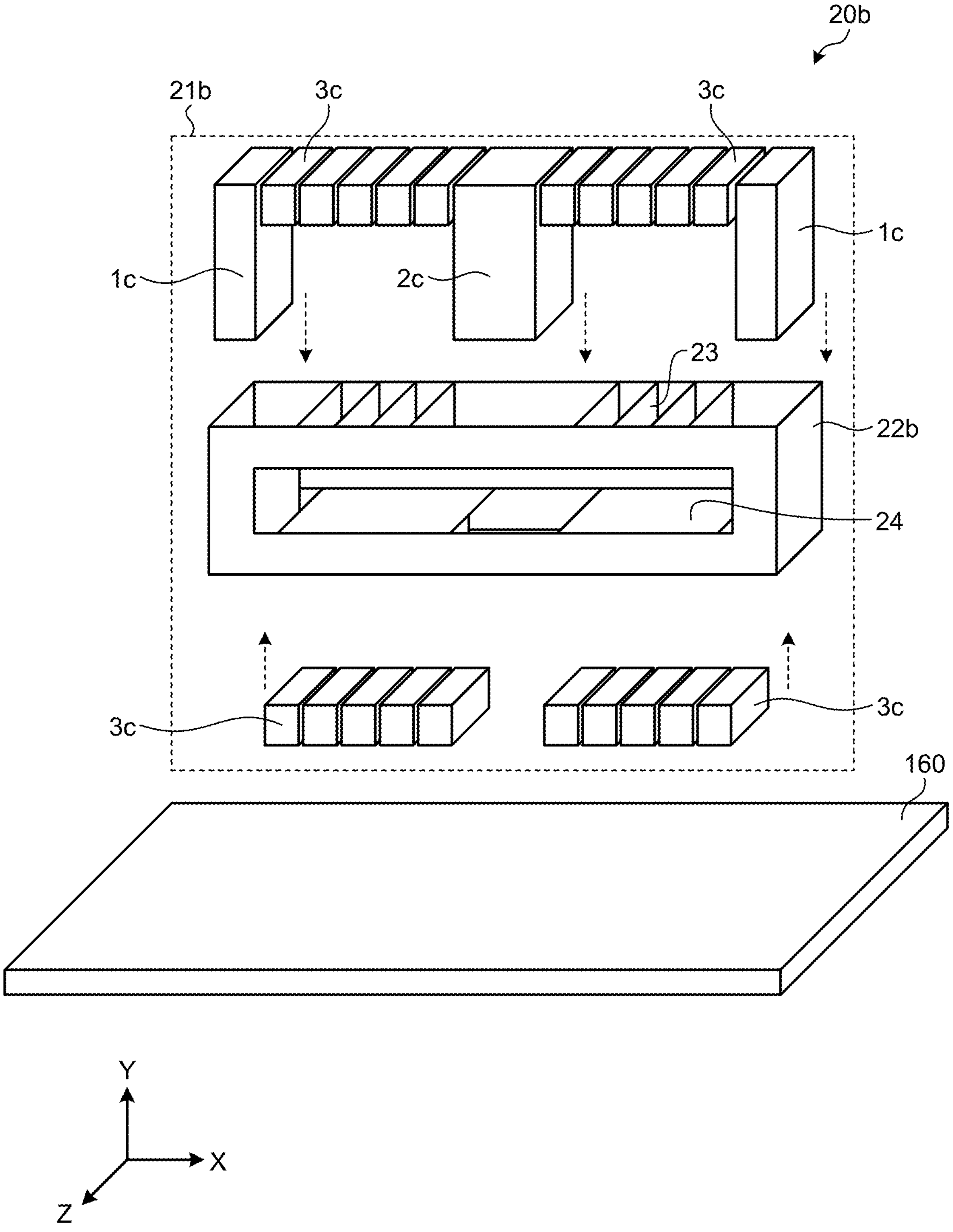
FIG. 50 is an exploded view of a coil apparatus according to a second modification of the eighth embodiment.
Figure 51:
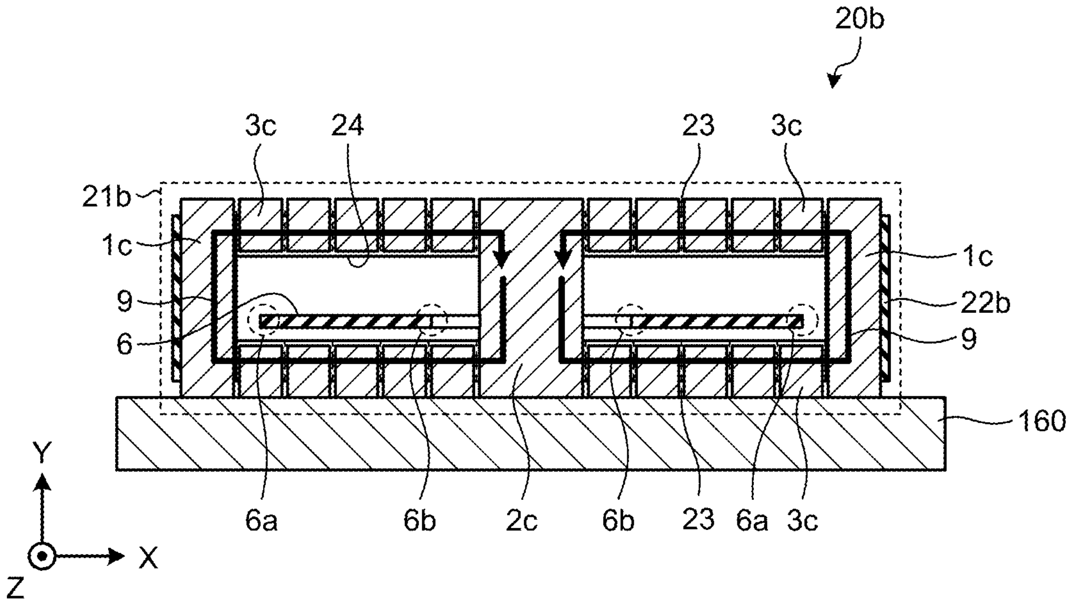
FIG. 51 is a cross-sectional view illustrating an assembled state of the coil apparatus illustrated in FIG. 50.

FIG. 50 is an exploded view of a coil apparatus according to a second modification of the eighth embodiment. FIG. 51 is a cross-sectional view illustrating an assembled state of the coil apparatus illustrated in FIG. 50. In FIG. 50, the coil unit 6 is omitted. The magnetic paths 9 in a coil apparatus 20*b* according to the second modification of the eighth embodiment include points at which adjacent core segments are in contact with each other.

In the coil apparatus 20*b*, a case 22*b* constituting a core module 21*b* is not provided with the divider plates 23 for separating the core segments 1*c* from the core segments 3*c*. Further, the case 22*b* is not provided with the divider plates 23 for separating the core segment 2*c* from the core segments 3*c*. Each core segment 1*c* constituting the core module 21*b* is in contact with each of the two core segments 3*c* adjacent to the core segment 1*c*. The core segment 2*c* constituting the core module 21*b* is in contact with each of the four core segments 3*c* adjacent to the core segment 2*c*.

Edges of the coil unit 6 are susceptible to magnetic flux, and thus loss in the coil unit 6 tends to occur at the edges. As illustrated in FIG. 51, in the magnetic paths 9, points at which the core segments 1*c* are in contact with the core segments 3*c* are positions close to outer peripheral edges 6*a* of the coil unit 6. Since core gaps are not provided at the positions close to the edges 6*a*, magnetic flux passing through the edges 6*a* can be suppressed. In the magnetic paths 9, points at which the core segment 2*c* is in contact with the core segments 3*c* are positions close to inner peripheral edges 6*b* of the coil unit 6. Since core gaps are not provided at the positions close to the edges 6*b*, magnetic flux passing through the edges 6*b* can be suppressed. Thus, the coil apparatus 20*b* can suppress the occurrence of eddy currents in the edges 6*a* and 6*b*, and can reduce loss in the coil unit 6.

In the example illustrated in FIGS. 50 and 51, adjacent core segments are in contact with each other at four points in each magnetic path 9. In each magnetic path 9, adjacent core segments may be in contact with each other at any point. Further, the number of points at which adjacent core segments are in contact with each other is not limited to four, and may be any. Suffice for each magnetic path 9 to include at least one point at which adjacent core segments are in contact with each other. Consequently, the coil apparatus 20*b* can suppress the occurrence of eddy currents in the coil unit 6, and can reduce loss in the coil unit 6.

Figure 52:
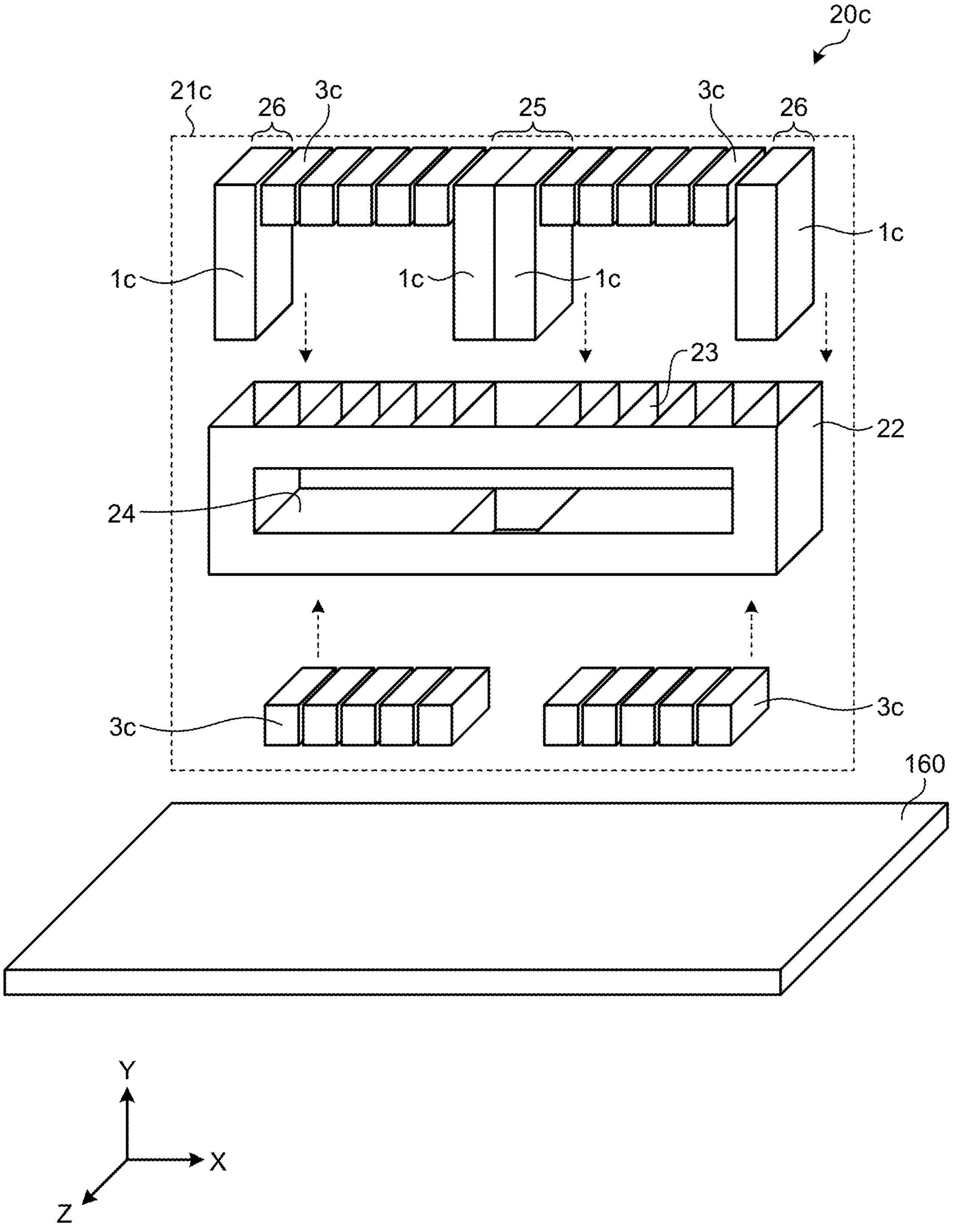
FIG. 52 is an exploded view of a coil apparatus according to a third modification of the eighth embodiment.
Figure 53:
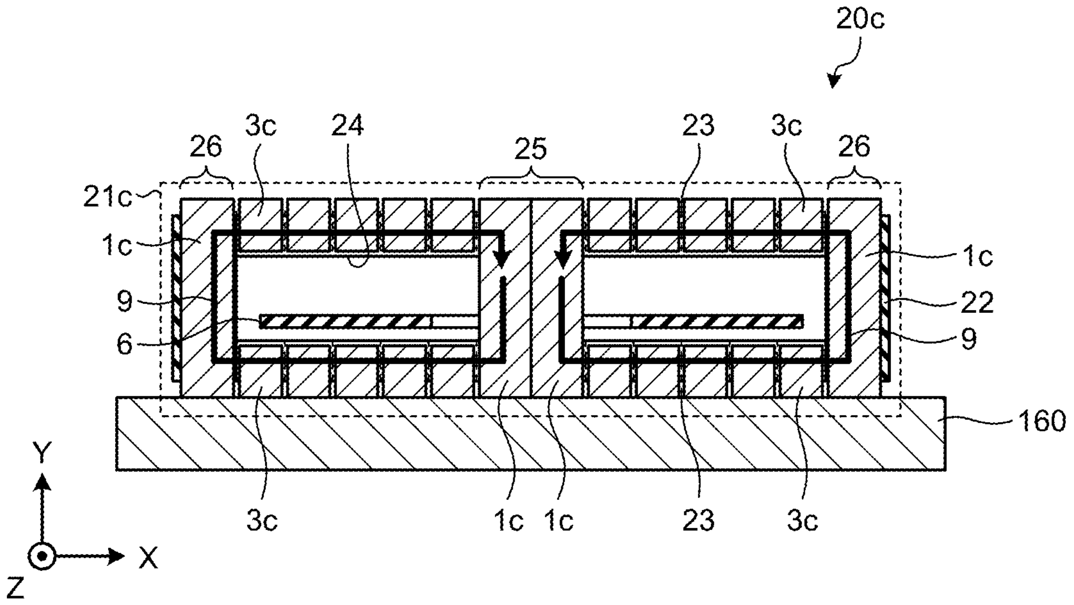
FIG. 53 is a cross-sectional view illustrating an assembled state of the coil apparatus illustrated in FIG. 52.

FIG. 52 is an exploded view of a coil apparatus according to a third modification of the eighth embodiment. FIG. 53 is a cross-sectional view illustrating an assembled state of the coil apparatus illustrated in FIG. 52. In FIG. 52, the coil unit 6 is omitted. In a coil apparatus 20*c* according to the third modification of the eighth embodiment, a core module 21*c* does not use the core segment 2*c* illustrated in FIG. 47. The core module 21*c* is composed of four core segments 1*c* and any number of core segments 3*c*. The center leg 25 consists of two core segments 1*c* aligned in the X-axis direction.

Since the core module 21*c* does not use the core segment 2*c*, the number of types of components is reduced as compared with those of the core modules 21, 21*a*, and 21*b* described above. By the reduction of the number of types of components constituting the core module 21*c*, the productivity of the core module 21*c* can be improved, and the manufacturing cost of the core module 21*c* can be reduced.

Figure 54:
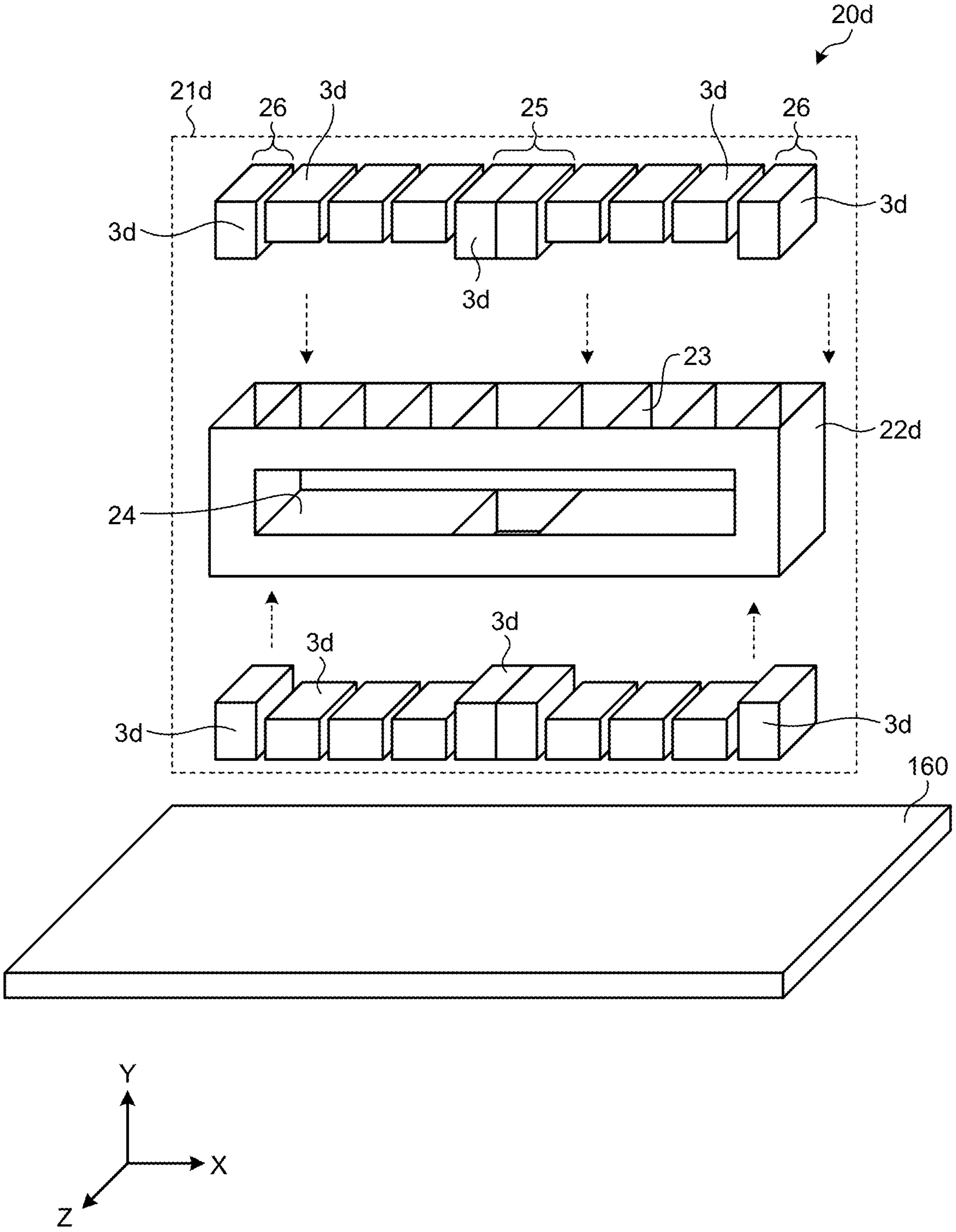
FIG. 54 is an exploded view of a coil apparatus according to a fourth modification of the eighth embodiment.
Figure 55:
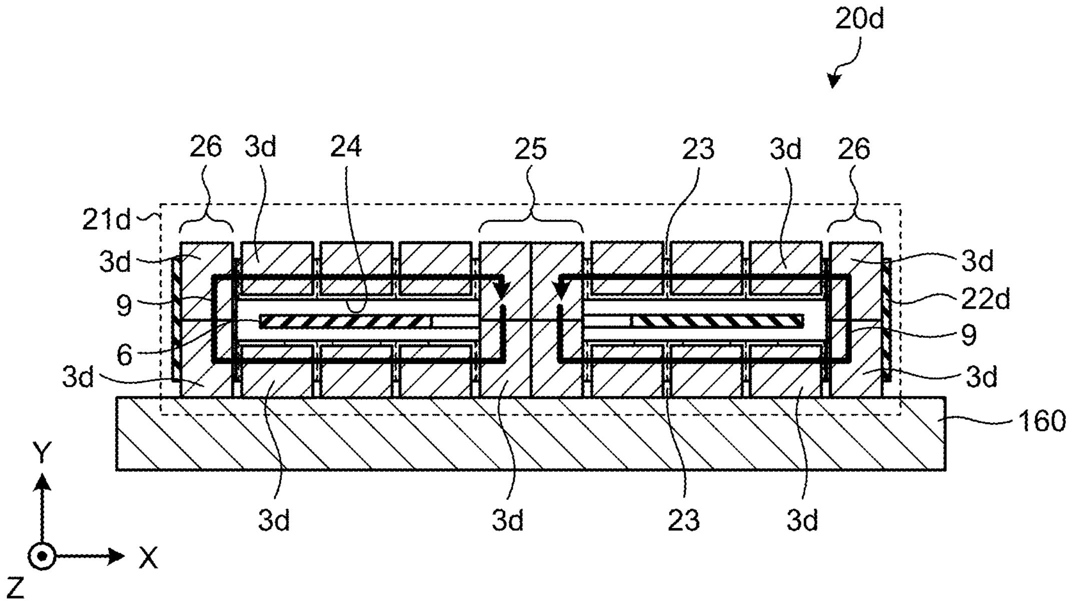
FIG. 55 is a cross-sectional view illustrating an assembled state of the coil apparatus illustrated in FIG. 54.

FIG. 54 is an exploded view of a coil apparatus according to a fourth modification of the eighth embodiment. FIG. 55 is a cross-sectional view illustrating an assembled state of the coil apparatus illustrated in FIG. 54. In FIG. 54, the coil unit 6 is omitted. In a coil apparatus 20*d* according to the fourth modification of the eighth embodiment, a core module 21*d* is provided with a plurality of core segments 3*d* in place of the core segments 1*c*, 2*c*, and 3*c* illustrated in FIG. 47. The core module 21*d* is composed of the core segments 3*d* of one type.

The XY plane of each core segment 3*d* is rectangular. The long side of the rectangle is longer than the short side of the rectangle, and has a length up to about twice that of the short side. Of the plurality of core segments 3*d* constituting the core module 21*d*, core segments 3*d* constituting the center leg 25 and core segments 3*d* constituting the outer legs 26 are disposed with their long sides aligned with the Y-axis direction. Of the plurality of core segments 3*d* constituting the core module 21*d*, core segments 3*d* other than the core segments 3*d* constituting the center leg 25 and the core segments 3*d* constituting the outer legs 26 are disposed with their long sides aligned with the X-axis direction.

A case 22*d* is configured so that the core segments 3*d* whose long-side directions are determined as described above can be disposed therein. By the disposition of the core segments 3*d* whose long sides are aligned with the Y-axis direction at the center leg 25 and the outer legs 26, spaces in which the coil unit 6 is disposed are provided between the core segments 3*d* disposed in the upper part of the case 22*d* and the core segments 3*d* disposed in the lower part of the case 22*d*.

The core module 21*d* is reduced in the number of types of components as compared with the core modules 21, 21*a*, 21*b*, and 21*c* described above. By the reduction of the number of types of components constituting the core module 21*d*, the productivity of the core module 21*d* can be improved, and the manufacturing cost of the core module 21*d* can be reduced.

Figure 56:
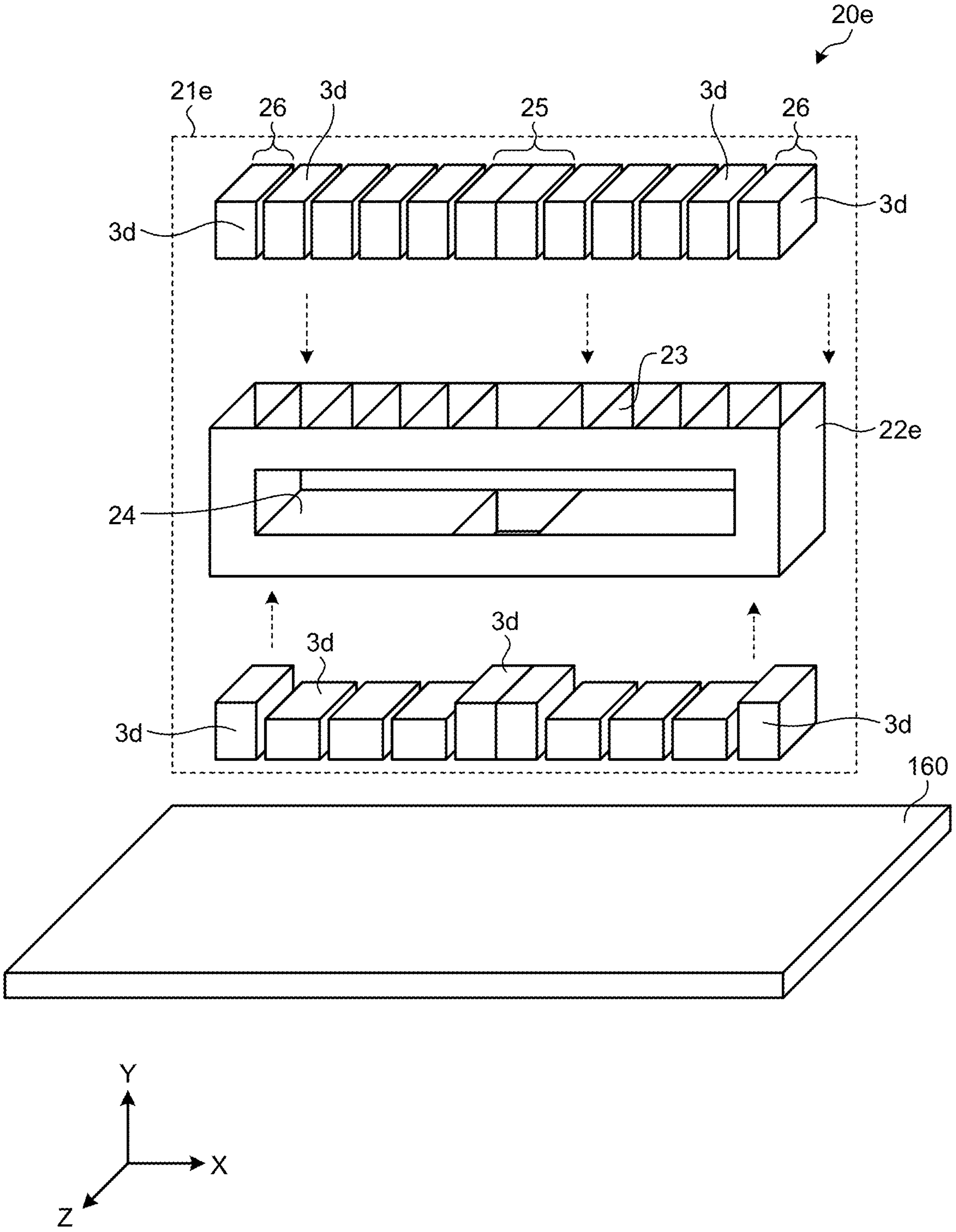
FIG. 56 is an exploded view of a coil apparatus according to a fifth modification of the eighth embodiment.
Figure 57:
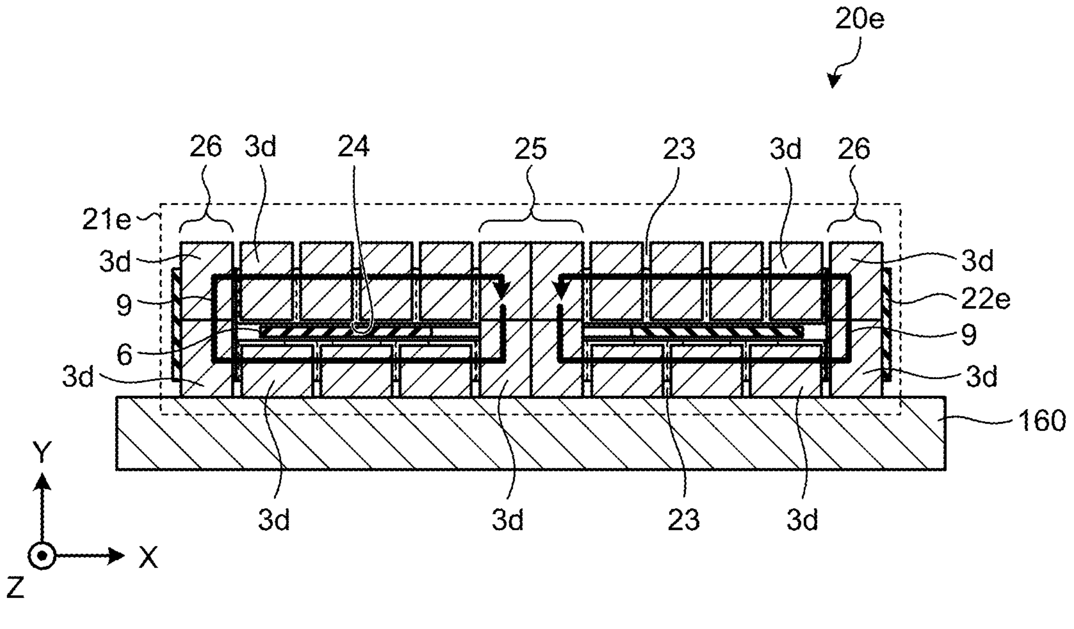
FIG. 57 is a cross-sectional view illustrating an assembled state of the coil apparatus illustrated in FIG. 56.

FIG. 56 is an exploded view of a coil apparatus according to a fifth modification of the eighth embodiment. FIG. 57 is a cross-sectional view illustrating an assembled state of the coil apparatus illustrated in FIG. 56. In FIG. 56, the coil unit 6 is omitted. In a coil apparatus 20*e* according to the fifth modification of the eighth embodiment, a core module 21*e* is composed of the core segments 3*d* of one type. Of the core segments 3*d* constituting the core module 21*e*, core segments 3*d* disposed in the upper part of a case 22*e* are all disposed with their long sides aligned with the Y-axis direction.

Core segments 3*d* disposed in the lower part of the case 22*e* are disposed in the same manner as the core segments 3*d* disposed in the lower part of the case 22*d* in the fourth modification. That is, of the core segments 3*d* disposed in the lower part of the case 22*e*, core segments 3*d* constituting the center leg 25 and core segments 3*d* constituting the outer legs 26 are disposed with their long sides aligned with the Y-axis direction. Of the core segments 3*d* disposed in the lower part of the case 22*e*, core segments 3*d* other than the core segments 3*d* constituting the center leg 25 and the core segments 3*d* constituting the outer legs 26 are disposed with their long sides aligned with the X-axis direction.

The case 22*e* is configured so that the core segments 3*d* whose long-side directions are determined as described above can be disposed therein. Of the core segments 3*d* disposed in the lower part of the case 22*e*, the core segments 3*d* constituting the center leg 25 and the core segments 3*d* constituting the outer legs 26 are disposed with their long sides aligned with the Y-axis direction, so that spaces in which the coil unit 6 is disposed are provided between the core segments 3*d* disposed in the upper part of the case 22*e* and the core segments 3*d* disposed in the lower part of the case 22*e*. Like the core module 21*d* in the fourth modification of the eighth embodiment, the core module 21*e* can reduce the number of types of components constituting the core module 21*e*. Consequently, the productivity of the core module 21*e* can be improved, and the manufacturing cost of the core module 21*e* can be reduced.

By the disposition of the core segments 3*d* whose long sides are all aligned with the Y-axis direction in the upper part of the case 22*e*, the cross-sectional area of the magnetic paths 9 in the upper part of the core module 21*e* is about one to two times larger than that when the core segments 3*d* whose long sides are aligned with the X-axis direction are disposed. By the reduction of magnetic flux density in the upper part of the core module 21*e*, the coil apparatus 20*e* can reduce loss in the coil unit 6 in the core module 21*e*. The coil apparatus 20*e* can reduce the amount of heat generation and the density of heat generation in the core module 21*e*, and can reduce a temperature rise in the core module 21*e*. Consequently, the coil apparatus 20*e* eliminates the need to cool the core module 21*e* by placing the core module 21*e* in contact with a structure such as the metal plate 160*a* illustrated in FIGS. 18 and 19, the metal structure 160*c* illustrated in FIG. 20, or the metal structure 160*g* illustrated in FIG. 21.

Further, by the elimination of the need to cool the core module 21*e* by placing the core module 21*e* in contact with the structure, the coil apparatus 20*e* can be fixed using the metal spring 14 illustrated in FIG. 22 or the like. By using the metal spring 14, the power converter 100 allows a reduction in manufacturing cost and reductions in the size and weight of the power converter 100.

As in the second modification of the eighth embodiment, the magnetic paths 9 in the coil apparatuses 20*a*, 20*c*, 20*d*, and 20*e* according to the first modification of the eighth embodiment and the third to fifth modifications of the eighth embodiment may include at least one point at which adjacent core segments are in contact with each other. This allows the coil apparatuses 20*a*, 20*c*, 20*d*, and 20*e* to suppress the occurrence of eddy currents in the coil unit 6 to reduce loss in the coil unit 6.

As in the second modification of the eighth embodiment, the magnetic paths 9 in the coil apparatuses 12, 12*a*, 12*b*, 12*c*, 12*d*, 12*g*, 12*h*, and 12*i* according to the first to fifth embodiments and the seventh embodiment may include at least one point at which adjacent core segments are in contact with each other. This allows the coil apparatuses 12, 12*a*, 12*b*, 12*c*, 12*d*, 12*e*, 12*f*, 12*g*, 12*h*, and 12*i* to suppress the occurrence of eddy currents in the coil unit 6 to reduce loss in the coil unit 6.

The configurations described in the above embodiments illustrate an example of the subject matter of the present invention, and can be combined with another known art, and can be partly omitted or changed without departing from the scope of the present invention.

REFERENCE SIGNS LIST

1, 1*a*, 1*c*, 2, 2*a*, 2*c*, 3, 3*a*, 3*b*, 3*c*, 3*d* core segment; 4, 23 divider plate; 4*a* double-sided adhesive tape; 4*b* divider; 4*c*, 4*d* adhesive; 5, 5*a*, 5*b*, 5*c*, 5*d*, 5*e*, 5*f*, 22, 22*a*, 22*b*, 22*d*, 22*e* case; 5*g*, 5*i*, 14*a* projection; 5*h* fixing portion; 6 coil unit; 6*a*, 6*b* edge; 7, 7*a*, 7*b*, 7*c*, 7*d* base core; 7*e*, 26 outer leg; 7*f*, 25 center leg; 8 lid; 9 magnetic path; 10, 10*a* screw; 11, 11*a*, 11*b*, 11*c*, 11*d*, 11*e*, 11*f*, 21, 21*a*, 21*b*, 21*c*, 21*d*, 21*e* core module; 12, 12*a*, 12*b*, 12*c*, 12*d*, 12*e*, 12*f*, 12*g*, 12*h*, 12*i*, 20, 20*a*, 20*b*, 20*c*, 20*d*, 20*e* coil apparatus; 13, 16, 165 rib; 14 metal spring; 15 groove; 17, 18 opening; 24 hollow portion; 27 cutouts; 100 power converter; 101, 102 input terminal; 103 input capacitor; 110 full-bridge circuit; 111, 112, 113, 114 switching element; 120 resonance coil; 130 transformer; 131 primary coil; 132, 133 secondary coil; 140 secondary-side rectifier circuit; 141, 142 rectifier element; 150 smoothing circuit; 151 smoothing coil; 152 output capacitor; 160 metal housing; 160*a*, 160*d*, 160*e*, 160*f* metal plate; 160*b* metal block; 160*c*, 160*g* metal structure; 161, 162, 163 GND; 166 radiating fin; 170, 170*a* printed-circuit board; 191, 192 output terminal.

The invention claimed is:

1. A power converter comprising:

a switching element;

a cooler; and a coil apparatus installed on a surface of the cooler, the coil apparatus including:

a coil;

a first core component including a leg around which the coil is wound;

a second core component that includes a plurality of first core segments arranged in a row with gaps between the first core segments, and is connected to the leg of the first core component to form a magnetic path together with the first core component; and a first case that holds the plurality of first core segments and includes divider plates to separate adjacent first core segments of the plurality of first core segments from each other, a first pair of side walls provided at both ends of the first core component in a direction along the magnetic path, and a second pair of side walls provided at both ends of the first core component in a direction perpendicular to the magnetic path, the first pair of side walls and the second pair of side walls having a height greater than or equal to a height of the divider plates, wherein the cooler is thermally connected to the first core component, and the first case is formed of a non-magnetic material.

2. The power converter according to claim 1, wherein, of the plurality of first core segments, a first core segment connected to the leg has an area of a surface of the first core segment connected to the leg larger than or equal to an area of a surface of the leg connected to the first core segment.

3. The power converter according to claim 1, wherein the plurality of first core segments comprises core segments of one type.

4. The power converter according to claim 1, wherein a thickness of the plurality of first core segments in a height direction is larger than a thickness of a thin-walled portion of the first core component.

5. The power converter according to claim 1, wherein a lid is attached to the first case to cover a space in which the plurality of first core segments is accommodated.

6. The power converter according to claim 1, wherein material of the first case includes a liquid crystal polymer, polyphenylene sulfide, or polybutylene terephthalate.

7. The power converter according to claim 1, further comprising:

a metal housing that is the cooler; and a metal structure fixed to the metal housing to cover the coil apparatus.

8. The power converter according to claim 1, wherein, in an extending direction of the leg around which the coil is wound, the coil is wound around on the cooler side of a center of the leg.

* * * * *